United States Patent [19]

Yannone et al.

[11] 4,283,634
[45] Aug. 11, 1981

[54] SYSTEM AND METHOD FOR MONITORING AND CONTROLLING OPERATION OF INDUSTRIAL GAS TURBINE APPARATUS AND GAS TURBINE ELECTRIC POWER PLANTS PREFERABLY WITH A DIGITAL COMPUTER CONTROL SYSTEM

[75] Inventors: Robert A. Yannone, Aldan; Terry J. Reed, Latrobe, both of Pa.

[73] Assignee: Westinghouse Electric Corp., Pittsburgh, Pa.

[21] Appl. No.: 317,839

[22] Filed: Dec. 26, 1972

Related U.S. Application Data

[63] Continuation of Ser. No. 155,905, Jun. 23, 1971, abandoned.

[51] Int. Cl.² ............................................. H02P 9/04
[52] U.S. Cl. ................................. 290/40 R; 364/492; 364/494; 60/39.28 T
[58] Field of Search ............................... 290/40, 2, 1; 60/39.28 T, 39.14 T, 39.14; 235/151.21; 340/228 R, 409, 213 Q; 364/492, 494, 495

[56] References Cited

U.S. PATENT DOCUMENTS

| | | | |
|---|---|---|---|
| 2,883,255 | 4/1959 | Anderson | 340/213 |
| 2,905,520 | 9/1959 | Anderson | 340/213 Q |
| 3,142,154 | 7/1964 | Leeson | 60/39.28 |
| 3,151,450 | 10/1964 | Blackaby | 60/39.28 T |
| 3,279,169 | 10/1966 | Bayard | 60/39.14 |
| 3,325,650 | 6/1967 | Barnes | 290/40 |
| 3,468,164 | 9/1969 | Sutherland | 340/409 |
| 3,470,691 | 10/1969 | Smith | 60/39.28 |
| 3,482,396 | 12/1969 | Nelson et al. | 60/39.28 |
| 3,582,926 | 6/1971 | Hassan | 340/228 |
| 3,606,754 | 9/1971 | White | 60/39.14 |
| 3,691,759 | 9/1972 | Scheerer | 60/39.14 |
| 3,891,915 | 6/1975 | Yannone et al. | 290/40 R |

Primary Examiner—J. V. Truhe
Assistant Examiner—John W. Redman
Attorney, Agent, or Firm—E. F. Possessky

[57] ABSTRACT

A hybrid digital computer gas turbine power plant control system which may operate in a multiple control loop arrangement is provided with selected process variable monitoring and control and turbine system failure detection means. More specifically, open, shorted, grounded and reversed thermocouples are detected and alarmed. Problems of any one combustor in a multiple combustor arrangement are similarly detected and alarmed. Additionally, automatic correction of previously computed temperature related control inputs is provided in response to detected variations from a predetermined temperature reasonability criterion. Novel placement and orientation of system thermocouples facilitates achieving improved monitoring, detection and control.

15 Claims, 50 Drawing Figures

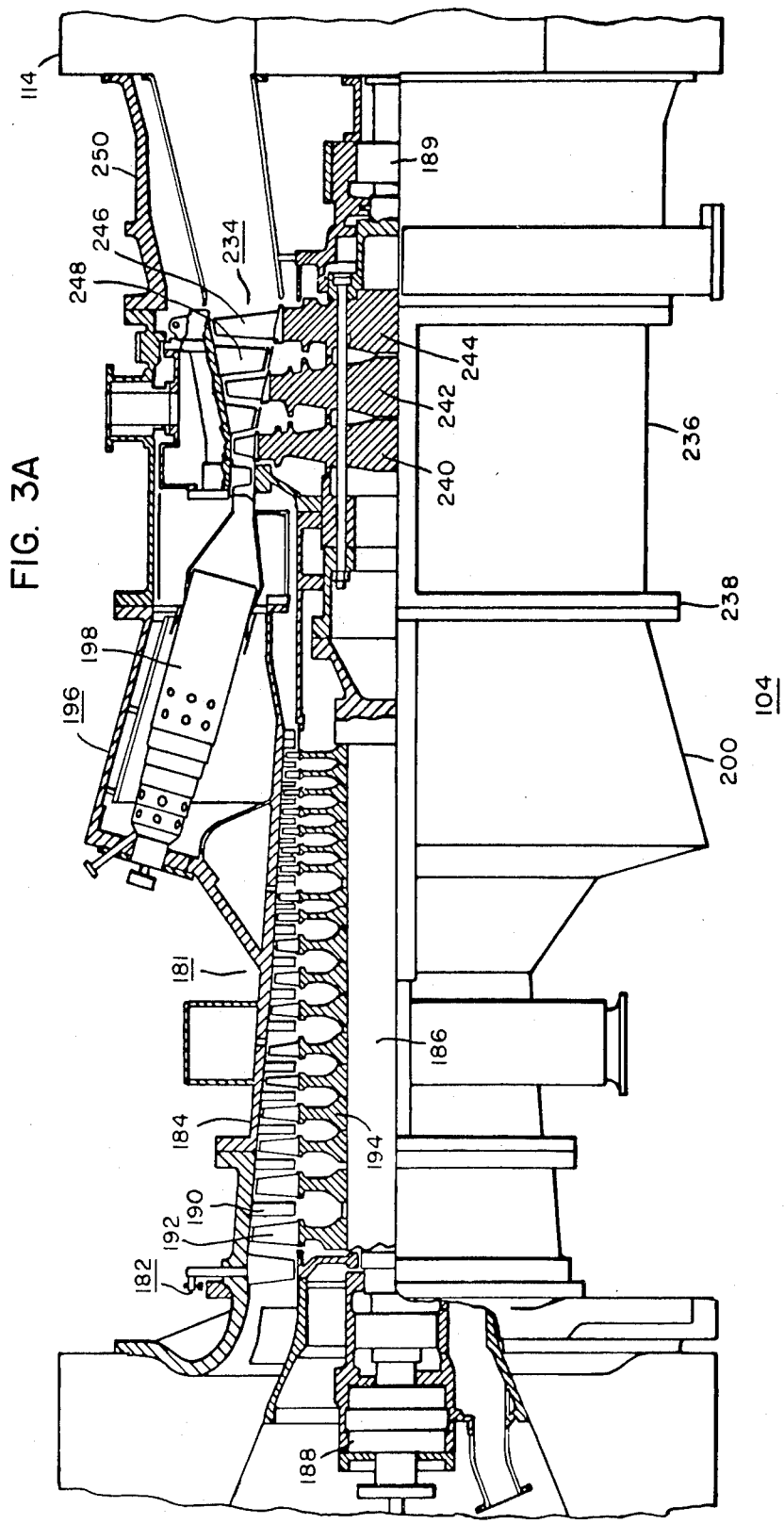

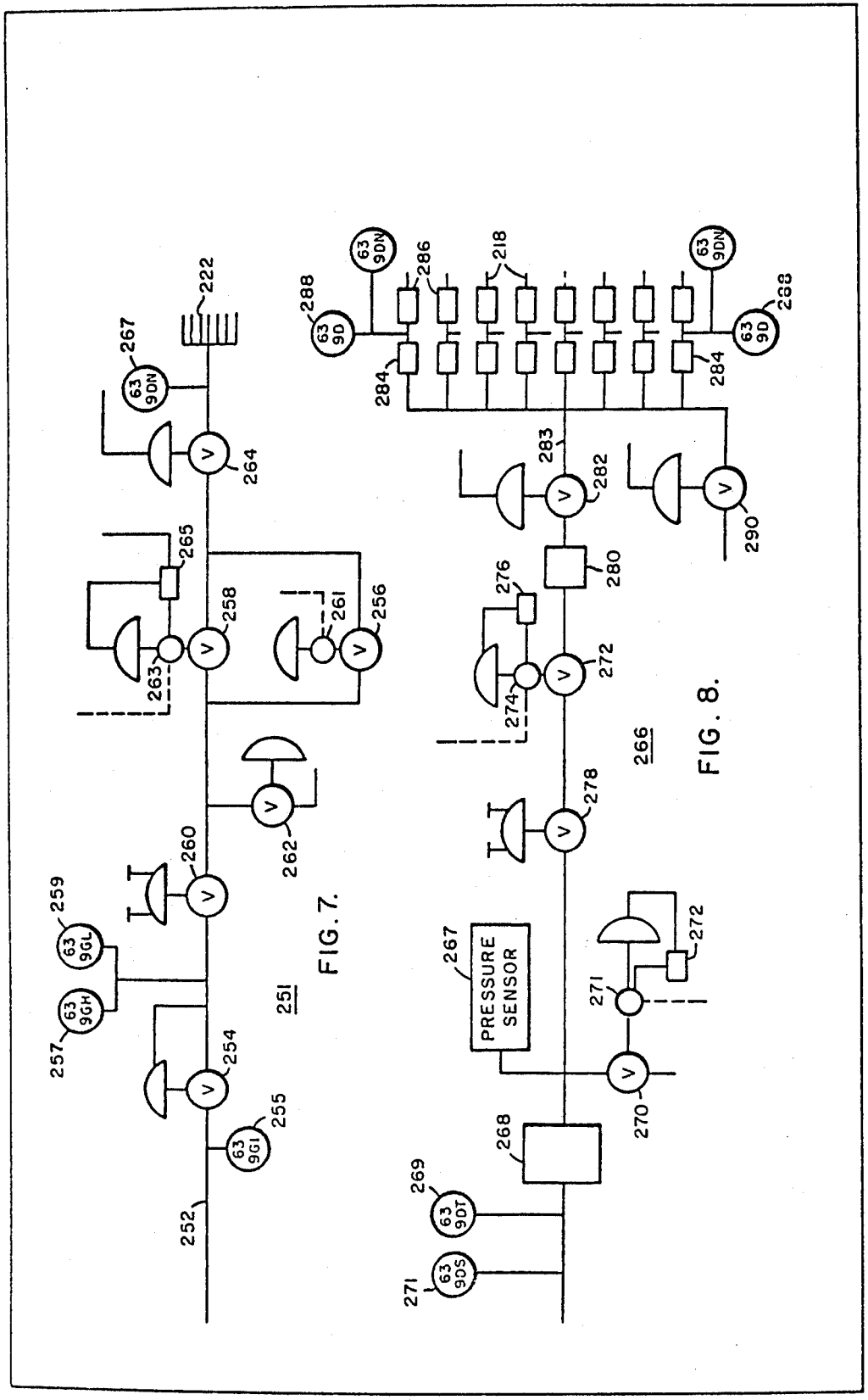

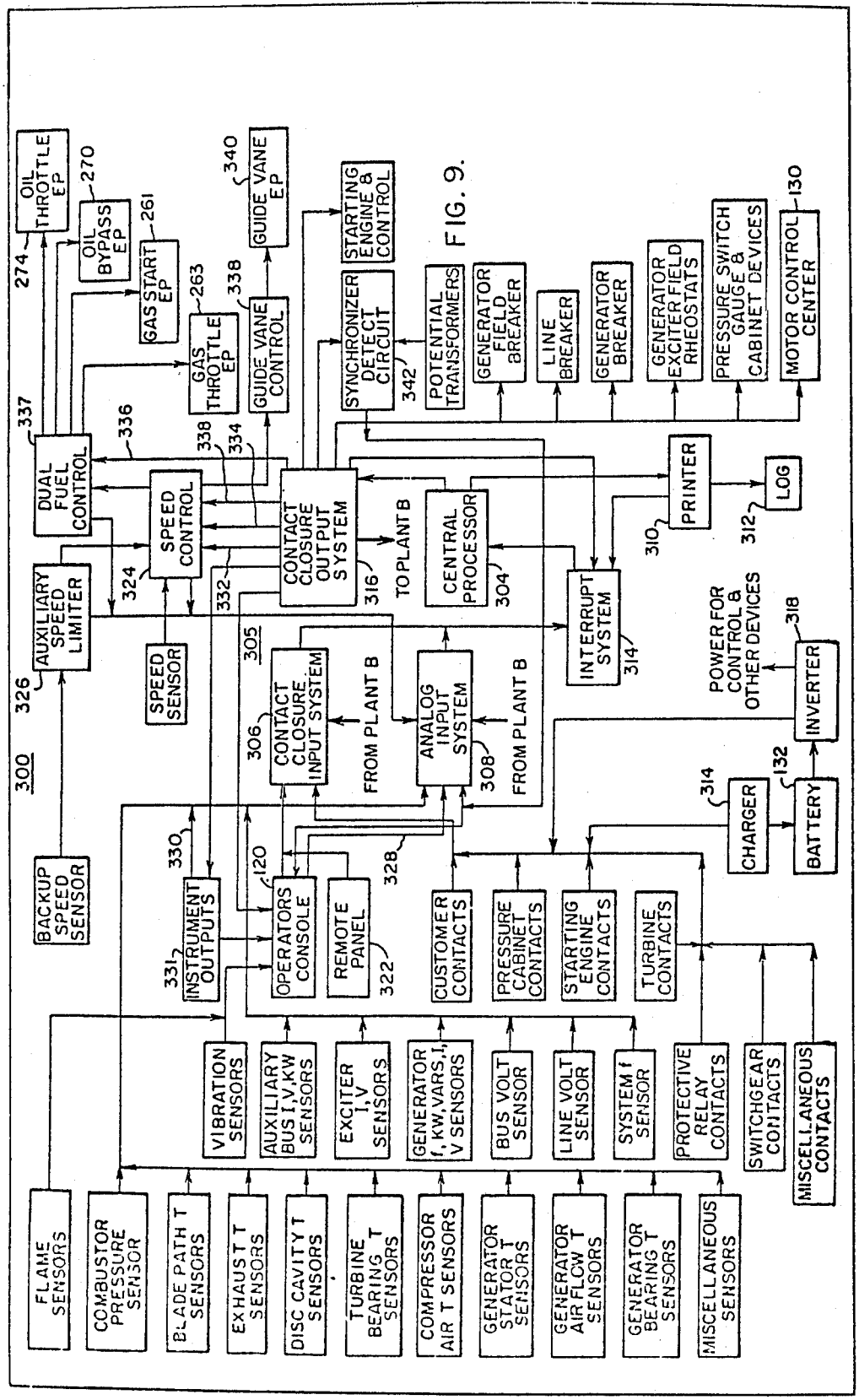

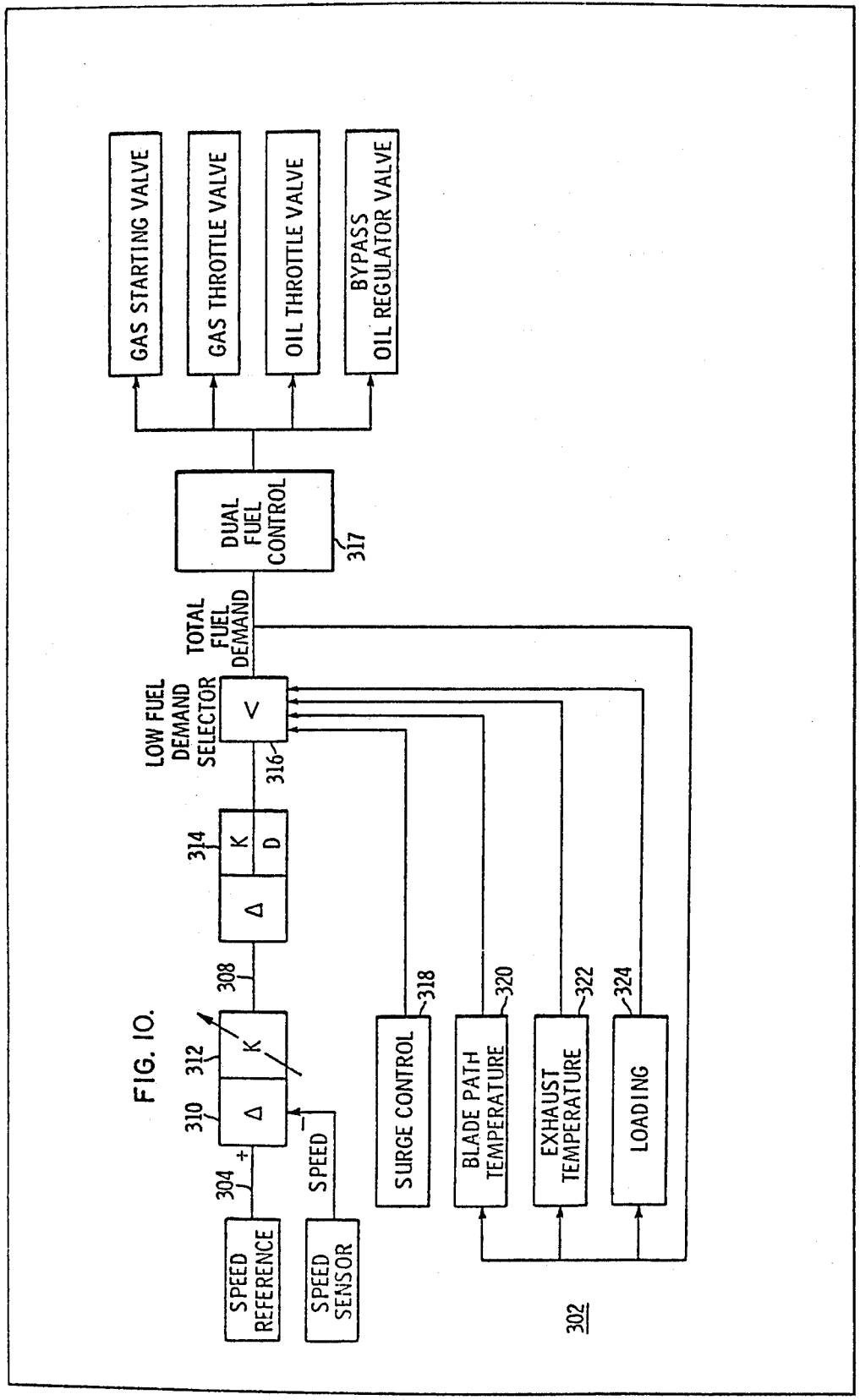

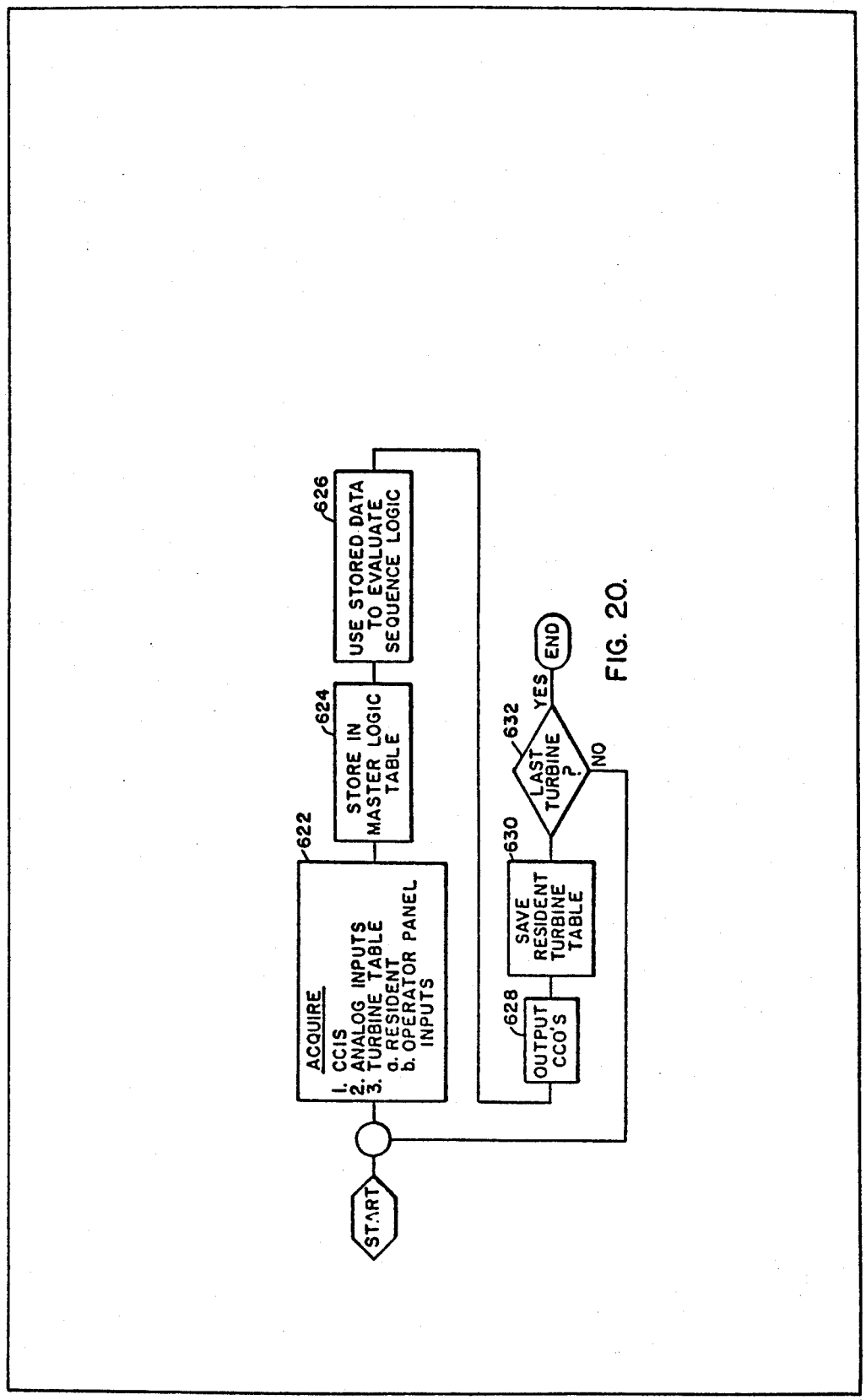

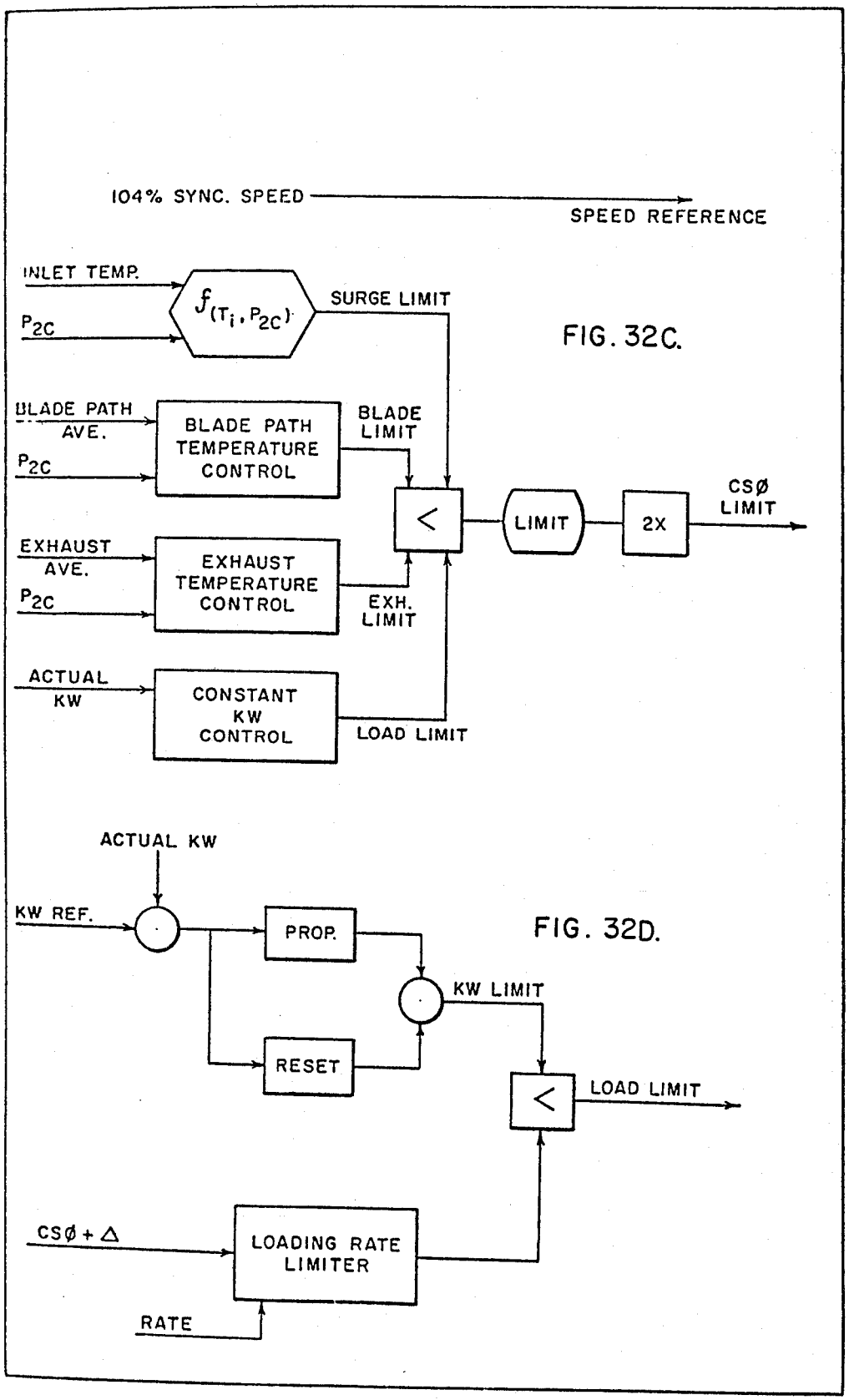

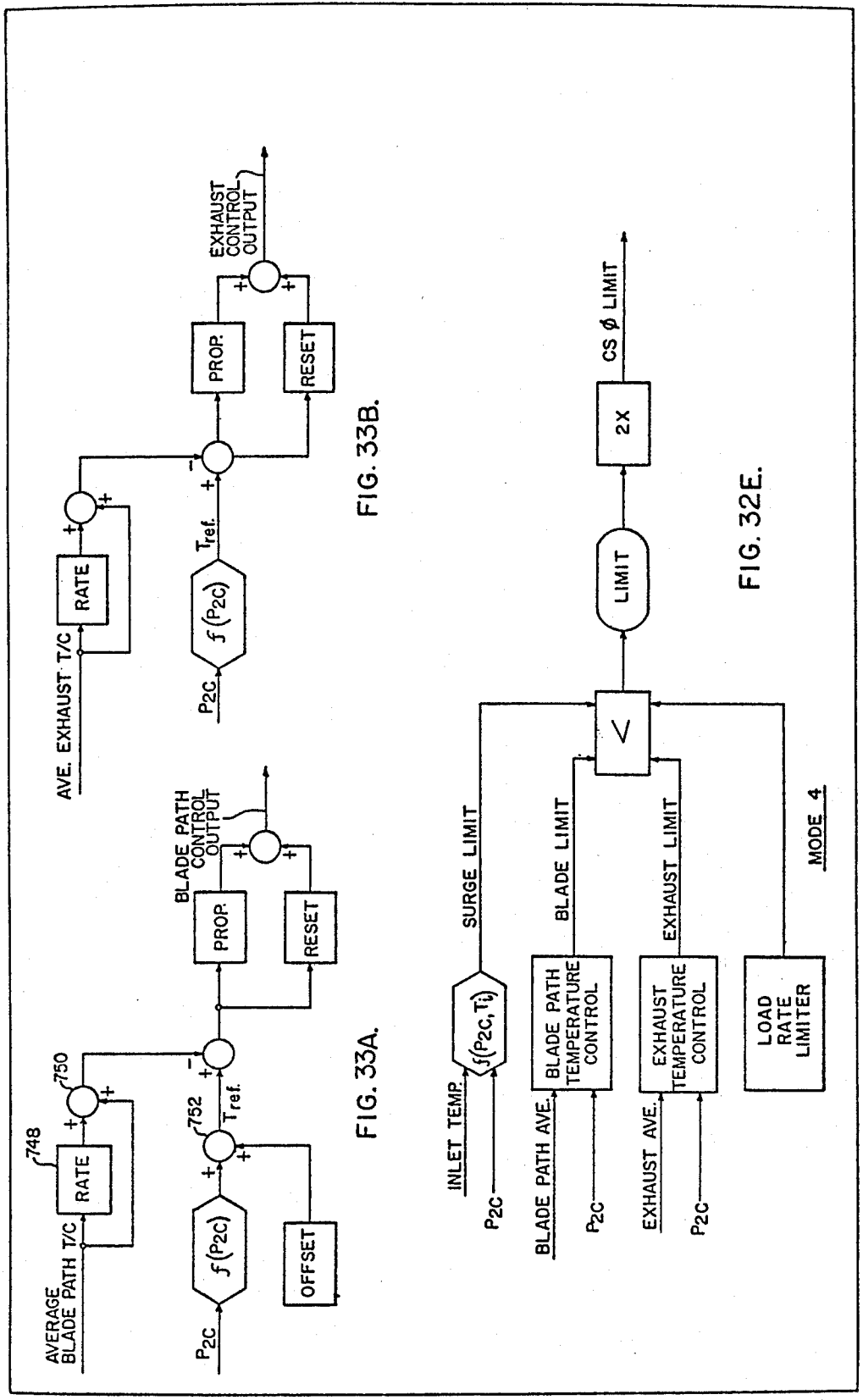

SYSTEM AND METHOD FOR MONITORING AND CONTROLLING OPERATION OF INDUSTRIAL GAS TURBINE APPARATUS AND GAS TURBINE ELECTRIC POWER PLANTS PREFERABLY WITH A DIGITAL COMPUTER CONTROL SYSTEM

CROSS REFERENCE TO RELATED APPLICATIONS

This is a continuation of application Ser. No. 155,905 filed June 23, 1971, now abandoned.

Ser. No. 082,470 filed by J. Reuther and T. Giras, entitled System and Method for Operating Industrial Gas Turbine Apparatus and Gas Turbine Electric Power Plants Preferably with a Digital Computer Control System, and assigned to the present assignee.

Ser. No. 082,469 filed by R. Kiscaden and R. Yannone, entitled System and Method for Accelerating and Sequencing Industrial Gas Turbine Apparatus and Gas Turbine Electric, and assigned to the present assignee.

Ser. No. 082,467, now U.S. Pat. No. 3,898,439 filed by J. Rankin and T. Reed, entitled Improved Control Computer Programming Method and Improved System and Method for Operating Industrial Gas Turbine Apparatus, and assigned to the present assignee.

BACKGROUND OF THE INVENTION

The present invention relates to gas or combustion turbine apparatus, gas turbine electric power plants and control systems and operating methods therefor.

Industrial gas turbines may have varied cycle, structural and aerodynamic designs for a wide variety of uses. For example, gas turbines may employ the simple, regenerative, steam injection or combined cycle in driving an electric generator to produce electric power. Further, in these varied uses the gas turbine may have one or more shafts and many other rotor, casing, support, and combustion system structural features which can vary relatively widely among differently designed units. They may be aviation jet engines adapted for industrial service as described for example in an ASME paper entitled "The Pratt and Whitney Aircraft Jet Powered 121 MW Electrical Peaking Unit" presented at the New York Meeting in November-December 1964.

Other gas turbine uses include drive applications for pipeline or process industry compressors and surface transportation units. An additional application of gas turbines is that which involves recovery of turbine exhaust heat energy in other apparatus such as electric power or industrial boilers or other heat transfer apparatus. More generally, the gas turbine air flow path may form a part of an overall process system in which the gas turbine is used as an energy source in the flow path.

Gas turbine electric power plants are usable in base load, mid-range load and peak load power system applications. Combined cycle plants are normally usable for the base or mid-range applications while the power plant which employs a gas turbine only as a generator drive typically is highly useful for peak load generation because of its relatively low investment cost. Although the heat rate for gas turbines is relatively high in relation to steam turbines, the investment savings for peak load application typically offsets the higher fuel cost factor. Another economic advantage for gas turbines is that power generation capacity can be added in relatively small blocks such as 25 MW or 50 MW as needed for expected system growth thereby avoiding excessive capital expenditure and excessive system reserve requirements. Further background on peaking generation can be obtained in articles such as "Peaking Generation" a Special Report of Electric Light and Power dated November 1966.

Startup availability and low forced outage rates are particularly important for peak load power plant applications of gas turbines. Thus, reliable gas turbine startup and standby operations are particularly important for power system security and reliability.

In the operation of gas turbine apparatus and electric power plants, various kinds of controls have been employed. Relay-pneumatic type systems form a large part of the prior art. More recently, electronic controls of the analog type have been employed as perhaps represented by U.S. Pat. No. 3,520,133 entitled Gas Turbine Control System and issued on July 14, 1970 to A. Loft or by the control referred to in an article entitled Speedtronic Control, Protection and Sequential System and designated as GER-2461 in the General Electric Gas Turbine Reference Library. A wide variety of controls have been employed for aviation jet engines including electronic and computer controls as described for example in a March 1968 ASME Paper presented by J. E. Bayati and R. M. Frazzini and entitled "Digatec (Digital Gas Turbine Engine Control)", an April 1967 paper in the Journal of the Royal Aeronautical Society authored by E. S. Eccles and entitled "The Use of a Digital Computer for On-Line Control of a Jet Engine", or a July 1965 paper entitled "The Electronic Control of Gas Turbine Engines" by A. Sadler, S. Tweedy and P. J. Colburn in the July 1965 Journal of the Royal Aeronautical Society. However, the operational and control environment for jet engine operation differs considerably from that for industrial gas turbines. In referencing prior art publications or patents as background herein, no representation is made that the cited subject matter is the best prior art.

In connection with prior art gas turbine electric power plant operating and control systems and operating methods therefor, reference is made to copending related application Ser. No. 082,470 which in conjunction with the other enumerated related patent applications comprises a description of an improved gas turbine plant operating and control system. The present disclosure represents a further advancement over the prior art and the prior art discussion herein contained should be considered as exclusive of the referenced applications.

Generally, the operation of industrial gas turbine apparatus and gas turbine power plants have been limited in flexibility, response speed, accuracy and reliability. Limits have also existed on how close industrial gas turbines can operate to the turbine design limits over various speed and/or load ranges.

In gas turbine power plants, operational shortcomings have existed with respect to plant availability. Critical temperature limit control has been less protective and less responsive than otherwise desirable.

More particularly, in gas turbine controls exhaust temperature monitoring is essential since there exists an ever present danger of damage to combustor elements, hot parts, rotor blades, etc., in the event of over-temperature or overload conditions. Thermocouples have usually been placed in the exhaust gas stream to determine temperature of the gases discharged by the combustor elements through the turbine to thereby give an indication of an average discharge temperature. Such temperature monitoring increases turbine operation reliability and availability, serving to decrease maintenance inspections. The turbine thermocouples have provided a means by which turbine operators may manually initiate control actions including shutdown in the event of a safety hazard or indicated danger of serious damage to vital components.

As gas turbine automatic control systems developed, it became increasingly essential to obtain reliable temperature indications for use as control parameters in developing a fuel control input in the various control modes of operation. It became necessary to review the temperature measurements, not only for the purpose of assuring reliable, safe operation, but, further, to insure the availability of a control variable which would enable efficient operation of the gas turbine near design limits to thereby enhance overall efficiency of the automatic control system. More specifically, accurate, reliable exhaust temperature readings are essential to maintaining the integrity of a system having one or more control loops wherein it is sought to control turbine speed or load in response to a temperature derived fuel demand signal. During those modes of operation characterized principally by temperature control, the accuracy and reliability of such readings determines the degree to which optimum operating conditions may be obtained.

Various methods and apparatus exist for obtaining and displaying turbine exhaust temperature readings. Earlier temperature monitoring systems provided plural thermocouples connected in parallel yielding an average temperature indication for the combustion elements which could be displayed on a meter. A facility was provided for selecting a particular thermocouple for a reading if desired. However, the meter load influenced the average by taking the selected thermocouple value out. As may be readily appreciated, elimination of a thermocouple reading would have a decided effect in a system whose operation is at least partially determined as a function of such values, and would, therefore be unsuitable in a control loop.

More recently systems have been devised which employ plural thermocouples in a symmetrical arrangement for achieving high accuracy temperature sensing and averaging suitable for control loop implementation as well as monitoring and display. Representative of such a system is one wherein the temperature sensing is of exhaust gases near or within the exhaust gas cycle position or exhaust manifold. Control actions are determined in response to a control system input signal representing an average of the readings taken from a combination of the system thermocouples, usually all. This arrangement offers certain advantages over earlier prior art particularly insofar as selection of the combination of thermocouples for averaging is made while the control system is in operation. This is particularly desirable in the event that an indication is received that one or more of the thermocouples are open or shorted. As will be appreciated, the accuracy of the average obtained in such a system is influenced by the number of thermocouples selected. However, the location of the arrangement of thermocouples at the exhaust gas cycle position keeps the actual measure spread selectively small by virtue of the mixing of the gases prior to arrival at the exhaust location.

Although a reliable and accurate temperature reading average may be obtained for monitoring and control purposes in the foregoing manner, certain features essential to maintaining the integrity of an improved monitoring or alarm and control system to be used in conjunction with gas turbine control have not been provided heretofore. As hereinabove suggested limitations have existed in overall gas turbine operating flexibility, response speed, accuracy and reliability. Such limitations similarly have existed in gas temperature monitoring and control. To achieve such temperature limiting and control response as has been heretofore achieved, complicated arrangements of logic circuitry and redundant thermocouple input channels have been employed. Such protection and control system implementations are necessarily limited in the flexibility requisite to the monitoring and detection of system faults which are known to cause catastrophic failure of such vital systems components as the combustor baskets and rotor parts. Systems capable of determining all or substantially all conditions which may predictably contribute to such catastrophic failures have not as yet been devised. Nor is there suggested in the known prior art temperature monitoring and control systems a facility for indicating which turbine control or operating conditions or problems may be the underlying cause of determined thermocouple readings and the reliability and safety of gas turbine operation has been limited accordingly.

Gas turbine operating and control problems which may be associated with thermocouple process temperature readings include improperly functioning thermocouples. Such malfunctions are varied in cause and effect. An open thermocouple which has significant impact on attempts to obtain a reliable control average may result from a circuit break. Shorted thermocouples which may result from twisted wires characteristically create ambient junctions of low temperature, again, serving to decrease reliability. Grounded thermocouples may result in intermittent faulty readings thereby introducing uncertainty into computations. Reversed connections, a problem significant from the standpoint of frequency of occurrence as well as impact on the control system may cause the introduction of a large negative number into control average computations thereby occassioning the supply of fuel to the combustor elements considerably in excess of requirements.

Turbine system faults or failures which cause significant temperature related operating and control problems include a plugged combustor nozzle, poor interconnection of combustor baskets, and improper fuel atomization and combustor basket deterioration. As previously discussed resultant over-temperature conditions in the gas turbine elements may cause turbine damage such as damage to or failure of the combustor elements or rotor blades.

SUMMARY OF THE INVENTION

One or more industrial gas turbines or gas turbine-generator power plants are operated by a control system which preferably employs a programmed digital computer in a hybrid control system arrangement. The control system operates in a gas turbine control loop arrangement preferably to control fuel flow and thereby provide load and loading rate control over the turbine and generator or other load unit and further provide speed, surge and temperature limit control with nonlinear control loop characterization. In power plant applications, the preferred computer provides generator control actions and it interfaces with the operator preferably through a central operator's panel to provide extended power plant management and operational benefits.

More specifically, as regards temperature monitoring and limit control, process temperature sensors are arranged and located to detect both normal and abnormal gas turbine operating conditions. In a preferred arrangement individual sensors are operatively associated in one-to-one relationship with each combustor in a multiple combustor arrangement. Means are provided for automatic review of each reading thereby obtained and for determining alarm and control actions as a function of detected deviations of individual readings from a predetermined reasonability criterion to thereby provide flexibility of control and reliable, safe operation of the gas turbine within design limits.

BRIEF DESCRIPTION OF THE DRAWINGS

FIG. 3A shows a front elevational view of an industrial gas turbine employed in the power plant to drive the generator and it is shown with some portions thereof broken away;

FIGS. 7 and 8 respectively show schematic diagrams of gas and liquid fuel supply systems employed with the gas turbine of FIG. 3;

FIG. 9 shows a block diagram of a digital computer control system employed to operate the gas turbine power plant of FIG. 1;

FIG. 10 shows a schematic diagram of a control loop which may be employed in operating the computer control system of FIG. 9 and the power plant of FIG. 1;

FIG. 20 illustrates a flowchart for a sequencing program associated principally with startup operations for the gas turbine;

FIG. 30 shows a more detailed flowchart for a gas turbine blade path and exhaust temperature limit function employed in the program of FIG. 26;

FIGS. 32A–D show respective control configurations of software elements associated respectively with Mode 0 through Mode 4 operations;

FIGS. 33A–B respectively show software control configurations for the blade path temperature and exhaust temperature limit functions;

DESCRIPTION OF THE PREFERRED EMBODIMENT

A. POWER PLANT

1. General Structure

Figure 1:
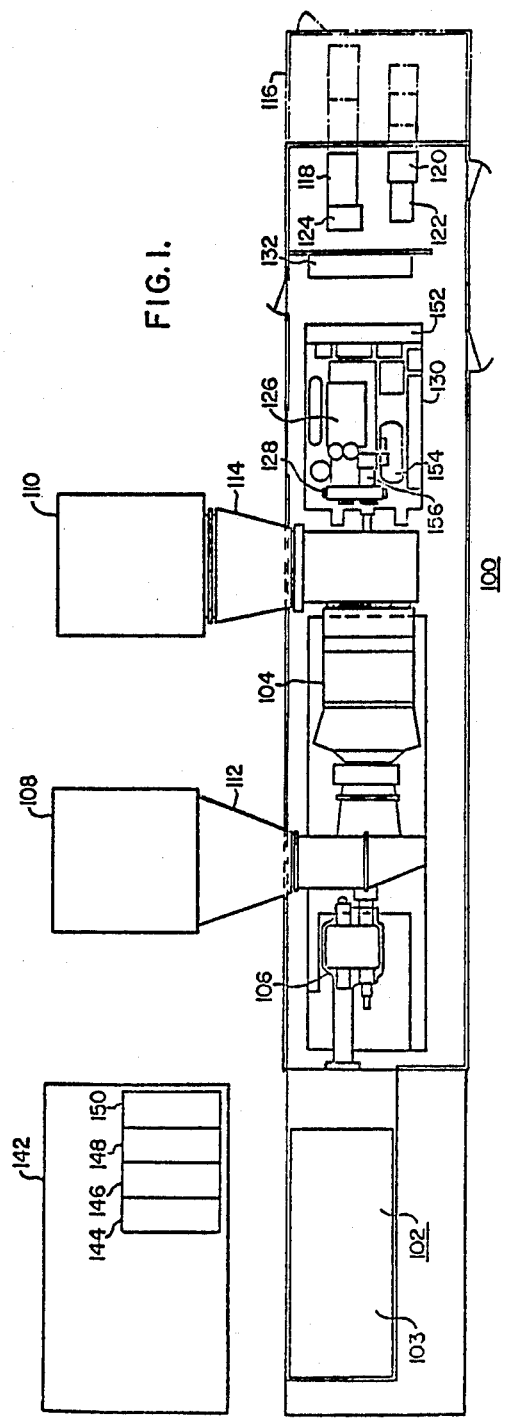
FIG. 1 shows a top plan view of a gas turbine power plant arranged to operate in accordance with the principles of the invention.

More particularly, there is shown in FIG. 1 a gas turbine electric power plant 100 which includes an AC generator 102 driven by a combustion or gas turbine 104 through a reduction gear unit 106. In this application of the invention, the gas turbine 104 is the W-251G simple cycle type manufactured by Westinghouse Electric Corporation. In other power plant generator applications, other industrial drive applications, and combined steam and gas cycle applications of various aspects of the invention, industrial gas turbines having larger or smaller power ratings, different cycle designs, different number of shafts or otherwise different from W-251G can be employed.

The plant 100 may be housed in an enclosure (not shown) and then placed on a foundation approximately 106 to 115 feet long dependent upon the number of optional additional plant units to be accommodated thereon. Up to three additional units may be provided. Exhaust silencers 108 and 110 coupled respectively to inlet and exhaust duct works 112 and 114 significantly reduce noise characteristicly associated with turbine power plants.

Digital computer and other control systems circuitry in a cabinet 118 provides for operation of the power plant 100 when a single plant unit is selected by the user. Associated therewith is an operator's panel 120, an automatic send/receive printer 122 and a protective relay panel 124 for sensing abnormal electric power system conditions. The number of basic master and slave units 118 through 124 provided may vary according as the number of plants being monitored and controlled.

Startup or cranking power for the plant 100 is provided by a starting engine 126 such as a diesel engine. Starting engine 126 is mounted on an auxiliary bedplate and coupled to the drive shaft of the gas turbine 104 through a starting gear unit 128. A DC motor 154 operates through a turning gear 156 which is also coupled to the gas turbine shaft starting gear 128 to drive the gas turbine at turning gear speed.

A motor control center 130 is also mounted on the auxiliary bedplate and it includes motor starters and other devices to provide for operating the various auxiliary equipment items associated with the plant 100.

A plant battery 132 is disposed adjacent to one end of the auxiliary bedplate or skid. The battery provides power for emergency lighting, auxiliary motor loads, and DC computer and other control power for a period following shutdown of the plant 100 due to a loss of AC power. Also included on the auxiliary skid is pressure switch and gauge cabinet 152 which contains the pressure switches, gauges, regulators and other miscellaneous elements needed for gas turbine operation.

A switchgear pad 142 is included in the plant 100 for 15 KV switchgear including the generator breaker as indicated by the reference characters 144, 146 and 148. Excitation switchgear 150 associated with the generator excitation system is also included on the switchgear pad 142.

2. Generator and Exciter

Figure 2:
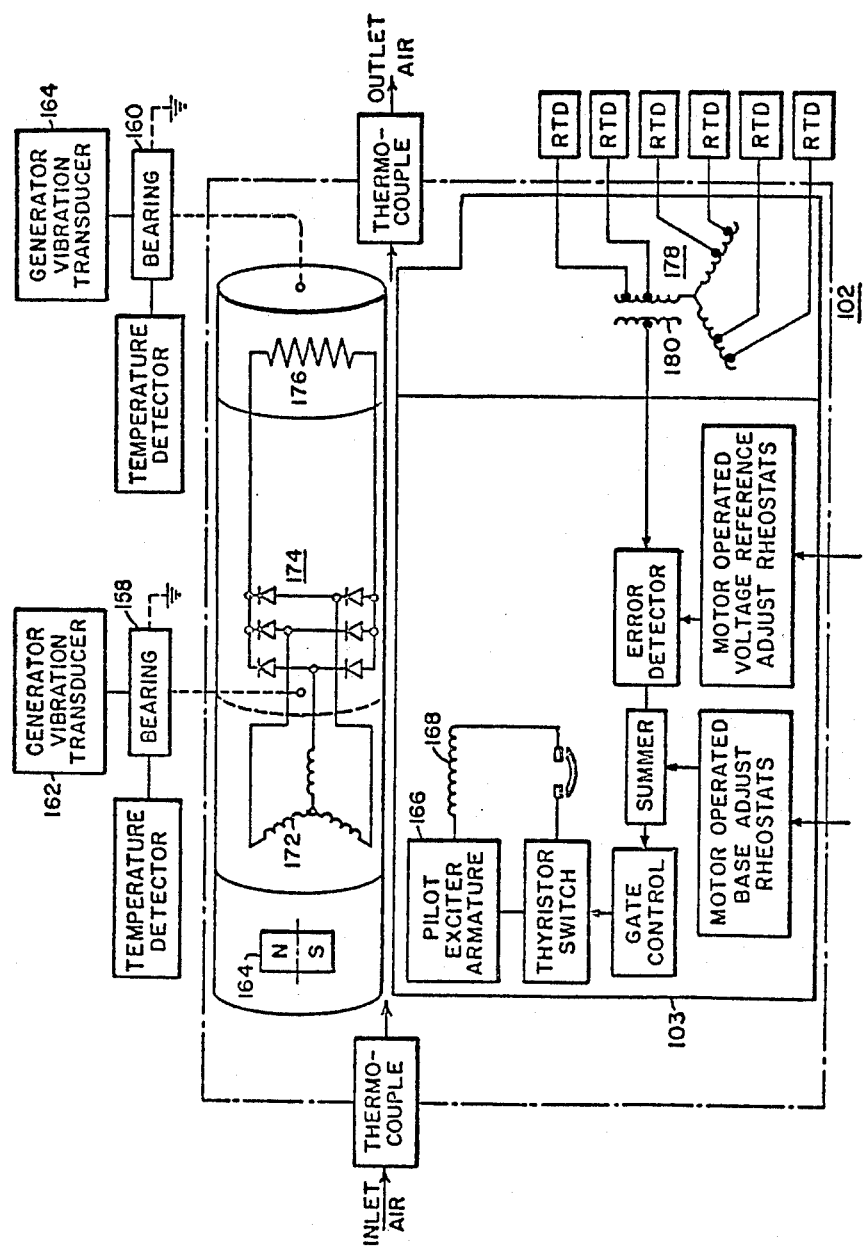
FIG. 2 shows a schematic view of a rotating rectifier exciter and a generator employed in the gas turbine power plant of FIG. 1.

The generator 102 and its brushless exciter 103 are schematically illustrated in greater detail in FIG. 2. Structural details as well as details of operation are considered more fully in the aforementioned copending application Ser. No. 082,470, Section A2, pages 21 to 24.

Briefly, a permanent magnet field member 164 is rotated to induce voltage in a pilot exciter armature 166 which is coupled to a stationary AC exciter field 168 through a voltage regulator 170. Voltage is thereby induced in an AC exciter armature 172 formed on the exciter rotating element and it is applied across diodes mounted with fuses on a diode wheel 174 to energize a rotating field element 176 of the generator 102. Generator voltage is induced in a stationary armature winding 178 which supplies current to the power system through a generator breaker when the plant 100 is synchronized and on the line. A transformer 180 supplies a feedback signal for the regulator 170 to control the excitation level of the exciter field 168.

Various monitoring devices to be hereinafter more fully described are provided which generate input data for the plant control system. Included are vibration transducers 162 and 164 resistant temperature detectors embedded in the stator winding and thermocouples installed to measure air inlet discharge temperature and bearing oil drain temperatures. In this manner alarm conditions are provided to the control system. Additional control functions are provided to adjust base adjust rheostats 171 and 177 to provide fine generator voltage control.

3. Gas Turbine a. Compressor

Figure 3B:
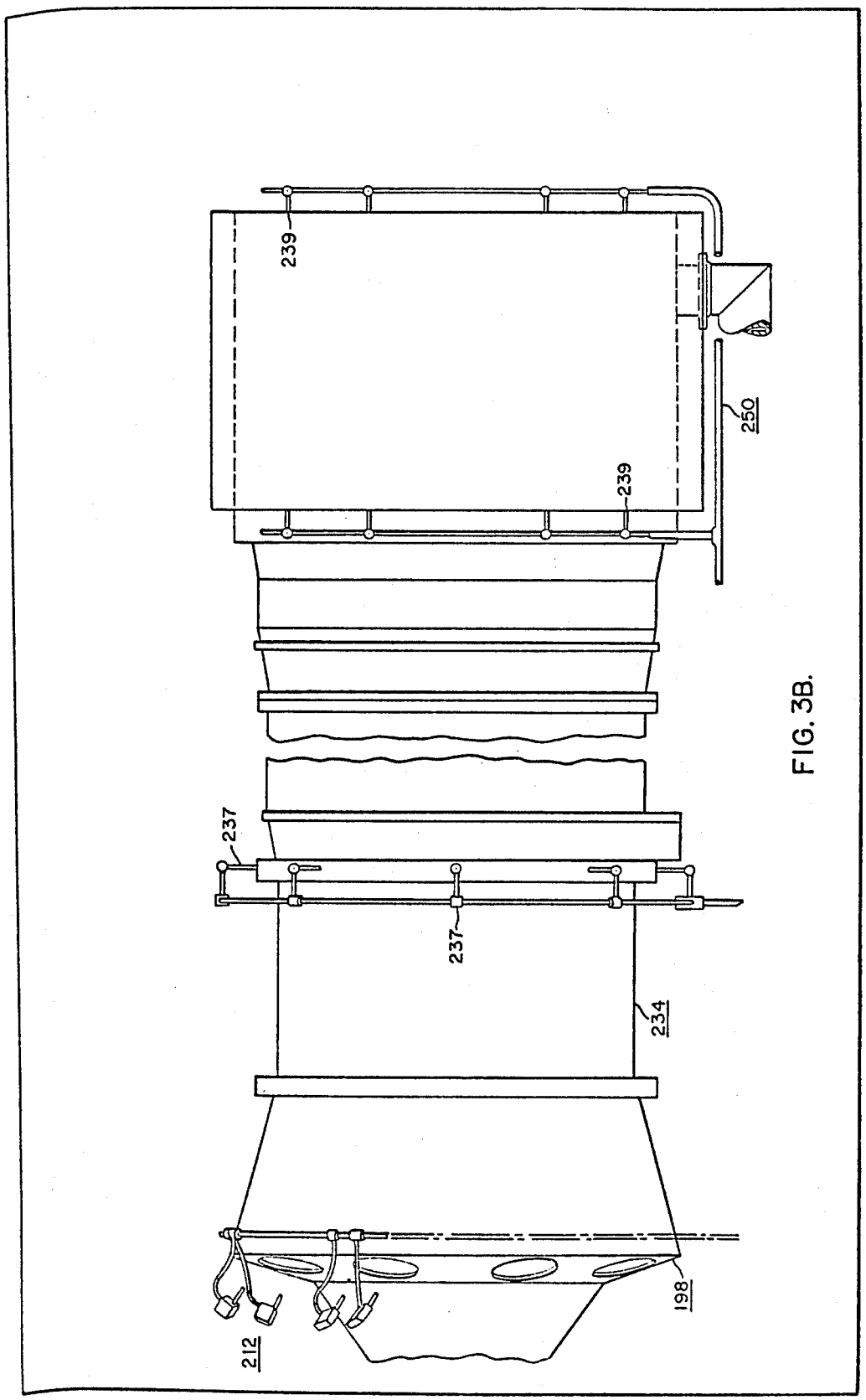
FIG. 3B shows a schematic view of an abbreviated portion of the industrial gas turbine of FIG. 3A illustrating the location and arrangement of the gas discharge temperature sensing thermocouples in accordance with the principles of the present invention.

The gas turbine 104 in this case is the single shaft simple cycle type having a standard ambient pressure ratio of 9.0 to 1 and a rated speed of 4894 rpm and it is illustrated in greater detail in FIG. 3. Filtered inlet air enters a multistage axial flow compressor 181 through a flanged inlet manifold 183 from the inlet ductwork 112. An inlet guide vane assembly 182 includes vanes supported across the compressor inlet to provide for surge prevention particularly during startup. The angle at which all of the guide vanes are disposed in relation to the gas stream is uniform and controlled by a pneumatically operated positioning ring coupled to the vanes in the inlet guide vane assembly 182.

The compressor 181 is provided with a casing 184 which is split into base and cover parts along a horizontal plane. The turbine casing structure including the compressor casing 184 provides support for a turbine rotating element including a compressor rotor 186 through bearings 188 and 189. Vibration transducers (FIG. 9) are provided for the gas turbine bearings 188 and 189.

The compressor casing 184 also supports stationary blades 190 in successive stationary blade rows along the air flow path. Further, the casing 184 operates as a pressure vessel to contain the air flow as it undergoes compression. Bleed flow is obtained under valve control from intermediate compressor stages to prevent surge during startup.

The compressor inlet air flows annularly through a total of eighteen stages in the compressor 181. Blade 192 mounted on the rotor 186 by means of wheels 194 are appropriately designed from an aerodynamic and structural standpoint for the intended service. A suitable material such as 12% chrome steel is employed for the rotor blades 192. Both the compressor inlet and outlet air temperatures are measured by suitably supported thermocouples (FIG. 9).

b. Combustion System

Pressurized compressor outlet air is directed into a combustion system 196 comprising a total of eight combustor baskets 198 conically mounted within a section 200 of the casing 184 about the longitudinal axis of the gas turbine 104. Combustor shell pressure is detected by a suitable sensor (FIG. 9) coupled to the compressor-combustor flow paths located in the pressure switch and gauge cabinet 152.

Figure 4:
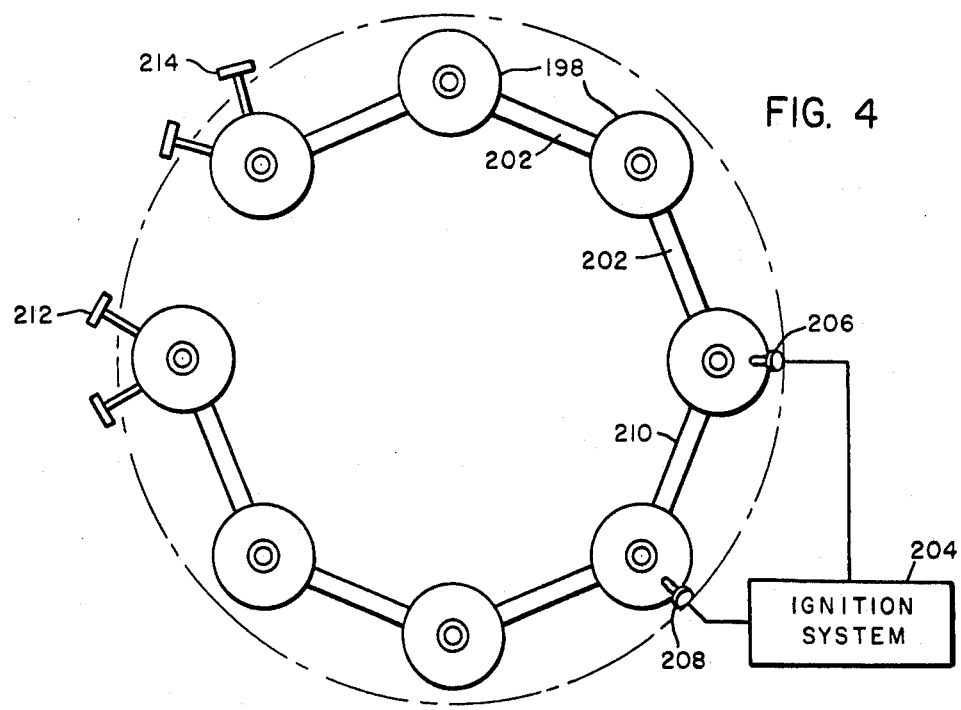
FIGS. 4–6 show a fuel nozzle and parts thereof employed in the gas turbine of FIG. 3.

As schematically illustrated in FIG. 4, the combustor baskets 198 are cross-connected by cross-flame tubes 202 for ignition purposes. A computer sequenced ignition system 204 includes igniters 206 and 208 associated with respective groups of four combustor baskets 198. In each basket group, the combustor baskets 198 are series cross-connected and the two groups are cross-connected at one end only as indicated by the reference character 210.

Generally, the ignition system 204 includes an ignition transformer and wiring to respective spark plugs which form a part of the igniters 206 and 208. The spark plugs are mounted on retractable pistons within the igniters 206 and 208 so that the plugs can be withdrawn from the combustion zone after ignition has been executed.

A pair of ultraviolet flame detectors 212 (FIGS. 3B and 4) are associated with each of the end combustor baskets in the respective basket groups in order to verify ignition and continued presence of combustion in the eight combustor baskets 198. The flame detectors 212 can for example be Edison flame detectors Model 424–10433.

Figures 5, 6:
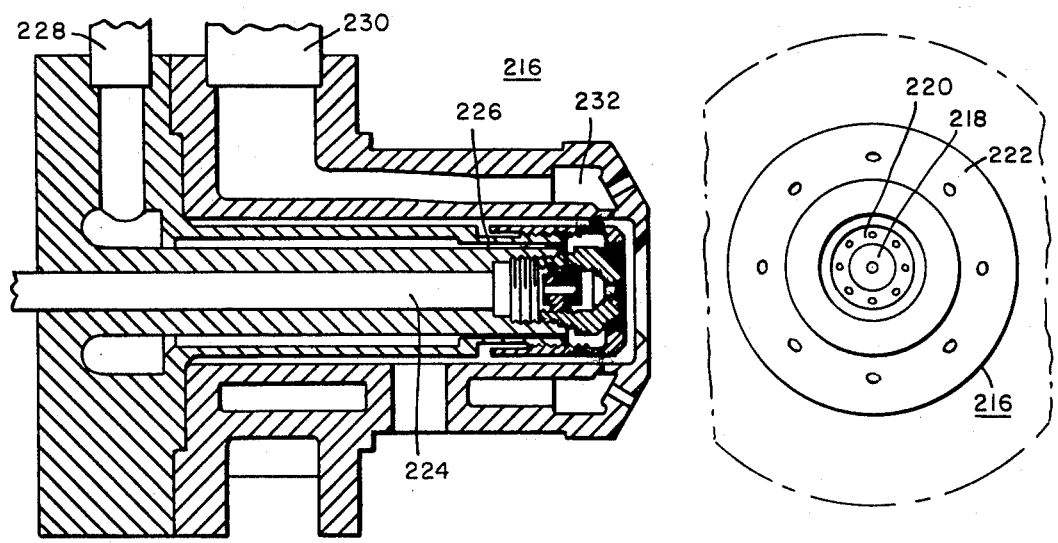

In FIG. 5, there is shown a front plan view of a dual fuel nozzle mounted at the compressor end of each combustor basket 198. An oil nozzle 218 is located at the center of the dual nozzle 216 and an atomizing air nozzle 220 is located circumferentially about the oil nozzle 218. An outer gas nozzle 222 is disposed about the atomizing air nozzle 220 to complete the assembly of the fuel nozzle 216.

As indicated in the broken away side view in FIG. 6, fuel oil or other liquid fuel enters the oil nozzle 218 through a pipe 224 while atomizing air for the fuel oil enters a manifold pipe arrangement 226 through entry pipe 228 for flow through the atomizing air nozzle 220. Gaseous fuel is emitted through the nozzle 222 after flow through entry pipe 230 and a manifold pipe arrangement 232.

c. Fuel

Generally, either liquid or gaseous or both liquid and gaseous fuel flow can be used in the turbine combustion process. Various gaseous fuels can be burned including gases ranging from blast furnace gas having low BTU content to gases with high BTU content such as natural gas, butane or propane.

With respect to liquid fuels, the fuel viscosity must be less than 100 SSU at the nozzle to assure proper atomization. Most distillates meet this requirement.

A portion of the compressor outlet air flow combines with the fuel in each combustor basket 198 to produce combustion after ignition and the balance of the compressor outlet air flow combines with the combustion products for flow through the combustor basket 198 into a multistage reaction type turbine 234 (FIG. 3). The combustor casing section 200 is coupled to a turbine casing 236 through a vertical casing joint 238. No high pressure air or oil seal is required between the compressor 181 and the turbine 234.

d. Turbine Element

The turbine 234 is provided with three reaction stages through which the multiple stream combustion system outlet gas flow is directed in an annular flow pattern to transform the kinetic energy of the heated, pressurized gas turbine rotation, i.e. to drive the compressor 181 and the generator 102. The turbine rotor is formed by a stub shaft 240 and three disc blade assemblies 240, 242 and 244 mounted on the stub shaft by through bolts. Thermocouples (FIG. 9) are supported within the disc cavities to provide cavity temperature signals for the control system.

High temperature alloy rotor blades 246 are mounted on the discs in forming the disc assemblies 240, 242 and 244. Individual blade roots are cooled by air extracted from the outlet of the compressor 181 and passed through a coolant system in the manner previously indicated. The blade roots thus serve as a heat sink for the rotating blades 246. Cooling air also flows over each of the turbine discs to provide a relatively constant low metal temperature over the unit operating load range.

In addition to acting as a pressure containment vessel for the turbine 234, the turbine casing 236 supports stationary blades 248 which form three stationary blade rows interspersed with the rotor blade rows. Gas flow is discharged from the turbine 234 substantially at atmospheric pressure through a flanged exhaust manifold 250 to the outlet ductwork 114.

The generator and gas turbine vibration transducers (FIG. 9) can be conventional velocity transducers or pickups which transmit basic vibration signals to a vibration monitor for input to the control system. A pair of conventional speed detectors (FIGS. 9 and 13) are associated with a notched magnetic wheel (FIG. 13) supported at appropriate turbinegenerator shaft locations. Signals generated by the speed detectors are employed in the control system in determining power plant operation.

Suitable high response thermocouples 237 are symmetrically arranged about the blade path position of gas turbine 234 preferably in one-to-one correspondence each with an associated combustor element 198 to accomplish the blade path temperature sensing of gases discharged from the individual combustor elements. The placement and orientation of the blade path temperature sensing thermocouples 237 is consistent with predetermined angular rotation of the turbine discharge swirl pattern. The individual thermocouples 237 thus provide continuously operative monitoring and detection means for determining a gas discharge temperature value for the combustor elements 198 on an individual basis. A facility is thereby provided for detecting problems of any one combustor in a multiple arrangement and for providing to the gas turbine control system, to be hereinafter more fully described, a plurality of alarm and control inputs to be used in determining alarm status on an individual combustor basket basis as well as in deriving reliable control parameters.

The thermocouple arrangement 237 is located to sense the individual basket discharge temperatures after the discharged gases pass the last row of blades 246. In this manner the sensing equipment is displaced sufficiently from the combustor baskets 198 to ensure superior performance and increased life.

An additional arrangement of thermocouples 239 are supported about the periphery of the exhaust manifold 250 to provide a fast response indication of an average exhaust temperature for control system usage. Such arrangement of thermocouples 239 is provided primarily for the purpose of determining average exhaust temperature during load operations of the power plant 100. However, this arrangement additionally provides a backup system for combustor elements or other turbine system fault or failure detection. Although discharged gases have become mixed to an appreciable degree a correlation yet exists between individual readings of thermocouples 237 and 239.

With the arrangements of thermocouples 237 and 239 fast response indications of combustor element discharge temperatures during all control modes of operation of gas turbine 234 are made available. Reliable safe operation nearer design limits is thereby ensured during both startup and load periods. Thermocouples (FIG. 9) are additionally associated with the gas turbine bearing oil drains.

Thermocouples suitable for purposes of the present invention are those which use compacted alumina insulation with a thin wall high alloy swaged sheath or well supported by a separate heavy wall guide.

e. Fuel System

A fuel system 251 is provided for delivering gaseous fuel to the gas nozzles 222 under controlled fuel valve operation as schematically illustrated in FIG. 7. Gas is transmitted to a diaphragm operated pressure regulating valve 254 from the plant gas source. A pressure switch 255 provides for transfer to oil fuel at a low gas pressure limit. Pressure switches 257 and 259 provide high and low pressure limit control action on the downstream side of the valve 254. It is noted at this point in the description that IEEE switchgear device numbers are generally used herein where appropriate as incorporated in American Standard 037.2-1956.

A starting valve 256 determines gas fuel flow to the nozzles 222 at turbine speeds up to approximately 10% rated flow, and for this purpose it is pneumatically positioned by an electropneumatic converter 261 in response to an electric control signal. At gas flow from 10% to 100% rated, a throttle valve 258 determines gas fuel flow to the nozzles 222 under the pneumatic positioning control of an electropneumatic converter 263 and a pneumatic pressure booster relay 265. The converter 263 also responds to an electric control signal as subsequently more fully considered.

A pneumatically operated trip valve 260 stops gas fuel flow under mechanical actuation if turbine overspeed reaches a predetermined level such as 110% rated speed. A pneumatically operated vent valve 262 allows trapped gas to be vented to the atmosphere if the trip valve 260 and an on/off pneumatically operated isolation valve 264 are both closed. The isolation valve fuel control action is initiated by an electric control signal applied through the pressure switch and gauge cabinet 152 (FIG. 1 and FIG. 9). A pressure switch 267 indicates fuel pressure at the inlet to the nozzles 222.

As schematically shown in FIG. 8, a liquid fuel supply system 266 provides for liquid fuel flow to the eight nozzles 218 from the plant source through piping and various pneumatically operated valves by means of the pumping action of a turbine shaft driven main fuel pump 268. Pump discharge pressure is sensed for control system use by a detector 269. A bypass valve 271 is pneumatically operated by an electropneumatic converter 270 and a booster relay 272 to determine liquid fuel bypass flow to a return line and thereby regulate liquid fuel discharge pressure. An electric control signal provides for pump discharge pressure control, and in particular it provides for ramp pump discharge pressure control during turbine startup. A throttle valve 272 is held at a minimum position during the ramp pressure control action on the discharge pressure regulator valve 270. A pressure switch 269 provides for DC backup pump operation on low pressure, and a pressure switch 271 indicates whether the pump 268 has pressurized intake flow.

After pressure ramping, the pneumatically operated throttle valve 272 is positioned to control liquid fuel flow to the nozzles 218 as determined by an electropneumatic converter 274 and a booster relay 276. An electric control signal determines the converter position control action for the throttle valve 272. The bypass valve 270 continues to operate to hold fuel discharge pressure constant.

As in the gas fuel system 251, a mechanically actuated and pneumatically operated overspeed trip valve 278 stops liquid fuel flow in the event of turbine overspeed. A suitable filter 280 is included in the liquid fuel flow path, and, as in the gas fuel system 251, an electrically actuated and pneumatically operated isolation valve provides on/off control of liquid fuel to a liquid manifold 283.

Eight positive displacement pumps 284 are respectively disposed in the individual liquid fuel flow paths to the nozzles 218. The pumps 284 are mounted on a single shaft and they are driven by the oil flow from the manifold 283 to produce substantially equal nozzle fuel flows. Check valves 286 prevent back flow from the nozzles 218 and a pressure switch 288 indicates fuel pressure at the oil nozzles 218. A manifold drain valve 290 is pneumatically operated under electric signal control during turbine shutdown to drain any liquid fuel remaining in the manifold 283.

4. Plant Performance Characteristics

Details concerning plant performance characteristics are contained in the aforementioned related application Ser. No. 082,470 Section A4, pages 32 to 36.

B. POWER PLANT OPERATION AND CONTROL

1. General

The power plant 100 is operated under the control of an integrated turbine-generator control system 300 which is schematically illustrated in FIG. 9. In its preferred embodiment, the control system 300 employs analog and digital computer circuitry to provide reliable hybrid gas turbine and gas turbine power plant control and operation. The plant control system 300 embraces elements disposed in the control cabinet 118, the pressure switch and gauge cabinet 152 and other elements included in the electric power plant 100 of FIG. 1. If multiple plants like the power plant 100 are to be operated, the control system 300 further embraces any additional circuitry needed for the additional plant operations.

The control system 300 is characterized with centralized system packaging. Thus, the control cabinet 118 shown in FIG. 1 houses an entire speed/load control package, an automatic plant sequencer package, and a systems monitoring package. Up to four turbine generator plants can be operated by the centralized control system 300 and such operation is provided with the use of a single computer main frame. A second control cabinet is required if two or three plants are controlled and a third control cabinet is required if four plants are placed under controlled operation. Generally, the control cabinet package is factory prewired and it and field interconnecting cables are completely checked and calibrated at the factory.

As a further benefit to the plant operator, turbine and generator operating functions are included on a single operator's panel in conformity with the integrated turbine-generator plant control provided by the control system 300. Final field calibration is facilitated by calibration functions for control system variables which can be selectively displayed on the operator's panel. System troubleshooting is facilitated by maintenance functions provided on the operator's panel.

The control system 300 provides automatically, reliably and efficiently sequenced start-stop plant operation, monitoring and alarm functions for plant protection and accurately, reliably and efficiently performing speed/load control during plant startup, running operation and shutdown. The plant operator can selectively advance the turbine start cycle through discrete steps by manual operation and, more generally, can obtain a wide variety of plant management benefits through the operator/control system interfaces subsequently considered more fully.

Under automatic control, the power plant 100 can be operated under local operator control or it can be unattended and operated by direct wired remote or supervisory control. Further, the plant 100 is started from rest, accelerated under accurate and efficient control to synchronous speed preferably in a normal fixed time period to achieve in the general case extended time between turbine repairs, synchronized manually or automatically with the power system and loaded under preferred ramp control to a preselectable constant or temperature limit controlled load level thereby providing better power plant management.

In order to start the plant 100, the control system 300 first requires certain status information generated by operator switches, temperature measurements, pressure switches and other sensor devices. Once it is logically determined that the overall plant status is satisfactory, the plant startup is initiated under programmed computer control. Plant devices are started in parallel whenever possible to increase plant availability for power generation purposes. Under program control, completion of one sequence step generally initiates the next sequence step unless a shutdown alarm occurs. Plant availability is further advanced by startup sequencing which provides for multiple ignition attempts in the event of ignition failure.

The starting sequence generally embraces starting the plant lubrication oil pumps, starting the turning gear, starting and operating the starting engine to accelerate the gas turbine 104 from low speed, stopping the turning gear, igniting the fuel in the combustion system at about 20% speed, accelerating the gas turbine to about 60% speed and stopping the starting engine, accelerating the gas turbine 104 to synchronous speed, and loading the power after generator breaker closure. During shutdown, fuel flow is stopped and the gas turbine 104 undergoes a deceleration coastdown. The turning gear is started to drive the turbine rotating element during the cooling off period.

2. Control Loop Arrangement—Without Hardware/Software Definition

A control loop arrangement 302 shown in FIG. 10 provides a representation of the preferred general control looping embodied in the preferred control system 300 and applicable in a wide variety of other applications of the invention. Reference is made to the aforementioned copending application Ser. No. 082,470, Section B2, pages 39 to 51 wherein there is contained a more detailed discussion of the control loop 302. In FIG. 10, SAMA standard function symbols are employed.

Briefly, the control loop arrangement 302 comprises an arrangement of blocks in the preferred configuration of process control loops for use in operating the gas turbine power plant 100 or other industrial gas turbine apparatus. No delineation is made in FIG. 10 between hardware and software elements since many aspects of the control philosophy can be implemented in hard or soft form. However, it is noteworthy that various advantages are gained by hybrid software/hardware implementation of the control arrangement 302 and preferably by implementation in the hybrid form represented by the control system 300.

Generally, a feedforward characterization is preferably used to determine a representation of fuel demand needed to satisfy speed requirements. Measured process variables including turbine speed, the controlled load variable or the plant megawatts, combustor shell pressure and turbine exhaust temperature are employed to limit, calibrate or control the fuel demand so that apparatus design limits are not exceeded. The characterization of the feedforward speed fuel demand, a surge limit fuel demand and a temperature limit fuel demand are preferably nonlinear in accordance with the nonlinear characteristics of the gas turbine to achieve more accurate, more efficient, more available and more reliable gas turbine apparatus operation. The control arrangement 302 has capability for maintaining cycle temperature, gas turbine apparatus speed, acceleration rate during startup, loading rate and compressor surge margin.

The fuel demand in the control arrangement 302 provides position control for turbine gas or liquid fuel valves. Further, the control arrangement 302 can provide for simultaneous burning of gas and liquid fuel and it can provide for automatic bumpless transfer from one fuel to the other when required.

In the combination of plural control loop functions in the arrangement 302, a low fuel demand selector block 316 is preferably employed to limit the speed reference fuel demand representation if any of three limit representations are exceeded by it during startup. These limit representations are generated respectively by a surge control 318, a blade path temperature control 320, and an exhaust temperature control 322. In this application, a load control block 324 becomes operative after synchronization with the limit blocks 318, 320 and 322.

At the output of the low fuel demand selector 316 the fuel demand representation is applied to a dual fuel control 317 where the fuel demand signal is processed to produce a gas fuel demand signal for application to the gas starting and throttle valves or a liquid fuel demand signal for application to the oil throttle and pressure bypass valve or as a combination of gas and liquid fuel demand signals for application to the gas and oil valves together.

After the generator 102 has been synchronized with the line with the use of the preferred control system 300, the gas turbine speed is regulated by the system frequency if the power system is large and the speed reference applied to the difference block 310 in FIG. 10 is set at a higher value such as 106%. The speed fuel demand signal applied to the input of fuel demand selector 316 thus is normally much higher than other inputs to the selector 316 during system load operation.

As seen, the operation of the plural control loop arrangement 302 varies during different phases or modes of monitoring and control of power plant 100. The five modes of operation will be more fully discussed in Section D8.

Briefly, the control arrangement 302 is implemented such that different process variables are given greater weight in determining a control function to be performed as control progresses sequentially through the modes of operation. For example, as already discussed, control block 324 becomes operative only after synchronization.

Alternative control modes which may be selected on the operator's control panel may be entered after synchronization. Mode 3, or fixed load operation, occurs after the generator and line breakers are closed if minimum load is selected and if fixed load control is included in the control package and selected for operation. In Mode 3 a kilowatt limit is accordingly imposed on the low fuel demand selector 316 in addition to temperature limit backup. On base, peak, or system reserve operation, Mode 4, a kilowatt reference is generated and ramped to the maximum value causing the temperature control to take over and control the load by exhaust or blade path temperature limit.

In addition to Mode 3 and Mode 4, the control modes of operation as defined herein further include Mode 0, Mode 1, and Mode 2. Mode 0 is the pre-ignition mode which applies to the startup period up to approximately 20% speed. During Mode 0 operation, plant status information is determined by the control system 300 for sequencing and protection purposes.

Figure 11:
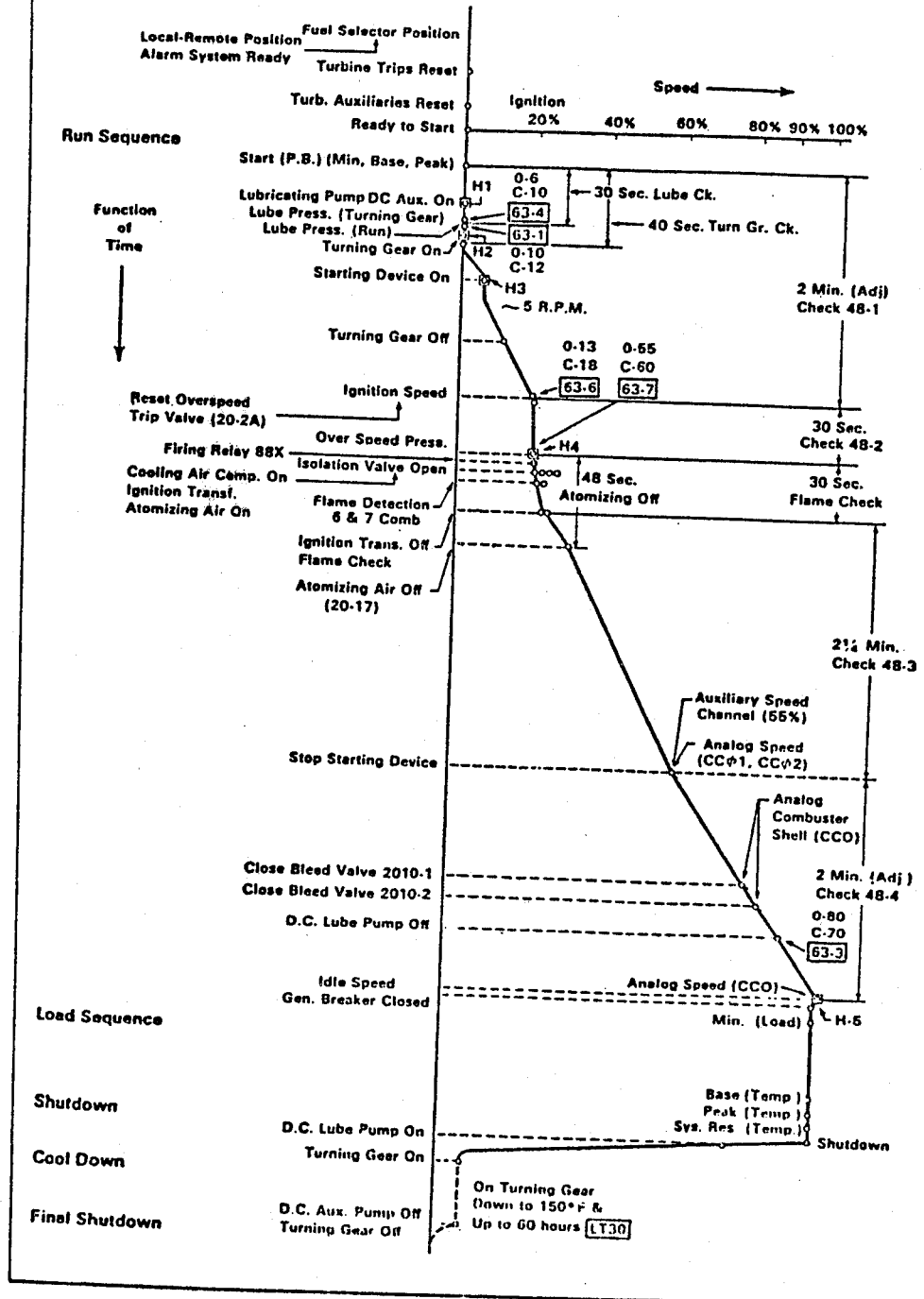
FIG. 11 shows a sequence chart for startup and shutdown operations of the gas turbine power plant.

Reference is made to FIG. 11 where there is shown a schematic diagram representative of the events involved in gas turbine startup embraced by operating Modes 0, 1 and 2 in the preferred embodiment. FIG. 11 also illustrates the sequencing involved in shutdown.

After ignition, the control loops are automatically transferred to Mode 1 by sequencing operations. The speed fuel demand reference is then increased for a normal or an emergency start. In addition, the surge control limit and temperature cutback control action are provided.

During Mode 2 sequence operations transfer the control for synchronization which can be performed manually or automatically. The subject matter of automatic synchronization and its relationship to power plant operations is disclosed in the previously identified Reuther and Reed copending applications Ser. No. 099,491 and WIS 70-01. As in the case of Mode 0 operation, sequence and protection operations are interfaced with the control loops during Mode 1 and 2 operations as generally indicated in FIG. 11.

The control arrangement 302 generally protects gas turbine apparatus against factors including too high loading rates, too high speed excursions during load transients, too high fuel flow which may result in overload, too low fuel flow which may result in combustor system outfires during all defined modes of operation, compressor surge, and excessive turbine inlet exhaust and blade over-temperature.

As readily appreciated from the foregoing discussion, the integrity and reliability of the plural control loop configuration as depicted in FIG. 10 is largely determined as a function of the various temperature indications obtained by strategically located process temperature sensing thermocouples, as for example, those indicated by the reference numerals 237 and 239 of FIG. 5 and hereinbefore discussed in connection with the operation of gas turbine 104.

As may be readily appreciated by reference to the plural control loop configuration depicted in FIG. 10, particular difficulties may arise in the event that the low fuel demand select block 316 receives an inaccurate input from the blade path temperature control block 320 or exhaust temperature control block 322. In this event, the output of low fuel demand selector 316 which is applied to the dual fuel control 317, will indicate an excessive fuel requirement. The fuel demand signal output of dual fuel control 317 will cause an over-supply of fuel to the gas turbine combustor elements 198 (FIG. 3A).

In order to ensure maximum availability of power plant 100, as well as optimum operation of gas turbine 104 consistent with known design limits, control loop arrangement 302 is provided with reliable, accurate temperature indications of gases discharged from each combustor element 198 from which is derived a reliable control average which serves as as input to blade path temperature control block 320 and exhaust temperature control block 322. As hereinabove discussed, inputs to both blocks 320 and 322 are provided by strategically located and optimally arranged thermocouples at both the blade path discharge position 246 and at the exhaust manifold 250. Control outputs are derived from both blocks in accordance with the following formula:

$T_{AV} = \Sigma(T_N/N)$ where:

$T_{AV}$ = average temperature,
N = valid inputs to be averaged.

The validity criterion will be hereinafter more fully discussed in conjunction with computer program operations.

The control arrangement 302 as embodied in the control system 300 meets all requirements set forth in the NEMA publication "Gas Turbine Governors", SM32-1960 relative to system stability and transient response and adjustment capability

3. Control System

The control system 300 is shown in block diagram detail in FIG. 9. It includes a general purpose digital computer system comprising a central processor 304 and associated input/output interfacing equipment such as that sold by Westinghouse Electric Corporation under the trade name PRODAC 50 (P50). Generally, the P50 computer system employs a 16,000 word core memory with a word length of 14 bits and a 4.5 microsecond cycle time. The P50 is capable of handling a large column of data and instructions so as readily to provide for handling the tasks associated with controlling and operating multiple gas turbine plant units as generally considered previously and as more fully considered subsequently.

The P50 core memory is expandable, and by addition of functional modular units the P50 is capable of substantial increase in its analog input capacity, contact closure inputs, and contact closure outputs. Data communication is provided for the P50 by 64 input and output channels, each of which provides a 14 bit parallel path into or out of the computer main frame. The P50 addressing capability permits selection of any of the 64 input/output channels, any of the 64 word addresses for each channel and any of the 14 bits in each word. Over 50,000 points in a process can thus be reached individually by the P50 computer system.

More specifically, the interfacing equipment for the computer 304 includes a contact closure input system 306 which scans contact or other similar signals representing the status of various plant and equipment conditions. The status contacts might typically be contacts of mercury wetted relays (not shown) which are operated by energization circuits (not shown) capable of sensing the predetermined conditions associated with the various plant devices. Status contact data is used for example in interlock logic functioning in control and sequence programs, protection and alarm system functioning, and programmed monitoring and logging.

Input interfacing is also provided for the computer 304 by a conventional analog input system 308 which samples analog signals from the gas turbine power plant 100 at a predetermined rate such as 30 points per second for each analog channel input and converts the signal samples to digital values for computer entry. A conventional teletypewriter system or printer 310 is also included and it is used for purposes including for example logging printouts as indicated by the reference character 312.

A conventional interrupt system 314 is provided with suitable hardware and circuitry for controlling the input and output transfer of information between the computer processor 304 and the slower input/output equipment. Thus, an interrupt signal is applied to the processor 304 when an input is ready for entry or when an output transfer has been completed. In general, the central processor 304 acts on interrupts in accordance with a conventional executive program considered in more detail hereinafter. In some cases, particular interrupts are acknowledged and operated upon without executive priority limitations. There are up to 64 independent available for the central processor 304 in the P50 computer system. Each of the employed interrupt inputs causes a separate and unique response within the computer main frame without need for additional input operations thereby allowing the processing of interrupt input signals with very little main frame duty cycle.

Output interfacing generally is provided for the computer by means of a conventional contact closure output system 316. Analog outputs are transmitted through the contact closure output system 316 under program control as subsequently considered more fully.

The plant battery 132 considered previously in connection with FIG. 1 is also illustrated in FIG. 9 since it provides for operating an inverter 318 which provides the power necessary for operating the computer system, control system and other elements in the power plant 100. The inverter 318 can be an equipment item sold by Solidstate Controls, Inc. and identified as Model No. W-CR-267-DCA. Battery charging is provided by a suitable charger 320.

The contact closure input system 306 is coupled by cabeled wire pairs to the operator's console panel 120, considered previously in connection with FIG. 1, and to a remote operator's panel 322. As shown in FIG. 9, connections are also made to the contact closure input system 306 from the inverter 318 and the battery charger 320 and various turbine, protective relay, switchgear, pressure switch and gauge cabinet, and starting engine contacts. In addition certain customer selected contacts and miscellaneous contacts such as those in the motor control center 130 (FIG. 1) are coupled to the contact closure input system 306.

Figure 12A:
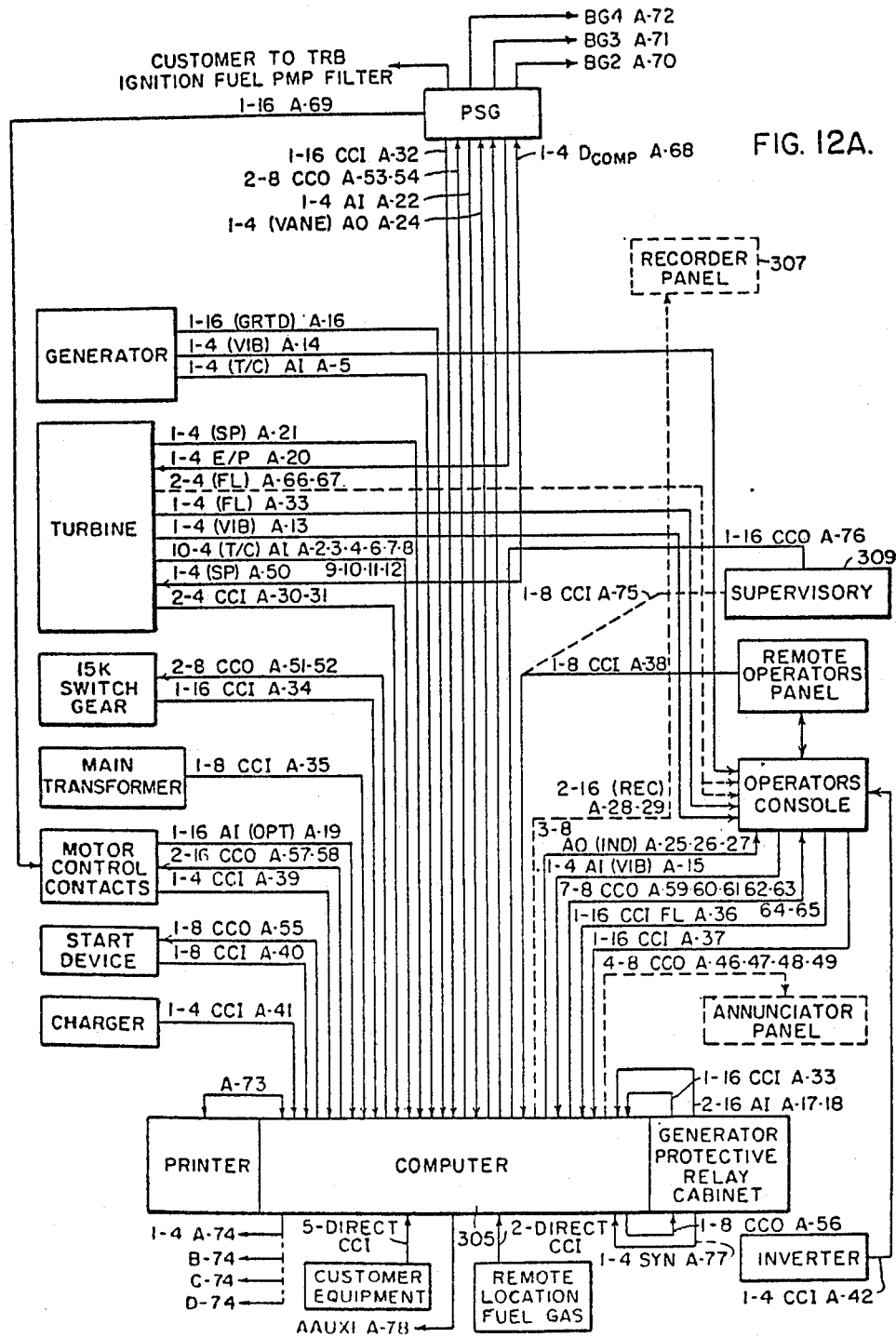
FIGS. 12A–B show a cable and wiring diagram employed for a computer control system and various power plant apparatus elements in a preferred embodiment of the invention.
Figure 12B:
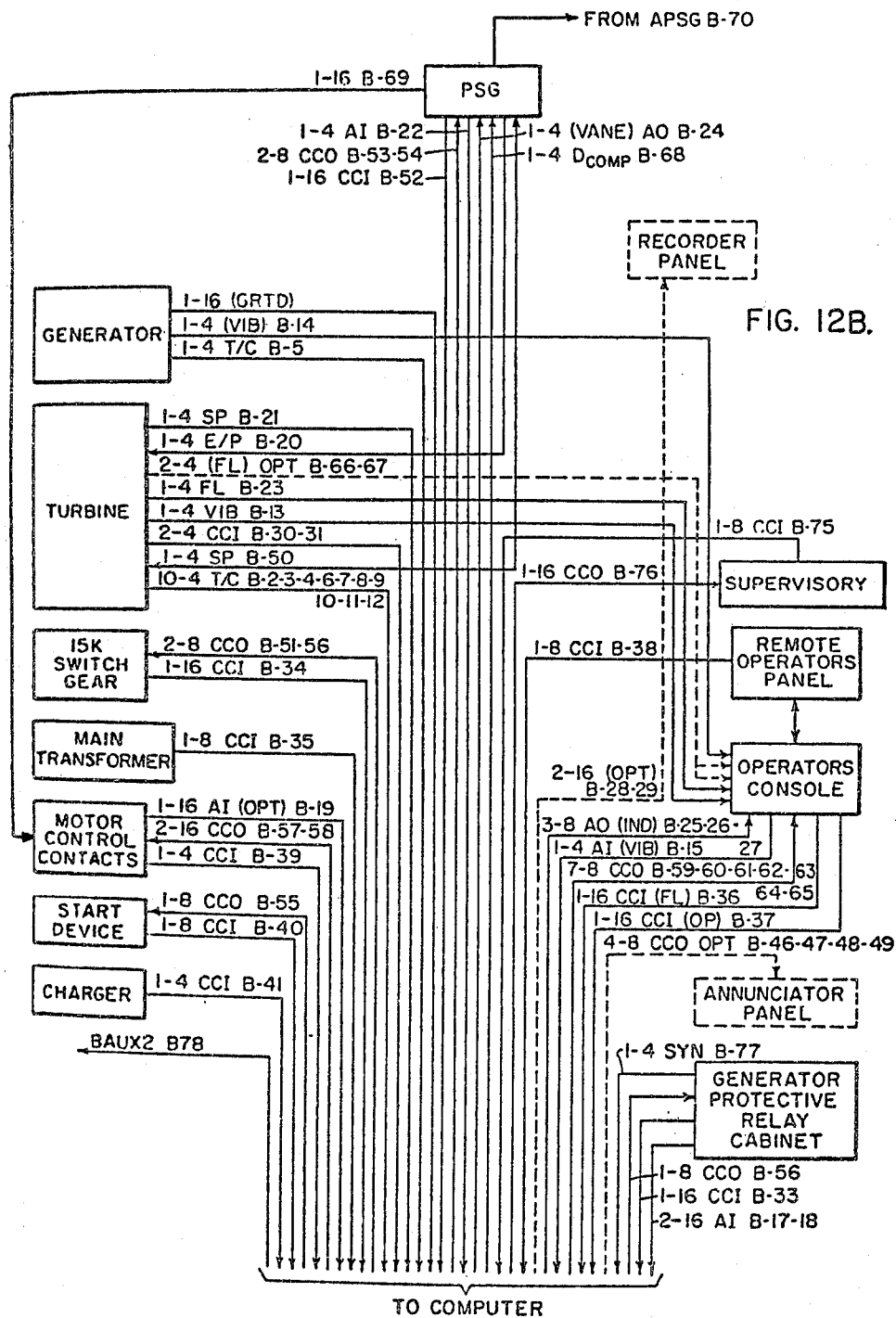

In FIGS. 12A and 12B there is schematically illustrated in cabling diagram generally corresponding to the block diagram shown in FIG. 9. However, the central processor 304 and associated computer system equipment shown in FIG. 9 are grouped together as a single computer system block 305 in FIGS. 12A and 12B. In addition, a recorder panel 307, a supervisory control 309 and an annunciator panel 311 are shown in FIGS. 12A and 12B as options.

Generally, FIG. 12A shows the cabling needed for control system interfacing with a first gas turbine power plant designated by the letter "A", and FIG. 12B shows the cabling needed for interfacing the control system with a second gas turbine power plant designated by the letter "B". As already indicated, a total of four gas turbine power plants can be operated by the P50 computer system and additional cabling diagrams similar to FIG. 12B are provided when needed for the other two gas turbine plants C and D.

Each line connection in FIG. 12A and FIG. 12B includes a designation which identifies the mnemonic, the cable size and the type of coupling or function. For example, the designation for the topmost turbine connection in FIG. 12A indicates that its identification is A21 and that there is one four-wire pair cable used for at least one speed feedback signal. Contact closure inputs associated with the contact closure input system 306 in FIG. 9 are represented by the symbol CCI on the line connections in FIGS. 12A and 12B. The symbol CCO refers to contact closure outputs and the symbol AI refers to analog inputs.

The P50 analog input system 308 has applied to it the outputs from various plant process sensors or detectors, many of which have already been briefly considered. Various analog signals are generated by sensors associated with the gas turbine 104 for input to the computer system 305 where they are processed for various purposes. The turbine sensors include eight blade path thermocouples, eight disc cavity thermocouples, eight exhaust manifold thermocouples, eight bearing thermocouples, compressor inlet and discharge thermocouples, and, as designated by the block marked miscellaneous sensors, two oil reservoir thermocouples, a bearing oil thermocouple, a control room temperature thermocouple, and a main fuel inlet thermocouple.

A combustor shell pressure sensor and a main speed sensor and a backup speed sensor also have their output signals coupled to the analog input system 308. The speed sensor outputs are coupled to the analog input system 308 through an analog speed control 324 and an auxiliary speed limiter 326, respectively. A speed reference signal and a speed/load limit signal generated as outputs by the computer 304 and a fuel demand signal developed by the analog speed control 324 are all coupled to the analog input system 308 from the analog speed control 324. A turbine support metal thermocouple is included in the miscellaneous block.

Sensors associated with the generator 102 and the plant switchgear are also coupled to the computer 304. The generator temperature sensors include six stator resistance temperature detectors, an inlet air thermocouple, an outlet air thermocouple, and two bearing drain thermocouples. Vibration sensors associated with the generator 102 and the gas turbine 104 are coupled with the analog input system 308 through the operator's console 120 where the rotating equipment vibration can be monitored. As indicated by the blocks in FIG. 9, additional sensors which are located in the protective relay cabinet generate signals representative of various bus, line, generator and exciter electrical conditions. The operator's panel 120 also generates analog inputs including five calibration input connections as indicated by the reference character 328.

Various computer output signals are generated for operating meters at the operator's console 120 (or for operating recorders which are optional as shown in FIG. 12A) and they are applied as computer analog inputs as indicated by the reference character 330. Each instrument output circuit included in an instrument output block 331 comprises an integrating amplifier which operates in a manner like that describes subsequently in connection with the analog output integrating amplifier employed for converting the computer digital speed reference output to an analog signal value.

With respect to computer output operations, the contact closure output system 316 transfers digital speed reference, speed/load limit and fuel transfer outputs to external circuitry as indicated respectively by the reference characters 332, 334 and 336. The coupling of the contact closure output system 316 with the analog speed control 324 is within the framework of the preferred software/hardware hybrid control system. Another contact closure output 338 to the analog speed control 324 provides for a minimum fuel flow into the turbine combustor system in order to prevent flameout after ignition.

An analog dual fuel control system 337 is operated by the speed control 324 to determine the position of the liquid and gas fuel valves considered in connection with FIGS. 9 and 10. A contact closure output coupling to the dual fuel control 337 provides for transfer between fuels or relative fuel settings for two fuel or single fuel operation as indicated by the reference character 336. A guide vane control circuit 338 is also operated by the speed control 324 to control the position of the guide vanes through a guide vane electropneumatic converter 340 which actuates the positioning mechanism.

The contact closure output system 316 is also connected to the operator's panel 120 and to sequence the starting engine 126. A synchronizer detection circuit 342 has bus, line and generator potential transformers coupled to its input and the contact closure output system 316 signal provides a visual panel indication for manual synchronization. The detection circuit 342 also applies signals to the analog input system 308 for automatic synchronization when such synchronization is employed as considered more fully in the aforementioned Reuther and Reed copending patent applications.

Other devices operated by contact closure outputs include the generator field breaker and the generator and line breakers 132 and 137. The motor operated generator exciter field rheostats 171 and 177 and various devices in the motor control center 130 and the pressure switch and gauge outputs. The printer or teletype 310 is operated directly in a special input/output channel to the main frame 304.

ANALOG CIRCUITRY

Figure 13A:
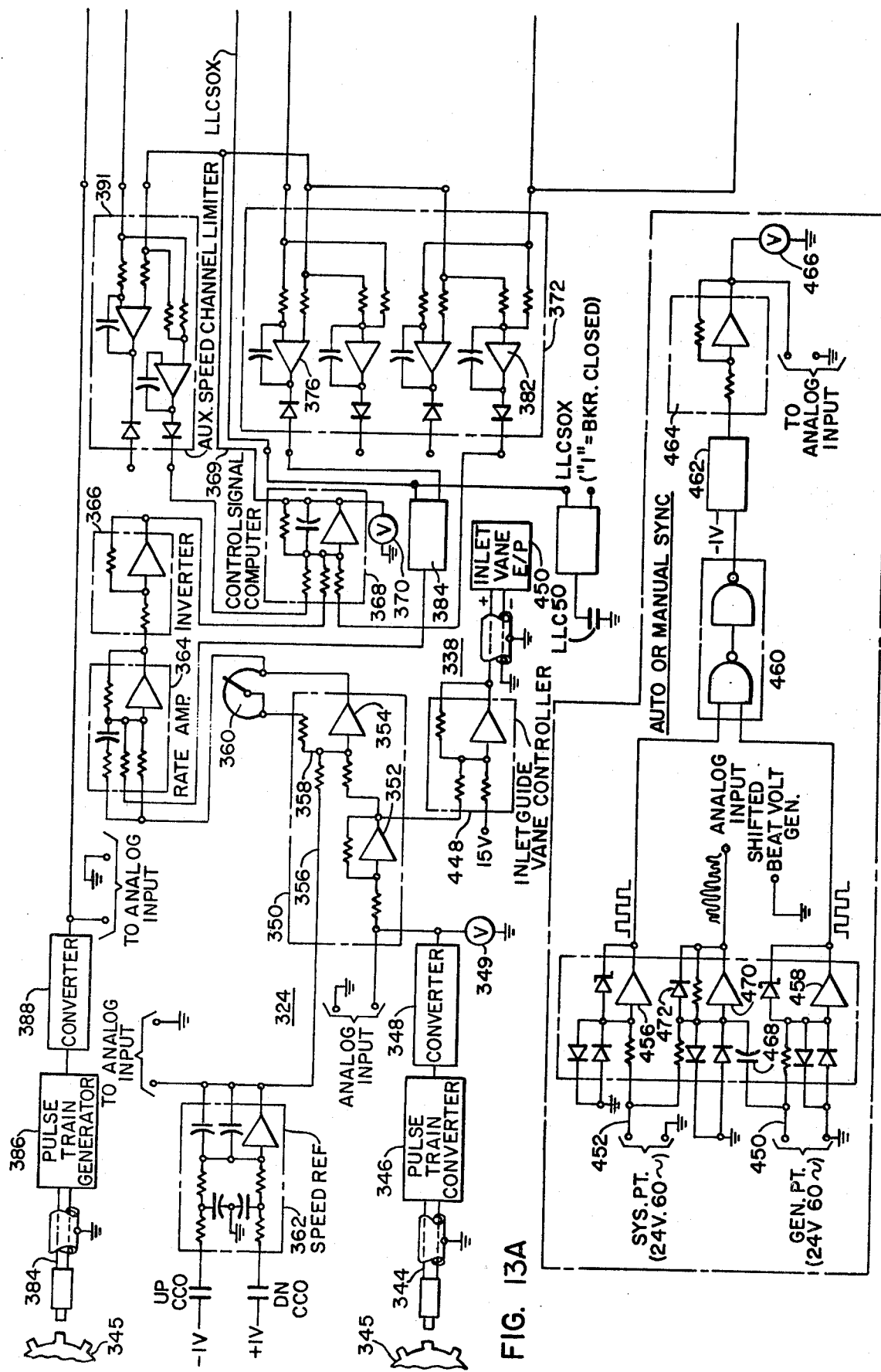
FIG. 13 shows a schematic diagram of analog circuitry associated with the computer in the control system to provide control over gas turbine fuel supply system operations and certain other plant functions.
Figure 13B:
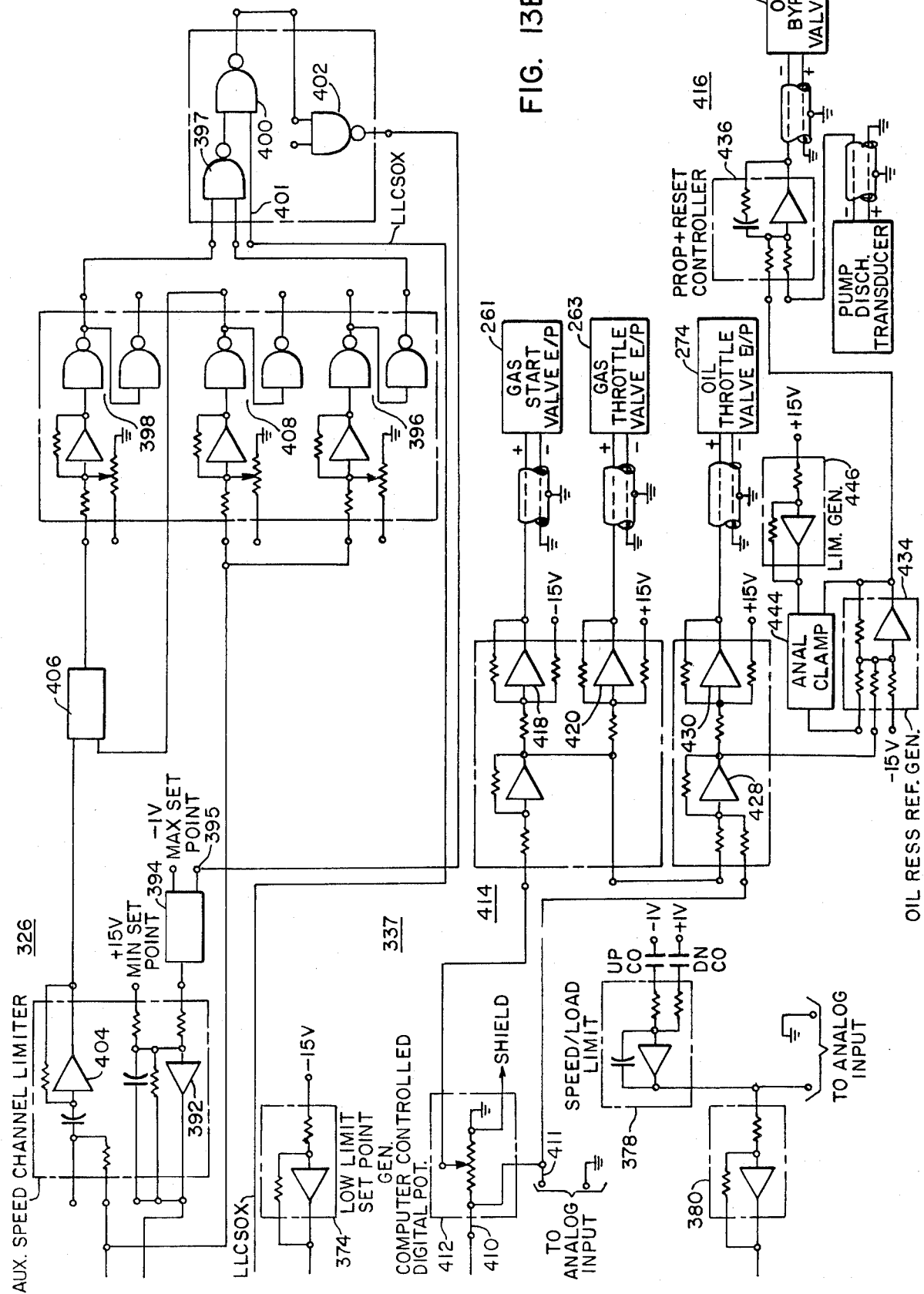

The speed control circuit 324 operates in response to a main speed signal generated by a main turbine speed sensor 344 associated with a 44 tooth magnetic rotor wheel 345 as shown in greater detail in FIG. 13. The speed sensor 344 is a conventional reluctance type device which generates a sinusiodal output waveform. Circuit block 346 converts the sinusoidal speed signal into an output signal having a constant width pulse at twice the input frequency.

Generally, the circuit block 346 includes a zero crossing sense amplifier which produces a pulse of approximately 15 microseconds duration every time the input waveform crosses zero. Within block 346 the input is compared with zero by a two stage comparator which changes state every time the input crosses zero. The edges of the comparator square wave output are differentiated to produce a pulse train having twice the input frequency. In turn, the resultant output pulse train is applied to counter enable circuitry which initiates the operation of a clocked counter on the occurrence of each pulse. The counter enables circuitry is reset by the clocked counter 85 microseconds after the application of each set pulse. Accordingly, a circuit block output is generated by the counter enable circuitry in the form of a train of 85 microsecond pulses occurring at twice the input frequency.

The output pulse train from the circuit block 346 is applied to circuit block 348 which converts the pulse train into a direct voltage proportional to the pulse frequency. Generally, the circuit block 348 comprises a transistor switch network which is coupled to an R-C averaging network. The ON time of the transistor switch network is a constant 85 microseconds but the OFF time varies inversely with the input frequency. The averaging network generates a DC voltage output which is amplified and it is a function of the relationship between the ON and OFF times of the transistor switch network. Accordingly, the amplitude of the averaging network output is directly proportional to the frequency of the input constant width pulse train.

From the circuit block 348, an output is applied to a turbine speed meter 349 and to the input of an error detector circuit block 350. It is noted at this point in the description that each circuit block in FIG. 13 denotes a circuit card which is mounted in the control cabinet.

The actual speed signal at the output of the circuit block 348 is also applied to the analog input system 308 (FIG. 9). The computer thereby obtains a representation of the actual turbine speed determined by the main turbine speed sensor 344.

At the input of the speed error detector circuit 350, the speed signal is amplified and inverted by an operational amplifier 352. It is then applied to the input summing junction of an error detector operational amplifier 354.

A speed reference signal as indicated by the reference 356 and an adjustable speed regulation feedback signal indicated by the reference character 358 are also applied to the error detector summing junction. An adjustable potentiometer 360 determines the gain of the amplifier 354 by determining the magnitude of the amplifier circuit feedback signal, and the potentiometer resistance variation provides for adjustment in the gain and the speed regulation over a range from 2% to 6%.

The speed reference signal is an analog signal obtained from an analog output circuit block 362 which operates as a digital to analog converter in responding to a speed reference signal generated at the computer output in digital form. Generally, the analog output block 362 comprises an integrating amplifier to which up and down computer contact closure outputs are coupled. Programmed computer operation determines the period of closure of the respective contact outputs to determine the output voltage from the analog output block 362. In turn, the output voltage from the analog output block 362 is coupled to the computer 304 through the analog input system 308. The output contacts associated with the block 362 are held open when the speed reference analog voltage is detected to be at the digital command value.

With reference again to the error detector block 350, the summation of the speed reference, actual speed and speed feedback regulation signals results in the generation of a speed error output signal for application to a proportional plus rate amplifier 364. The amplified speed error signal is then inverted to obtain the correct polarity by an inverter block 336. If no fuel command limit action is applied, the speed error signal is further amplified by a mixer amplifier circuit block 368 to generate a contact signal output (CSO) or a fuel demand signal on line 369 for input to the fuel control system 337 and for fuel demand or control output signal monitoring by meter 370.

A clamp circuit block 372 includes two circuits which are used to impose high and low limits on the fuel demand signal. A low limit setpoint of 1.25 volts is generated by a low limit setpoint generator circuit block 374 and applied to the negative input of clamp amplifier 376 for comparison with the fuel demand signal which is applied to the positive input from the fuel demand amplifier 368.

Similarly, a high limit for the fuel demand signal is established by a setpoint signal generated by an analog output circuit block 378 and an inverter 380 and applied to the positive input of another clamp amplifier for comparison with the fuel demand signal which is also applied to the positive clamp amplifier input. The computer output signal coupled to the analog output block 378 is the lowest of the fuel demand limit representations generated by control blocks 318, 320, 322 and 324 (FIG. 10) upper programmed computer operation.

The output of the clamp amplifier 382 is coupled to the input of the amplifier block 368 to produce low select fuel demand limit action on the fuel demand signal. Similarly, the output of the clamp amplifier 376 is applied to the input of the proportional plus rate amplifier 364 through an analog switch 384 which becomes conductive if a low fuel limit signal LLCSOX has been generated by the computer, i.e. if the fuel demand signal has reached 1.25V, to prevent flame out particularly on load transients through low limit fuel demand action.

If the fuel demand signal tends to drop below 1.25 volts, the low limiter clamp amplifier 376 operates through the analog switch 384 to clamp the input to the proportional plus rate amplifier at a level which results in the fuel demand signal output from the circuit block 368 having a voltage level of 1.25 volts. Similarly, the high limiter clamp amplifier 382 clamps the fuel demand amplifier 368 to prevent the fuel demand signal from exceeding the present value of the fuel demand limit as determined and output by the computer 304.

The auxiliry or backup speed limiter 326 is preferably employed to provide backup speed protection in conjunction with the main speed control 324. The turbine speed value at which the backup speed protection is provided is above the maximum speed range over which the speed control 324 is intended to provide control. For example, the maximum speed reference value within the speed control range of the speed control 324 may be 104% rated speed and the auxiliary speed limiter circuit 326 may provide backup speed limit protection at a speed of 108% rated. The mechanical backup speed limiters associated with the fuel system referred to previously in connection with FIGS. 9 and 10 then provide further backup speed protection at a speed of 110% rated.

An auxiliary speed sensor 384 cooperates with the tooth magnetic wheel 345 on the turbine-generator rotating element to generate a sinusiodal speed signal in the manner described for the main speed sensor 344. A pulse train is then generated by pulse train generator block 386 in the manner described for the circuit block 346 in the main speed control channel. Next, a converter block 388 generates an analog speed signal in response to the pulse train output from the circuit block 386 in the manner considered in connection with the main speed converter circuit 348.

The backup speed limit is imposed on the turbine operation by an analog clamp circuit 390 in circuit block 391. The output of the amplifier clamp circuit 390 is applied to the summing junction input of the mixing amplifier 368 to produce limit action of the fuel demand signal generated by the amplifier 368 in a manner similar to that described in connection with the limit action produced by the clamp amplifier circuit 376.

More particularly, the backup speed clamp amplifier circuit 390 causes the fuel demand signal to be cut back to the minimum value of 1.25 volts to cause turbine deceleration without flameout when a speed limiter setpoint generator circuit 392 is caused to apply a low limit setpoint of $-1.25$ volts to the positive input of the clamp amplifier for comparison with the fuel demand signal which is also applied to the positive input. An analog switch 394 is made conductive by input 395 to couple a one volt supply to the input of the setpoint generator circuit 392 and cause the generation of the low limit setpoint if either of two logic conditions is satisfied.

To provide low limit setpoint generation and auxiliary speed backup protection if the turbine speed exceeds the predetermined limit value of 108% as a first logic condition, the auxiliary speed signal is applied to the input of a comparator circuit 396 which generates an output signal for application to an OR circuit 397 when the speed signal is too high. An AND circuit 400 responds if LLCSOX exists to generate a switching signal at the input 395 of the analog switch 394 through a logic inverter 402.

The second logic condition which causes auxiliary speed backup limit protection is preferably included so that the turbine operation is cut back if the rate of speed change is too great at any turbine speed value over a predetermined speed range such as 102% rated speed to 108% rated speed. For this purpose, the auxiliary speed signal is applied to the input of a rate amplifier 404 which generates a speed derivative signal applied to the switching path of an analog solid state switch 406.

The speed derivative signal is coupled through the switch path of the switch 406 to the input of another comparator 398 if the turbine speed is above the bottom range value of 102% rated speed. As indicated by reference character 407, a switching action input is applied to the speed derivative analog switch 406 by a comparator 408 if the auxiliary speed signal applied to its input exceeds the predetermined value corresponding to 102% rated speed. If the turbine speed is excessive, the speed derivative signal is compared to a predetermined acceleration limit by the comparator 398. If the acceleration is also excessive, an output from the comparator 398 is coupled through the logic circuits 397, 400 and 402 to the control input of the logic switch 394 which causes low limit action on the fuel demand signal through the clamp amplifier 390 as already described.

The fuel demand signal generated at the output of the fuel demand amplifier 368 accordingly is representative of the fuel needed to satisfy the computer generated speed reference, the fuel needed to satisfy a computer determined limit action, the low limit fuel demand needed to prevent flameout during normal speed operations, or to cause turbine speed cutback without flameout when overspeed conditions are detected by the auxiliary speed limiter circuit 326. At an input 410 to the dual fuel control system 337, the fuel demand signal is applied across a digital potentiometer 412 which is illustrated schematically as an analog potentiometer. The fuel demand signal is also applied to the computer analog input system 308 for programmed computer operations as indicated by the reference character 411.

In the leftmost position of the dual fuel demand potentiometer 412, the fuel demand signal is fully applied to a gas fuel control system 414. In the rightmost potentiometer position, the fuel demand signal is fully applied to a liquid fuel control system 416. At intermediate potentiometer positions, the total fuel demand signal is ratioed between the gas and fuel control systems 414 and 416 to produce the individual fuel flows which satisfy gas turbine operation commands.

The digital potentiometer position is determined by programmed computer operation of contact output closures to produce the desired fuel or mixed fuel flow to the burners. Fuel transfer operations are also placed under automatic computer control through the digital potentiometer 412, but that subject is considered more fully in the aforementioned copending Reuther application.

Figure 14:
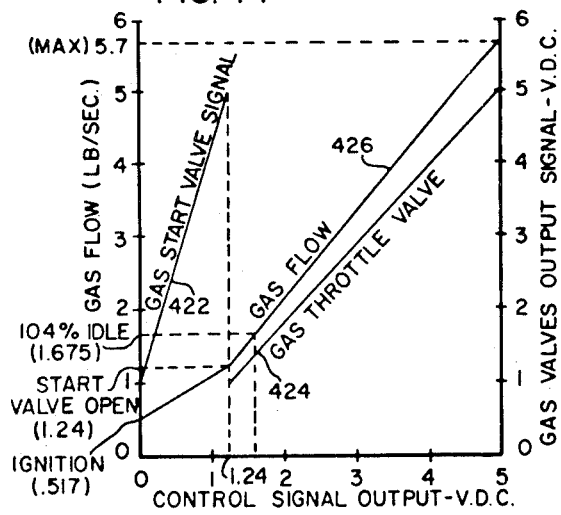

The gas fuel demand signal is applied to the input of a signal range adjuster amplifier 418 to produce the predetermined gain and bias characterization for operation of the gas start valve. Similarly, the gas demand signal is applied to the input of a signal range adjuster amplifier 420 to provide the predetermined gas throttle valve characterization. In FIG. 14, there are shown the respective characterizations 422 and 424 for the adjuster amplifiers 418 and 420. Further, there is shown a net starting valve and throttle valve gas flow characteristics 426 which results from the characterized control placed on the starting valve and throttle valve electropneumatic converters by the amplifiers 418 and 420 as a function of the fuel demand control signal.

The gas fuel demand signal and the total fuel demand signal are differenced at the summing junction of an operational amplifier 428 to generate the liquid fuel demand signal. As already indicated, the liquid fuel demand signal is equal to the total fuel demand signal when the potentiometer 412 is positioned at its rightmost location to make the gas fuel demand signal zero.

Figure 15:
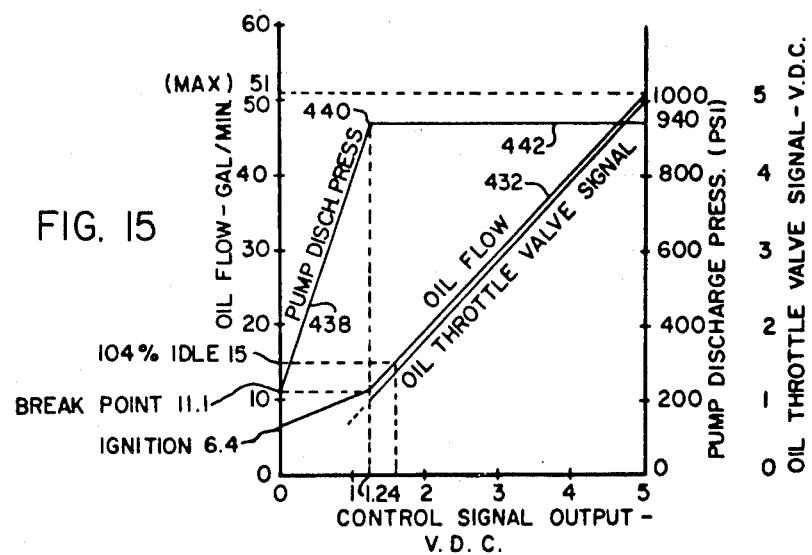
FIGS. 14–16 show certain control signal characteristics associated with the analog circuitry of FIG. 13.

A signal range adjuster amplifier 420 operates on the liquid fuel demand signal to produce control on the liquid fuel throttle valve electropneumatic converter in accordance with the characteristic 432 shown in FIG. 15. The oil demand signal is also applied to the input of an oil pressure reference generator 434 which generates a ramp reference for a proportional plus reset rate controller 436. The pump discharge pressure transducer (FIG. 8) generates a feedback signal which is summed with the ramp reference and the resultant error signal is operated upon with proportional plus reset plus rate action by the controller 436 to operate the liquid fuel bypass valve electropneumatic converter 270 in accordance with the pump discharge pressure characterization indicated by the reference character 438 in FIG. 15. When gas fuel is selected, the oil discharge pressure is regulated to a predetermined minimum value.

When the liquid fuel demand signal reaches a value of 1.25 volts, the pump discharge pressure ramp is terminated as indicated by the reference character 440 in FIG. 15 and the pump discharge pressure is then held constant as indicated by the reference chamber 442 for higher liquid fuel demand signals. Thus, an analog clamp circuit 444 compares a limit voltage generated by a limit setpoint generator 446 to the oil pressure reference signal and clamps the output from the oil pressure reference generator 434 at a value which causes the pump discharge pressure to remain constant at the value indicated by the reference character 442.

Figure 16:
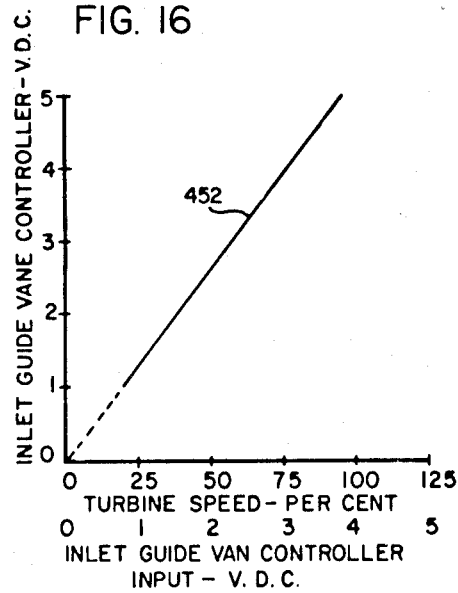
Figure 15:
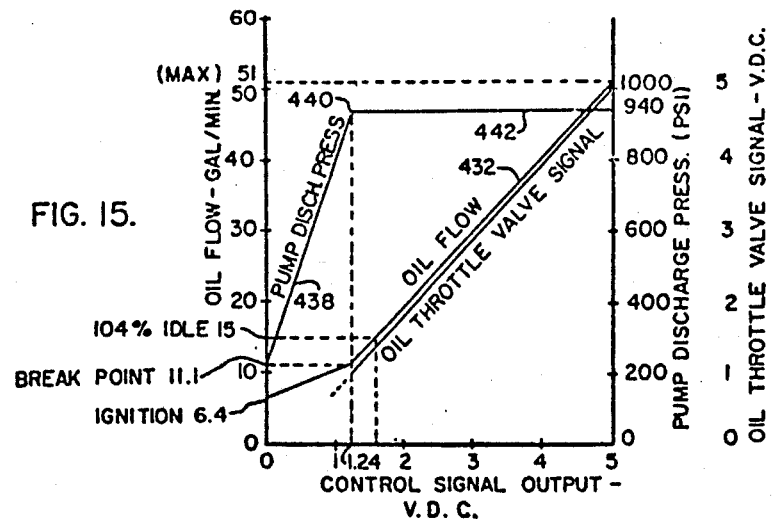
Figure 14:
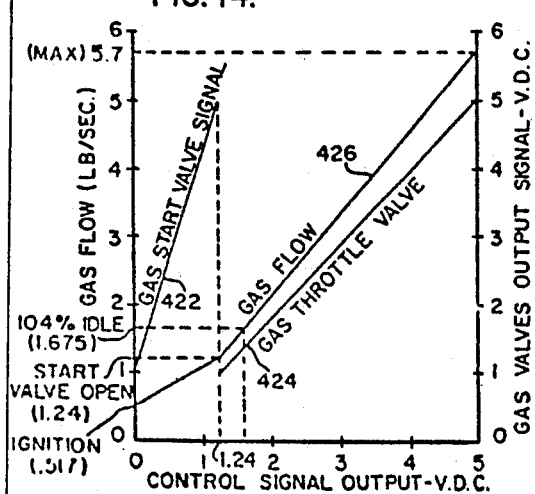
Figure 16:
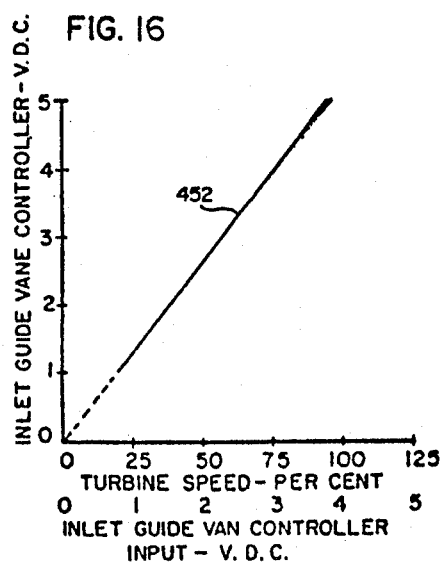

The inlet guide vane control 338 considered previously in connection with FIG. 9 includes a controller 448 which generates a guide vane position control signal as a linear function of the sensed speed signal derived from the error detector block 350 in the main speed channel. An inlet vane electropneumatic converter 450 is provided for operating the previously mentioned positioning ring of the guide vane assembly. As illustrated in FIG. 16, the controller position control signal characteristic 451 provides for a minimum open guide vane position at the 20% ignition speed value and increased opening of the guide vanes with increased turbine speed until the guide vanes are at the maximum open position at approximately 95% rated turbine speed.

The synchronizer detection circuit 342 is responsive to sensed system voltage derived in this case from a bus potential transformer as indicated by the reference chamber 452 and sensed generator voltage derived in this instance from a generator potential transformer as indicated by the reference chamber 454 to detect the relative conditions of the two sensed waveforms for operator or automatic synchronization of the generator 102 with the system by closure of the generator breaker after completion of the startup period. For line breaker synchronization, the inputs are computer switched to the proper potential transformers. Respective square wave signals are generated by Zener diode clipped amplifiers 456 and 458 to which the system and generator voltage signals are respectively applied.

The two square waves are applied to an AND circuit block 460 which generates an output only when both squarewave signals are in the ON condition. In turn, an analog switch 460 applies an input to a phase difference amplifier 464 during the time period that a signal is generated by the AND circuit block 460.

The output voltage from the phase difference amplifier is proportional to the phase difference between the generator and system voltage and it is applied to an operator's panel voltmeter 466 for use by the plant operator during manual synchronization. At the extreme limits, a 180° phase difference results in a phase difference voltage approaching zero volts and a 0° phase difference results in a phase difference voltage of 5 volts. The phase difference voltage is also applied to the computer 304 through the analog input system 308 when programmed automatic synchronization is employed.

It is also noteworthy that the generator voltage signal is phase shifted 90° by a capacitor 468 for vector summation with the system voltage signal at the input of a beat voltage generator amplifier 470. A diode 472 operates in the amplifier circuit to cause a beat frequency signal to be generated for input to the computer 304 through the analog input system 308 as a relative speed indication for programmed automatic synchronizing.

Control Panels

Figure 17A:
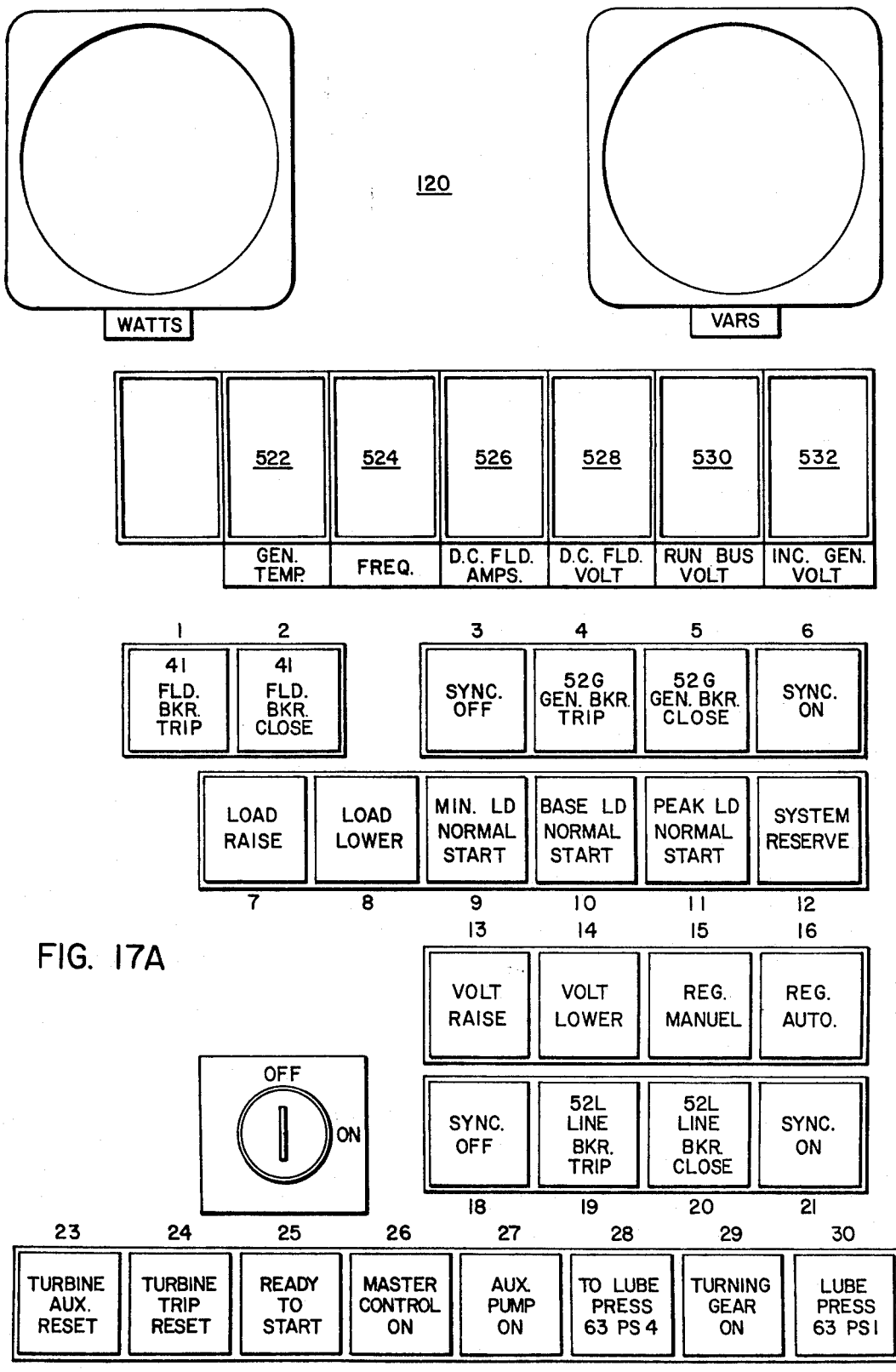
FIGS. 17 and 18 respectively show front plan views of a local operator's panel and a remote operator's panel employed in the control system.
Figure 17B:
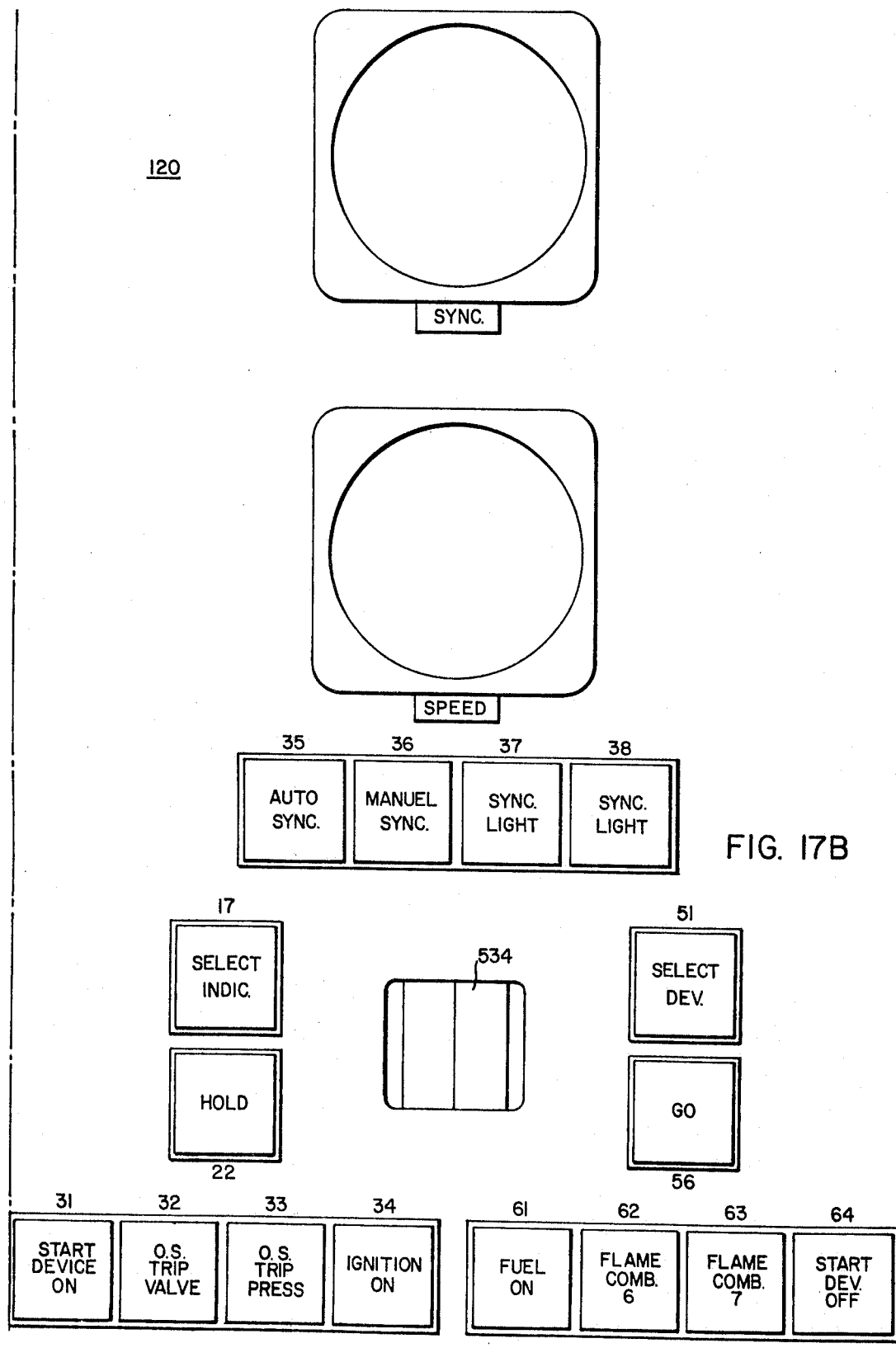
Figure 17C:
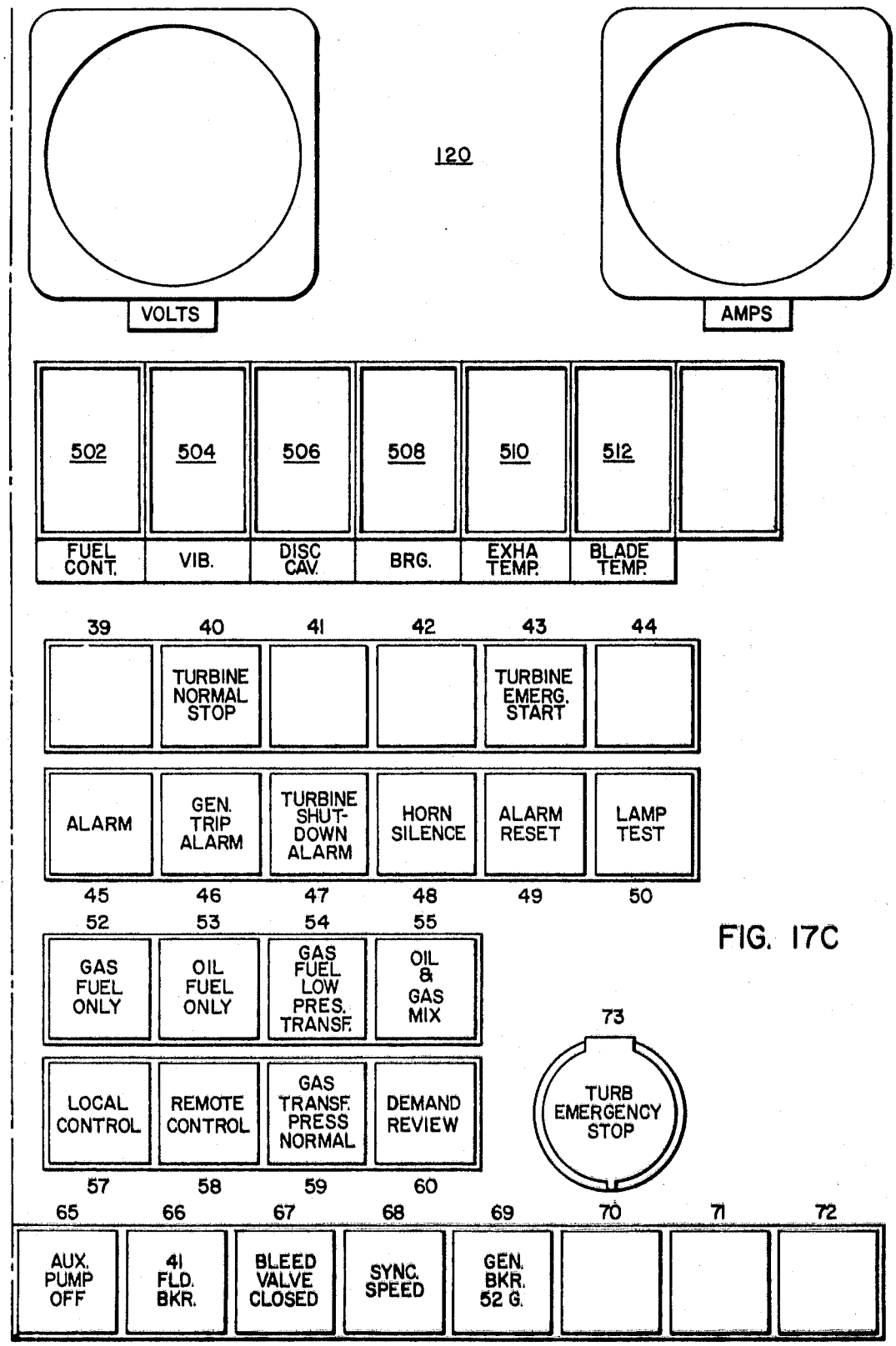

The operator's panel 120 considered in connection with FIG. 1 is included as part of an operator's console and it is shown in greater detail in FIG. 17. Continuous display meters are provided for various turbine and generator variables. Representative of such are the following:

Turbine Speed (Dual Scale)—(349)
Fuel Demand Signal—(502)
Vibration (Turbine or Generator)—(504)
Disc Cavity Temperature—(506)
Bearing Temperature (Turbine or Generator)—(508)
Exhaust Temperature—(510)
Blade Path Temperature—(512)
Watts (Dual Scale Optional)—(514)
VARS—(516)
Phase Difference for Synchronizing—(466)
Volts (Dual Scale Optional)—(518)
Amperes (Dual Scale Optional)—(520).

The SELECT INDICATOR and SELECT DEVICE pushbuttons are used in conjunction with a two decade thumbwheel switch 534 to select and display the desired quantities. Each selective display meter has an assigned number which can be set into the thumbwheel switch to cause that meter to be turned off when the SELECT INDICATOR pushbutton is pressed.

Generally, a plurality of control pushbuttons are located in the illustrated arrangement beneath the meters just considered. One word of contact closure inputs and one interrupt is assigned to the operator panel 120. Identical additional assignments are made for each additional operator's panel used under multiple gas turbine plant control. Within the fourteen bit contact closure input word, eight bits are assigned for reading the two decade thumbwheel switch 534 and the other six bits are employed to identify the pushbutton depressed to produce the computer input.

All of the pushbuttons cause a circuit to be closed while depressed so as to cause a single normally open pushbutton contact to be connected to a dioxide matrix. A pushbutton operation energizes the common interrupt for the operator's panel 120 and applies voltage to a unique combination of the six bits assigned to the pushbutton. The contact closure input word is read within milliseconds and the bit combination is stored for further processing.

The breaker pushbutton control switches are effective only under local, manual synchronizing control. The manual synchronizing equipment must be in service to close the line breaker.

Synchronizing ON and OFF pushbuttons are associated with both the generator and line breaker pushbuttons. The SYNC ON lamps are in parallel to display the fact that the synchronizing equipment is in use regardless of the row of breaker pushbuttons under observation.

The AUTO SYNC and MANUAL SYNC pushbuttons provide for selecting the synchronizing mode to provide for generator breaker closing after the gas turbine 104 has been accelerated to idle speed.

With respect to gas turbine control, pushbuttons are provided for both normal and emergency starting and stopping. The emergency stop operation causes immediate opening of the generator circuit breaker and turbine shutdown. The normal stop operation first reduces the load to minimum (approximately 10%) and turbine shutdown is then initiated.

On emergency start, the gas turbine unit 104 is driven to the base load level of operation after it has reached idle speed and the generator breaker has been closed. However, a different load can be selected if desired. The LOAD RAISE and LOAD LOWER pushbuttons provide manual control over speed reference during synchronizing in Mode 2 and during temperature control in Mode 4. In Mode 3, these pushbuttons control the kilowatt reference.

The operator is provided with generator control by VOLT RAISE and VOLT LOWER pushbuttons which control generator voltage during manual synchronization and after manual or automatic synchronization. A pair of pushbuttons are also provided to control a pair of contact closure outputs from the computer 304 to place the generator voltage regulator on automatic or manual operation.

Pushbuttons are also provided for fuel selection, in this instance gas or oil or an oil and gas mix. Another pushbutton provides for automatic transfer between gas and oil prior to burner ignition or after synchronization or from gas to oil on loss of gas supply pressure. The gas turbine unit 104 can be started on gas or oil, and if a fuel mix is selected, the gas turbine 104 starts on gas and mixes oil to a predetermined ratio after synchronization. The predetermined gas/oil ratio in the fuel mix can be varied with the use of the thumbwheel switch 634 and the SELECT DEVICE and SELECT INDICATOR pushbuttons.

Alarm condition indications are provided by alarm lights and a horn blow. Associated panel pushbuttons are HORN SILENCE, ALARM RESET and LAMP TEST. Startup sequence lights are located in a row across the bottom of operator's panel 120. Some of the startup sequence lights are pushbuttons such as Turning Gear On, which can be depressed before or during a startup to cause the startup sequence to hold at the process point represented by the pushbutton. A HOLD pushbutton causes the speed reference to stop advancing during acceleration, and it is automatically cleared on shutdown. The operator's panel 120 also provides for selection of local control or remote control by the associated pushbutton. A DEMAND REVIEW pushbutton provides for printout of current alarm conditions.

An annunciator panel to which reference was previously made in connection with FIG. 12 can be mounted on top of the operator's panel 120 on the control console. The annunciator panel can be part of an alarm system and it contains a predetermined number of lamps driven by respective contact closure outputs from the computer 304.

The vibration monitors to which reference has already been made are also mounted in the operator's control console. Similarly, flame detection monitors are mounted at the control console.

Figure 18:
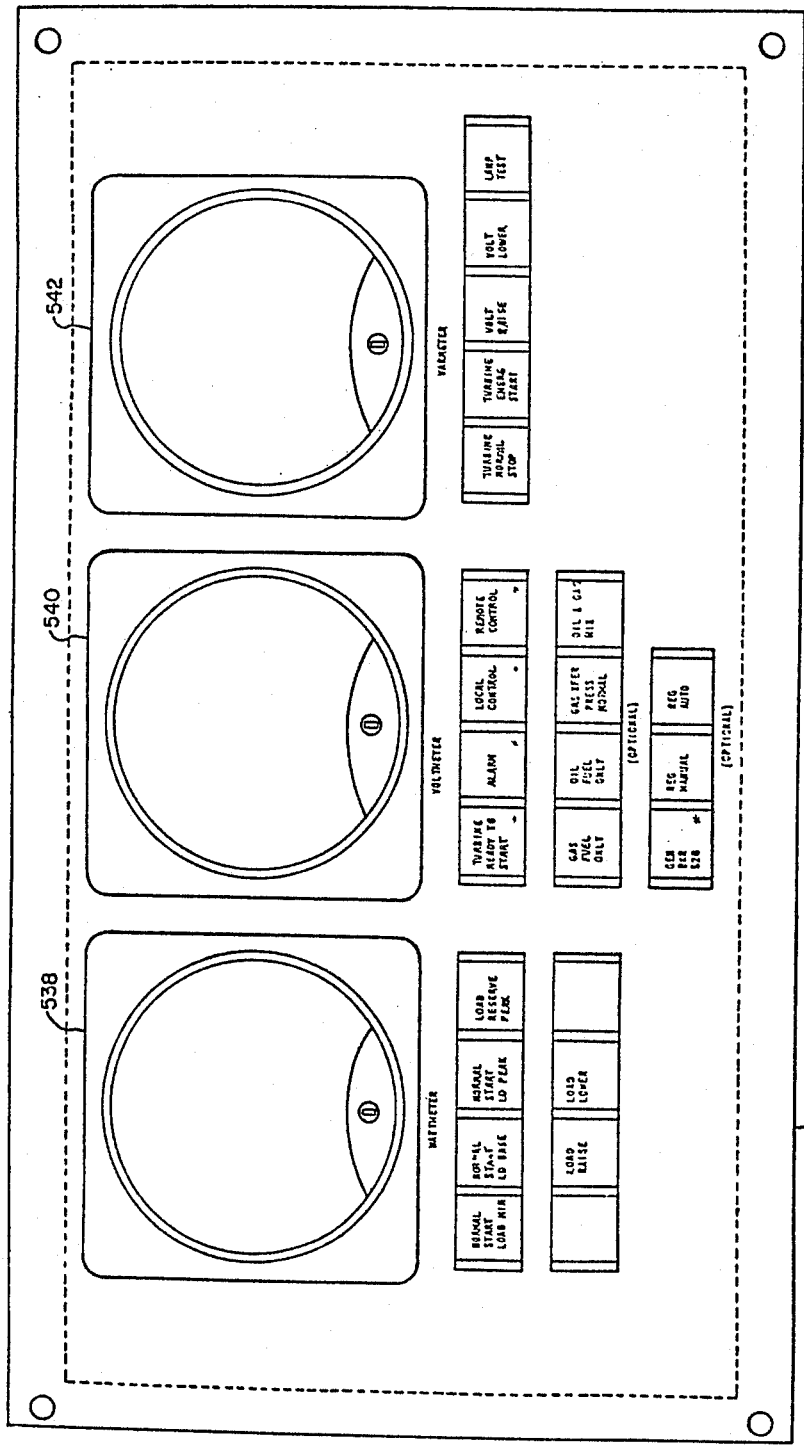

A remote control panel 536 is shown in greater detail in FIG. 18. It includes meters 538, 540 and 542 which display the indicated quantities or quantities selected at the local operator's panel in the manner previously indicated. The remote panel control pushbuttons duplicate the functions of the corresponding pushbuttons on the local operator's panel 120.

A more detailed discussion of the control panels may be found in the aforementioned copending application Ser. No. 082,470 at pages 74 through 97 thereof. Included is a listing of the local and remote operator's panel pushbutton codes, the operator's panel contact closure output assignments, and a description of the entering of control parameter changes into the control system 300.

Briefly, as concerns control parameter changes a facility is provided in the control system 300 for variation of parameters through the direct entry by a device such as the ASR-35 typewriter for changing values in a given core location such as the various resident control tables to thereby alter the control action or actions to be subsequently taken. Alarm and shutdown values are stored as ADC values for disc cavity temperatures and vibration values. Another example is the variation of deadbands for operation or alarm and shutdown. Here again, the ADC values are entered directly via the keyboard into a fixed core location to be repetitively checked or utilized during program system execution. Other parameters which may be varied are the second time delays, the hour time delays, and various curves which are located into the control resident table. Each curve is stored as five sets of coordinates. Except for the acceleration curves the parameters are stored as octal ADC/2. In the foregoing manner considerable flexibility exist in redefining values appropriate to a particular control environment.

D. PROGRAM SYSTEM

1. General Configuration

Figure 19:
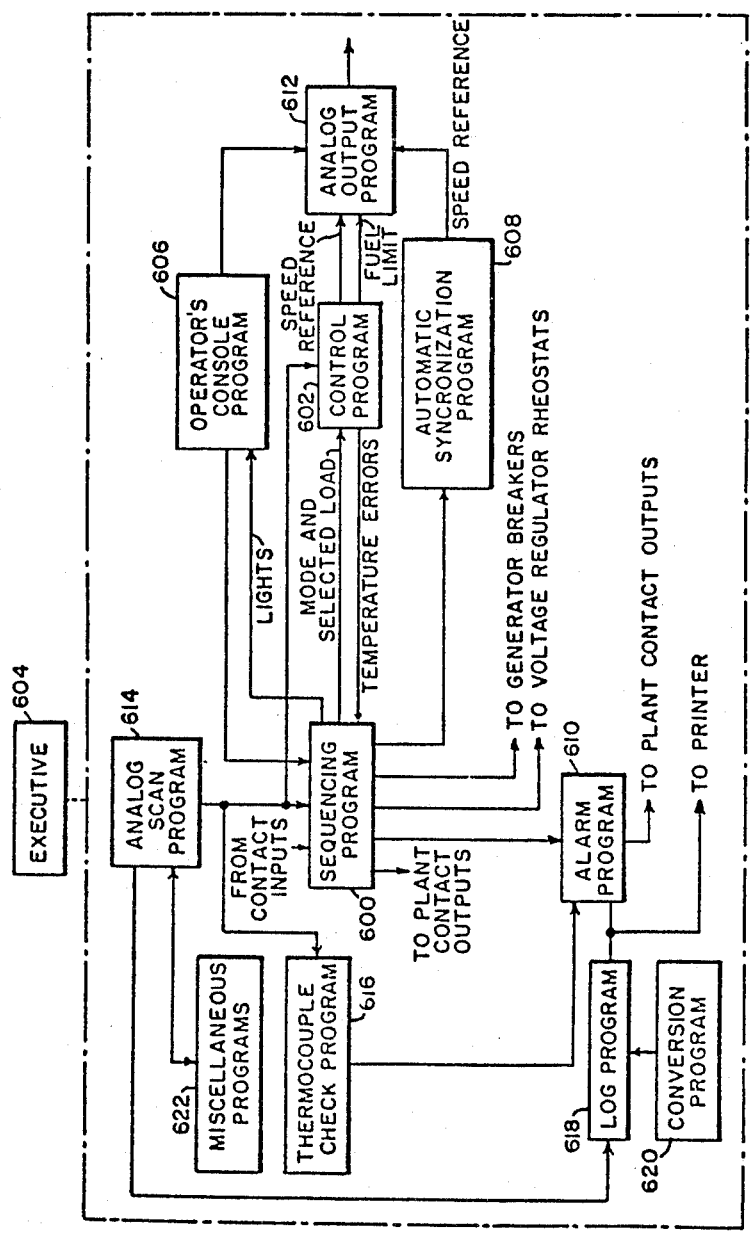
FIG. 19 shows a general block diagram of the organization of a process system employed in the control system computer.

The computer program system is organized to operate the computer system 305 so that it interacts with other control system elements and plant devices to operate the gas turbine plant 100 and other similar plants as required to produce electric power with many user advantages. As schematically illustrated in FIG. 19, the program system comprises a sequencing program 600 and a control program 602 which make most of the plant operational determinations for output to the control system interfacing and control hardware. An executive program 604 schedules the use of the computer 304 by the various programs in the software system in accordance with a predetermined priority structure. The executive program 604 also provides certain other functions considered more fully subsequently.

Generally, the sequencing program 600 accepts contact closure inputs, analog inputs, and operator console inputs from an operator console program 606 to provide through contact closure outputs plant startup and other functions including alarm and housekeeping tasks prior to, during and after startup. As indicated in FIG. 19, the sequencing program 600 supervises the control program 602 by specifying the control mode and the selected load. The control program 602 transmits data to the sequencing program 600 including for example hot blade path temperature indications during load operation which require plant alarm and shutdown.

An automatic synchronization program 608 is also supervised by the sequencing program 600 to provide for generator voltage regulator rheostat operation and turbine speed adjustment during automatic synchronization. The sequencing program 600 processes manual synchronization operation. It also transmits lamp light determinations to the operator's console program 606 and alarm determinations to an alarm program 610.

The operator's console program 606 is a package of subprograms which provides for interfacing the operator's panel 120 with the computer 304. The alarm program 610 provides for printout of detected alarms.

During the various modes of plant operation, the control program 602 makes intermediate control determinations which result in the determination of a turbine speed reference representation and a fuel demand limit representation for application as analog signals to the analog speed control 324 as previously described. Analog outputs from the control program 602, the automatic synchronization program 608 and the operator's console program 606 are processed by an analog output pulser program 612 to provide for generation of accurate external analog voltages corresponding to the internal digital determinations. Analog inputs for the sequencing program 600 and the control program 602 and other programs are determined and stored by an analog scan executive program 614.

The blade path and exhaust manifold thermocouple processing program indicated generally by reference numeral 616 interacts with the sequencing program 600 and the control program 602 to monitor process temperatures and provide alarm status indications which may be further processed to occasion alarm program printout or gas turbine shutdown. Abnormal operating conditions detected by thermocouple processing program 616 are in two categories; those related to a failure of the sensing mechanism and those which are related to turbine system failures which may be discovered as a result of intercorrelations of thermocouple readings taken at the blade path position or alternatively, as a result of correlations of such readings with those obtained at the exhaust manifold position 250.

Validity checking of temperature readings subject to reasonability criteria is extended beyond the thermocouple and turbine system failure detection to reasonability confirmation of computer control averages serving as inputs to turbine system control blocks 320 and 322 (FIG. 10). Additional thermocouple checking is provided by a sequencing program 600 and control program 602 to provide reliable, safe operation of the gas turbine 104 as for example in surge limit and control as hereinbefore discussed.

More particularly as concerns thermocouple processing program 616, automatic review of each measurement of eight blade path and eight manifold temperatures is provided in the preferred embodiment as the result of determined analog inputs stored by the analog scan executive program 614. The analog scan program 614 acts to read the system thermocouples which are then stored in computer memory to be acted upon by the thermocouple processing program 616. Thermocouple processing program 616 produces a control average which is confirmed reasonable every second by validity checks stored within the memory. The unacceptable values read; confirmed open readings, readings reflecting shorted or grounded thermocouple connections, those reflecting reversed thermocouple connections and values which vary significantly from the control average are discarded prior to the formation of the final control average. In the event that one of a number of catastrophic systems failures are found to exist as a result of the thermocouple checking performed by thermocouple processing program 616, an indication is passed to the sequencing program 600 or control program 602 to thereby signal shutdown of gas turbine 104.

A log program 618 operates in conjunction with a conversion program 620 to generate a periodic printout of the values of predetermined analog inputs. Other programs included in the program system are classified as miscellaneous programs 622.

2. Executive Systems

Generally, the executive program 604 provides for the execution of other programs on a priority basis, facilitates communication between the input and output equipment and other programs in the program system, and standardizes the handling of interrupts from the interrupt system 314. In the particular case of the P50 computer system, the executive program is a commercially available package which is operable in a wide range of applications. For a particular application like the present one, the executive program is initialized or tailored to the particular application by the entry of certain system parameters. Since the executive program is per se a part of the prior art, its functioning will be considered here only insofar as it will aid in reaching an understanding of the program system and the control system and power plant operations of the preferred embodiment.

In the program system, the individual programs are repeatedly executed, typically with only the program variables changed. The executive priority system accordingly defines the order in which programs are executed since some programs must be executed as soon as data is available while other programs are of lesser importance. In the P50 executive priority structure, a dominant priority level and a secondary priority level are provided. Each of the main priority levels in turn is divided into a number of sublevels. Generally, higher numbers imply higher sublevel priority.

The priority executive program administers the priority scheme outside the priority structure. On the dominant level, programs are executed according to real time, i.e. a program which is first bid is executed first if two programs are bidding to run simultaneously. On the secondary level, the programs are executed according to a preestablished order. Any time two programs are bidding to run the program on the highest sublevel is executed first. On both main priority levels, the programs run to completion before another program can be started on that level.

Dominant level programs can be initiated periodically through an auxiliary synchronizer routine, or they may be initiated by interrupt, or they may be initiated by an error condition detected by a program execution on a sublevel of the secondary level. The secondary lower priority level runs when the dominant level is not running. The secondary level in this case contains 14 sublevels which run according to a calling priority established when the executive program 604 is initialized. A sublevel program may be bidding to run, running, in time delay, suspended, or turned off. Once a sublevel is initiated, it cannot be interrupted by a sublevel with higher priority on the secondary level. When a sublevel program turns off, is suspended or enters a time delay, the sublevel program with the highest calling priority which is bidding will run. Generally, the majority of the programs in the gas turbine power plant program system are assigned to the secondary level.

3. Programmer's Console Package

The programmer's console programs are provided to facilitate communication with the P50 computer. Generally, the console package provides a means for loading programs into the computer, executing programs, loading constants or instructions and dumping areas of main and extended core memory. Core locations can be dumped in binary on tape or in octal on a keyboard. The programmer's console package operates within the priority structure of the executive program 604, and its elements are generally classified as a part of that program.

4. Operator's Console Program

As indicated in FIG. 19, an operator's console program is provided which interfaces with both the sequencing program 600 and the analog output program 612. Generally, a depressed local operator's pushbutton causes the interrupt routine to bid a dominant level operator's console program, which when active determines the requested action. In the event that generator breaker closing, line breaker closing or emergency shutdown have been requested, priority execution of associated programs results. Other indicated actions occasion the requesting of an associated secondary sublevel program, which is then placed into the bidding state. Operator/Executive System communication is provided during all modes of gates turbine control.

5. Analog Scan Program

Generally, the analog scan program provides an executive function in reading all analog points associated with the power plant 100 and any similar plant units. The frequency at which the analog points are read is determined by the needs of the process operation, and in this instance, it is set at 30 points per second. The analog scan program can be executed under hardware or software interrupt lockout.

6. Analog Output Program

As previously considered, the general approach employed for generating analog outputs is to employ external holding type operational amplifiers with the amplifier output measured by the computer through the analog input system 308. The measured value is compared with the desired value and the difference is employed in determining how long raise or lower contact closure outputs must be closed to make the holding amplifier integrate to the desired value. The raise or lower value is computed in tenths of a second, and it is determined by an element of the analog output program 612, which is run on a secondary level while the actual contact closure output pulsing is performed by a pulser element of the analog output program 612, run on a dominant level every tenth of a second. The secondary level analog output program elements is run every second for speed reference and load limit and every five seconds for the remaining outputs.

The foregoing brief discussions of program system components 2 through 6 are herein included to provide in summary form a general description of the control environment which is more fully described in copending application Ser. No. 082,470 Sections D2 through D6, pages 101 through 115.

7. Sequencing Program a. Functional Philosophy

Generally, the sequencing program 600 is represented by a flowchart shown in FIG. 20 and it is run once every second to provide the plant sequencing operations required during turbine startup, to provide certain alarm detections and to provide sequencing for various plant tasks during time periods other than the turbine startup time period. As indicated by block 622, certain information regarding the status of the turbine plant 100 and other controlled plants is required for sequencing program execution. The required plant status information which is acquired includes continuous analog data and contact closure inputs generated by operator panel switches, pressure switches, and other plant devices. The acquired information is stored in a master logic table as indicated by the block 624. Next, in providing ultimately for better plant startup management and better plant management generally, the stored data is employed in the evaluation of a plurality of blocks of sequence logic as indicated by block 626.

The results of the evaluation of the sequence logic may require communication with other programs in the program system in which event the results are stored for use by those programs. As indicated by block 628, the results of the evaluation of the sequence logic may also require certain contact closure outputs. In block 630, a resident table of turbine data acquired from core memory by the acquisition block 622 is saved in the original core memory location while nonresident turbine data comprising operator panel inputs is allowed to be destroyed.

Block 632 then determines whether any additional turbines need to be processed in the current run of the sequencing program 600. If not, the sequencing program 600 is ended. If one or more gas turbines remain for sequencing logic determinations in the current run of the sequencing program 600, the program 600 is re-executed for the next turbine and the process is repeated until the last turbine has been serviced with sequence logic processing in the current sequencing program execution.

Figures 21, 42:
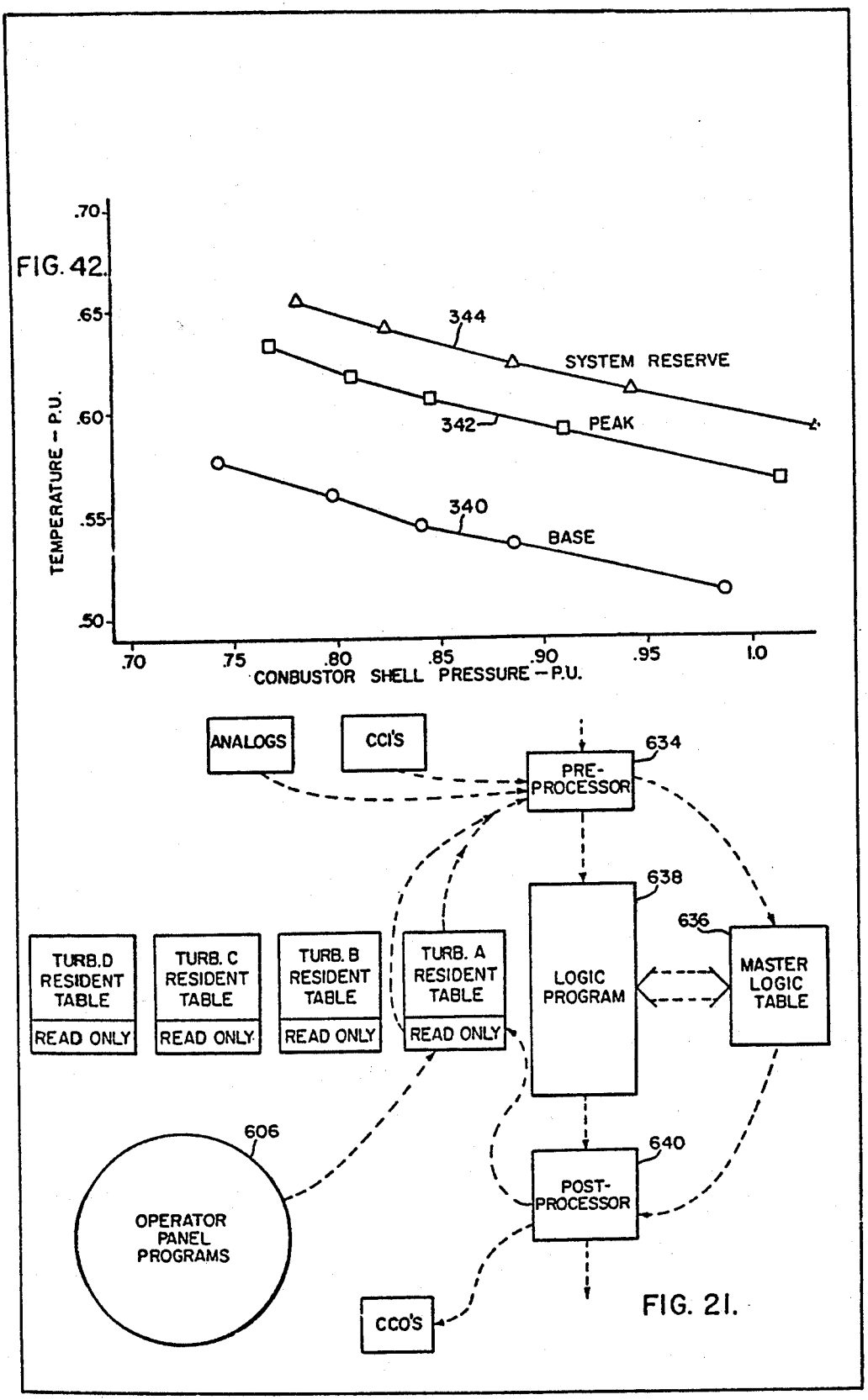
FIG. 21 shows a data flow diagram which illustrates the manner in which the sequencing program is executed to provide multiple power plant operations with a single control computer.
FIG. 42 illustrates various curve data employed in the control system computer in the operation of the gas turbine power plant.

In FIG. 21, there is illustrated a data flow map for the sequencing program 600. As shown, there are four turbine data tables for the respectively designated gas turbins A, B, C and D. Each gas turbine data table comprises a resident portion and a read only portion which is derived from the operator panel program 606. A preprocessor block 634 corresponds to the block 622 shown in FIG. 20, and it obtains data from analog inputs, contact closure inputs, the resident turbine A table and the read only turbine A table. The acquired data is stored in a master logic table as indicated by block 636 which corresponds to block 624 in FIG. 20. The master logic table is employed in the execution of logic program block 638 which corresponds to block 626 in FIG. 20.

After the sequence logic has been evaluated by the program 638 a postprocessor 640 is entered and it corresponds to blocks 628, 630 and 632 in FIG. 20. Thus, contact closure outputs are generated and the turbine A resident table is saved. The postprocessor 640 then provides for a repeat program execution for turbine B table data if a second gas turbine plant is under control. Similarly, repeat executions are made to provide for entry and restorage of turbine C table data and turbine D table data if C and D gas turbine plants are under control. After the last turbine sequence program execution has been employed, an exit is made from the postprocessor block 640.

b. Sequencing Program Table Data Tables and Preprocess and Postprocess Routine Information on core organization of the turbine read/write and read only tables, contact closure input and output data tables, the master logic table and turbine alarm data tables may be found in Section D7b., pages 117 to 150 of the aforementioned copending application Ser. No. 082,469. Additional information on the contact closure input routines, analog input routines and contact and contact closure output routines employed in blocks 622 and 628 is included therein.

c. Plant Sequence Functions

Generally, the sequence control subsystem embraces certain logic operations which provide for an orderly advance of the process through startup, run and shutdown operations while providing many operating advantages. In providing sequence operations, the sequence control subsystem includes the sequencing program which interacts with the control program and with plant devices to provide direction to process events and simultaneously to provide plant and turbine protection.

In the startup process, a programmed computer master contactor function and operation selectors are employed to force the sequence of starting and operation to assure that turbine startup will normally take place over a fixed predetermined time interval. The software master contactor serves to establish and disestablish logic conditions necessary for initiating the making and breaking of external control circuits for equipment startup and shutdown operations under predetermined plant and equipment conditions.

After ignition programmed sequencing logic causes the control system 300 to be placed in Mode 1 operation and the gas turbine speed reference is increased in a program controlled nonlinear manner to determine the fuel valve positioning.

When the turbine 104 has been advanced to idle (or top or synchronous) speed, it is ready to be synchronized and the control system 300 is transferred to Mode 2 operation in which either manual or automatic synchronizing is performed following field breaker closure. When the turbine-generator unit is synchronized and the generator breaker is closed, the control system 300 is transferred to Mode 3 or Mode 4 operation and the speed reference is set at a value of 106% rated speed. Load is ramped to a predetermined level at a predetermined rate under programmed computer operation.

Shutdown of the gas turbine is caused if any of three time checks fail during the startup sequence. The first time check measures time from initiation of the master contactor function to ignition speed. In addition, a check is made on the time from detection of flame in both combustor baskets to 60% speed. Further, a check is made on the time from starting engine trip at 60% rated speed to idle speed.

d. Sequence Logic Charts

Figure 22A:
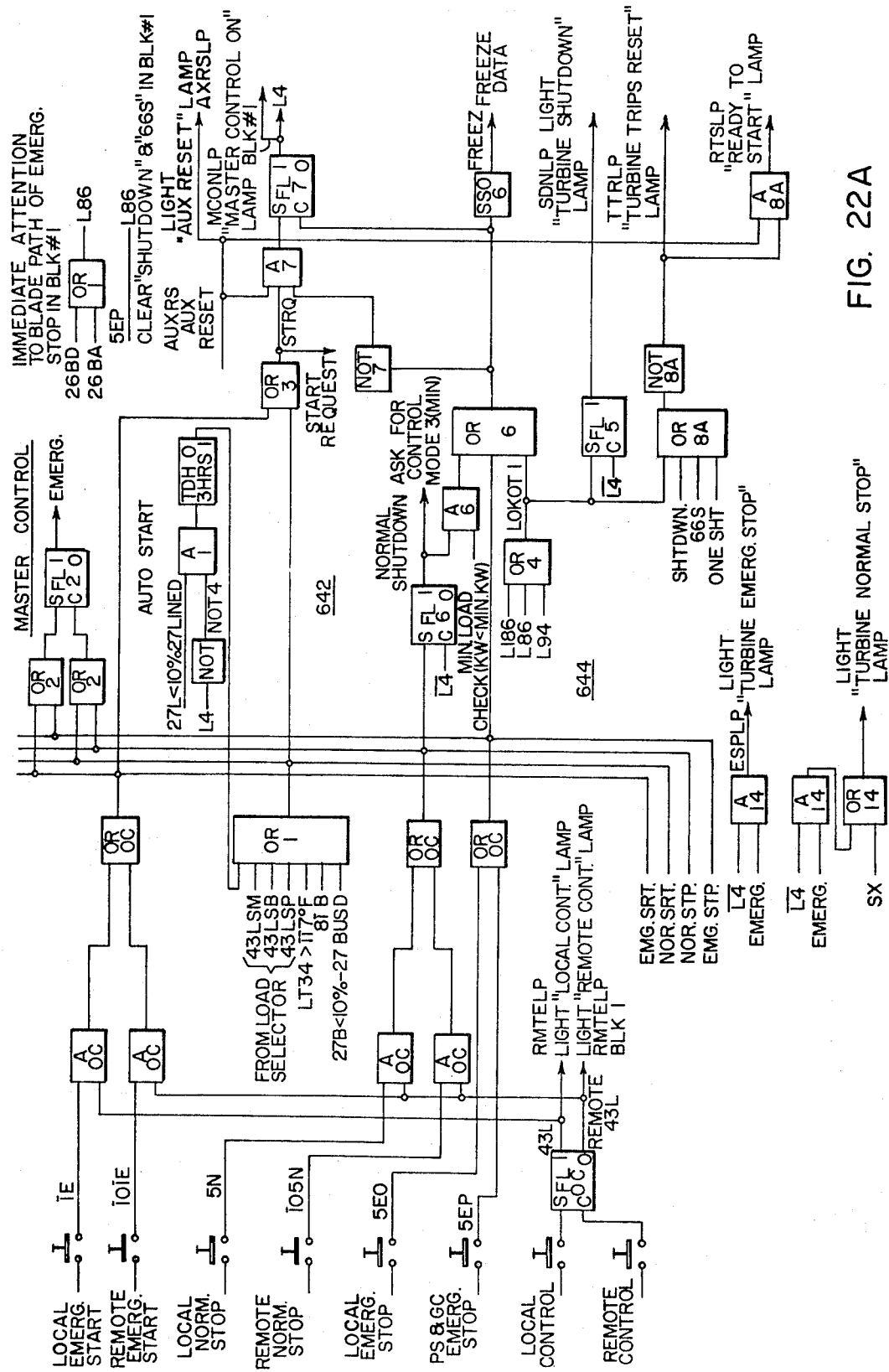
FIG. 22 shows a logic diagram representative of the sequencing logic performed by the sequencing program.
Figure 22B:
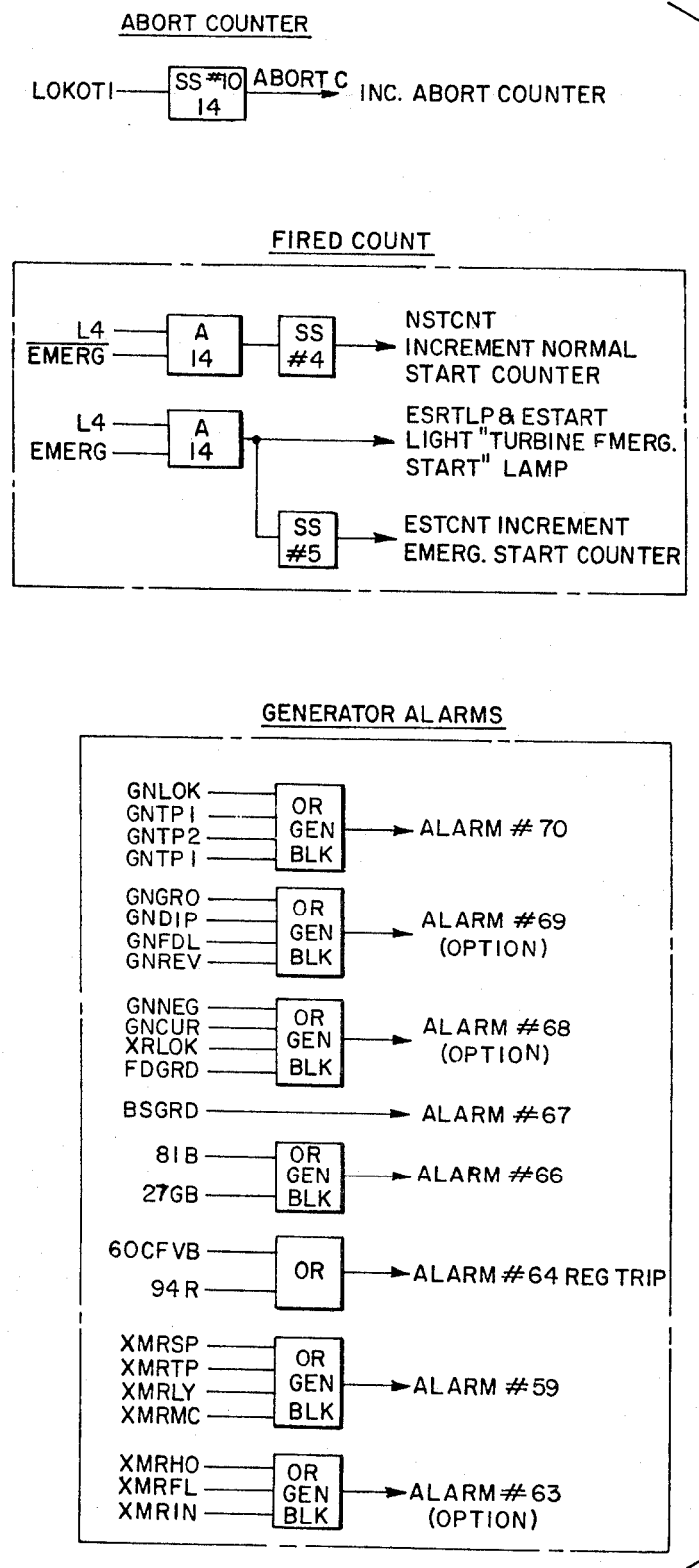

In FIG. 22, there are shown logic diagrams of representative alarm and sequencing functions performed by the sequencing program 600 in the block 626 (FIG. 20) each time it is executed. Predetermined logic building blocks are employed in defining the conditions for the performance of the sequencing program functions. Each block contains a symbol identifying its function and a number and/or alpha-numeric character providing a program block identification. The logic function identifying symbol is generally located above the program block identification character. The following is a list of the logic symbols and the logic functions to which they correspond:

A—And
OR—OR
FL—FLIP FLOP
SS—SINGLE SHOT
DB—DEAD BAND
NOT—INVERSION
TDH—TIME DELAY—HOURS
TDS—TIME DELAY—SECONDS.

There is principally shown the logic associated with start/stop operations and the master contactor or control function to which reference has already been made. Generally, logic diagram 642 pertains to the master contactor or control function generated by flip-flop FL7 as a function of pushbutton operations and other conditions. Similarly, logic diagram 644 relates to the generation of a shutdown operation in response to pushbutton, shutdown alarm and other conditions. Thus, shutdown OR block OR6 resets the master contact function flip-flop FL7 when a shutdown is initiated. In the logic diagram 644, alarm shutdowns are initiated by line L86 through block OR4. On shutdown, single shot block 6 provides for registering predetermined data.

Other sequencing program logic functions set forth in logic diagram form in FIG. 22 include a plurality of generator alarms designated as OR GEN BLK blocks. In addition, block OR1 provides for immediate shutdown on blade path over-temperature through block OR4. Single shot blocks 4, 5 and 14 respectively provide normal start counts, emergency start counts, and abort counts. A list of miscellaneous alarms is also included.

e. Macro Instructions For Sequencing Logic And Logic Subroutines And Related Macros In order to improve the efficiency with which desired functions are implemented in machine language instructions for process control, a group of Macro instructions are employed to provide direct programming of repetitive and interacting elemental function blocks for assembly into machine language. The Macro instructions accordingly provide a compiler type function in the programming process for control system applications. In this case, a set of Macros are constructed to provide for direct programming of logic blocks in a logic system. The Logic Macros generally facilitate process control programming and are particularly advantageous in gas turbine power plant applications because of the volume of sequencing logic involved therein and, accordingly, because of the large amount of programming effort that can be avoided with use of the Logic Macros.

In use, the various Logic Macros represent logic functions for which various input logic conditions can be specified. Each Macro causes the P50 assembly program to generate a set of instructions which operate on the specified Macro input conditions to generate a machine language instruction block which will execute the logic functions defined by the Macro for the specified input conditions. Similar types of results are achieved with the use of Control Macros also employed in the preferred embodiment and set forth in the subsequent section herein. Various of the logic functions are more conveniently implemented as subroutines having specified inputs and outputs, to be shared by various calling programs or program segments in a well known manner.

Further description of the plant sequence functions, associated sequence logic charts, the Macro instructions for sequencing logic and the logic subroutines and related Macros may be found in the aforementioned copending application Ser. No. 082,467, now U.S. Pat. No. 3,898,439, Section D.7c. through D.7e.

8. Control Program

Figure 23:
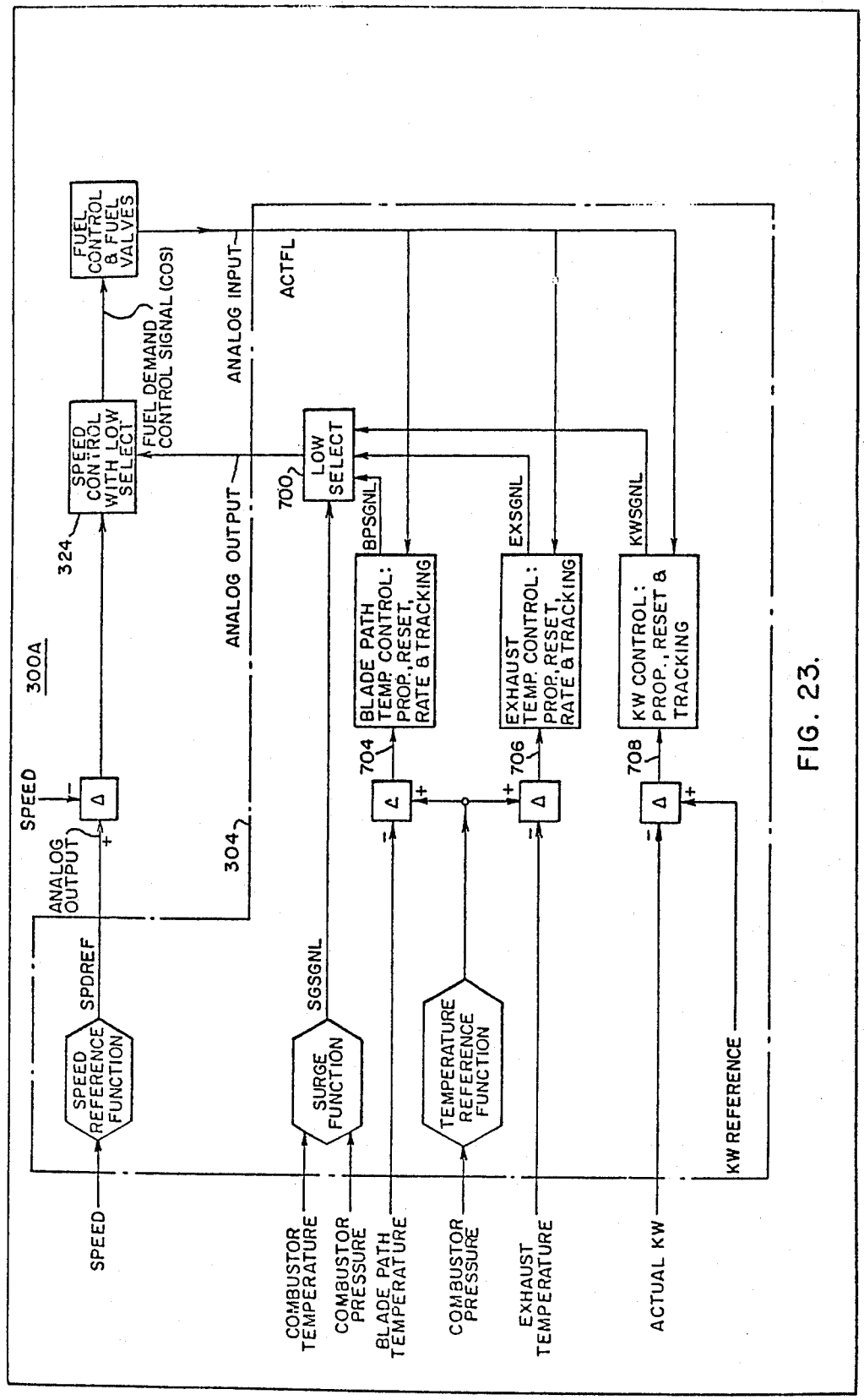
FIG. 23 shows a block diagram of a control loop arrangement implemented in the preferred embodiment.
Figure 24:
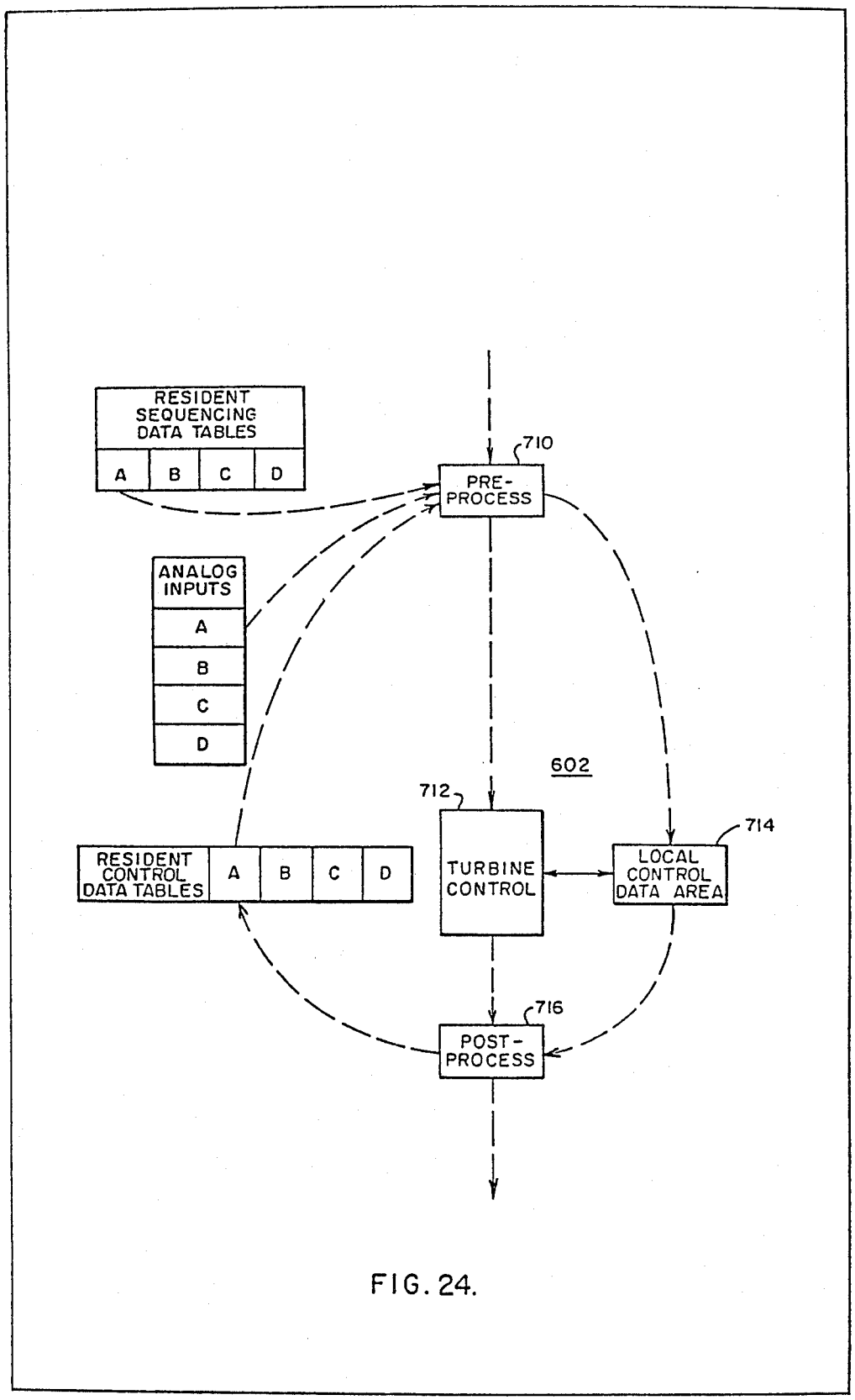
FIG. 24 shows a data flow diagram associated with control program operations during controlled operation of multiple gas turbine power plants with a single control computer.
Figure 25:
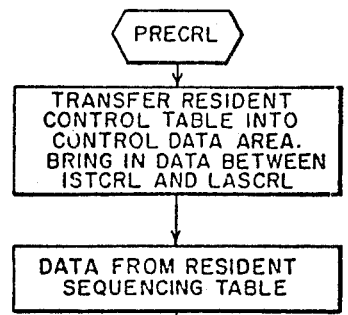
FIG. 25 illustrates a flowchart representative of preprocessor operations in the flow diagram of FIG. 24.

The control program 602 interacts with the sequencing program 600 generally to provide for control loop determination of the operation of the gas turbine power plant 100, and like plants if provided, in accordance with the control arrangement considered in connection with FIG. 23. As just considered, the sequencing program 600 is organized to provide efficient and reliable interfacing with the plant and the operator panel in determining the control mode in which the control program 602 is to be operated. Control mode directives are made compatible with protective turbine performance and orderly management over advances in the gas turbine operational process. The control system 300 is in this embodiment provided with a control loop arrangement 300A in which the hybrid interface is preferably made as shown to provide for software speed reference generation and software selection of a single low fuel demand limit in a software low select block 700 for application to analog hardware speed control 324.

The output fuel demand signal is selected as the lowest of a speed error fuel demand signal and the computer output fuel demand limit signal as previously considered. The actual fuel demand control signal ACTFL is read as an analog input for tracking in various software control paths as considered more fully subsequently. Surge limit, blade path and exhaust temperature limit and load limit control loops are all provided with software control functions which respond to external data and generate outputs to the software low select block 700 as indicated by the respective reference characters 702, 704, 706 and 708.

Data flow for the control program 602 is similar to that considered previously in connection with the sequencing program 600. Thus, the control program 602 first provides for preprocessing of analog input data and other data in block 710 for use in block 712 where the gas turbine control functions are performed.

In the first execution of the control program 602, the preprocessor block 710 acquires a resident control data table for turbine A thereby acquiring all the required values which represent the current status of turbine A. For example, the resident table stores such values as the previous inputs and outputs for the reset functions and rate functions. Other tabled values include function generator tables for all functions along with control function gains.

The resident control data table also includes the address of the turbine sequencing resident table which enables the preprocessor 710 to access the sequencing table and determine the control mode of operation, the selected load and emergency or normal startup status. After acquisition of the sequencing data for the turbine A, an analog data acquisition is employed to obtain the analog data needed for control program execution. The analog data required includes the eight blade path temperatures, the eight exhaust temperatures, compressor inlet temperature, combustor shell pressure, actual fuel signal demand and actual kilowatt output. Critical analog inputs such as compressor inlet temperature and combustor shell pressure are preferably given special reliability checks by sequencing logic in FIG. 22.

Figure 34:
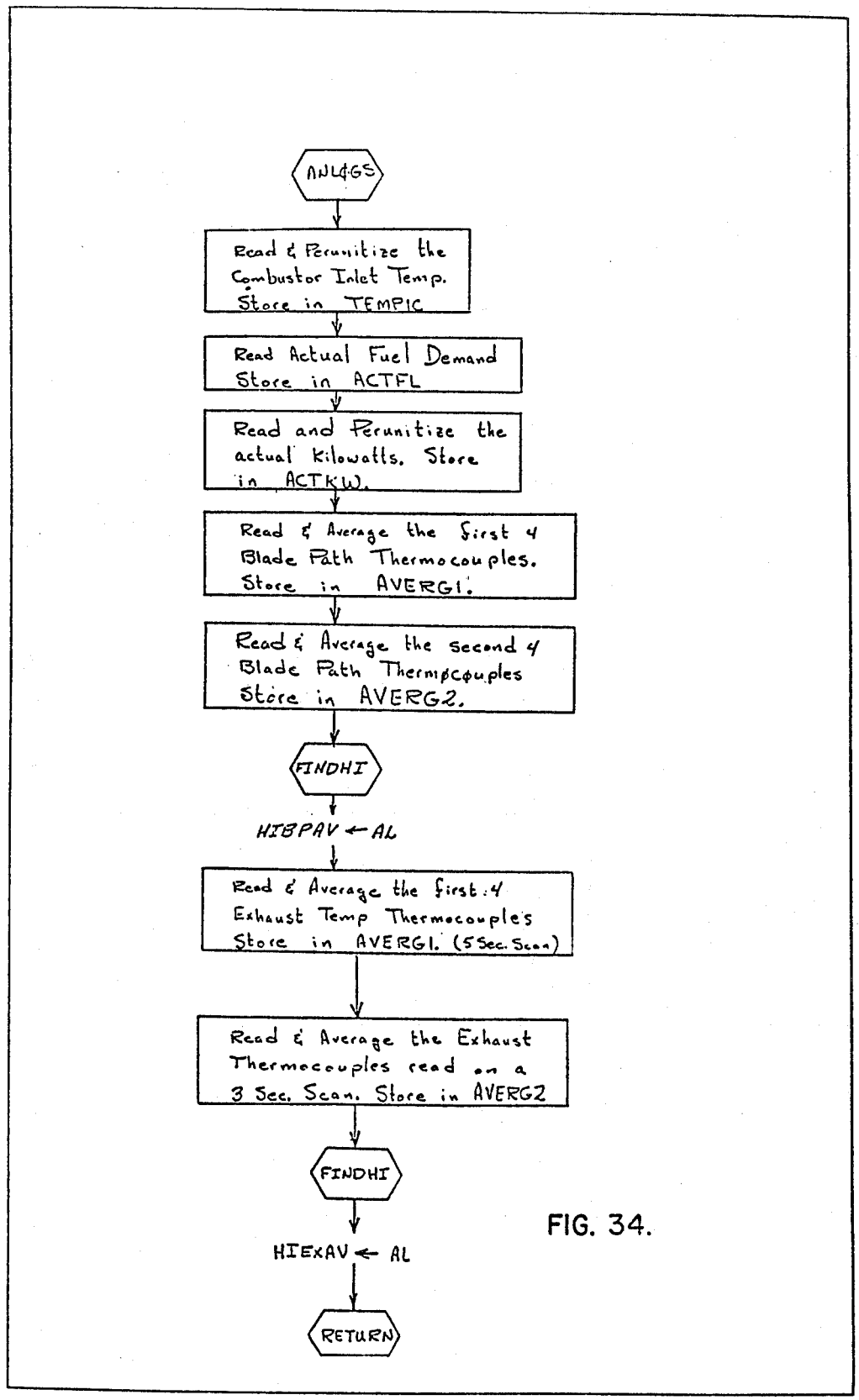
FIG. 34 illustrates a flowchart which represents the operations of an analog input routine employed in the control program.

Preprocessing of the blade path and exhaust path temperature representations to find the respective high averages is performed by the preprocessor block 710. Subroutines suitable for accomplishing the derivation of a control average are somewhat detailed in FIGS. 34 and 35. Referring to FIG. 34, analog inputs are obtained and stored in memory. A fuel demand representation is obtained. An actual kilowatt output is determined. There follows successive averaging of two groups of four blade path thermocouple readings with a subsequent call to a utility routine suitable for refining to some degree the value which is to be utilized for turbine control purposes. This sequence is repeated then for the exhaust temperature thermocouples to again obtain a control average to be subsequently used by control program 602. The utility subroutine represents a means of obtaining the respective control averages in accordance with one aspect of the principles of the present invention.

Figure 35:
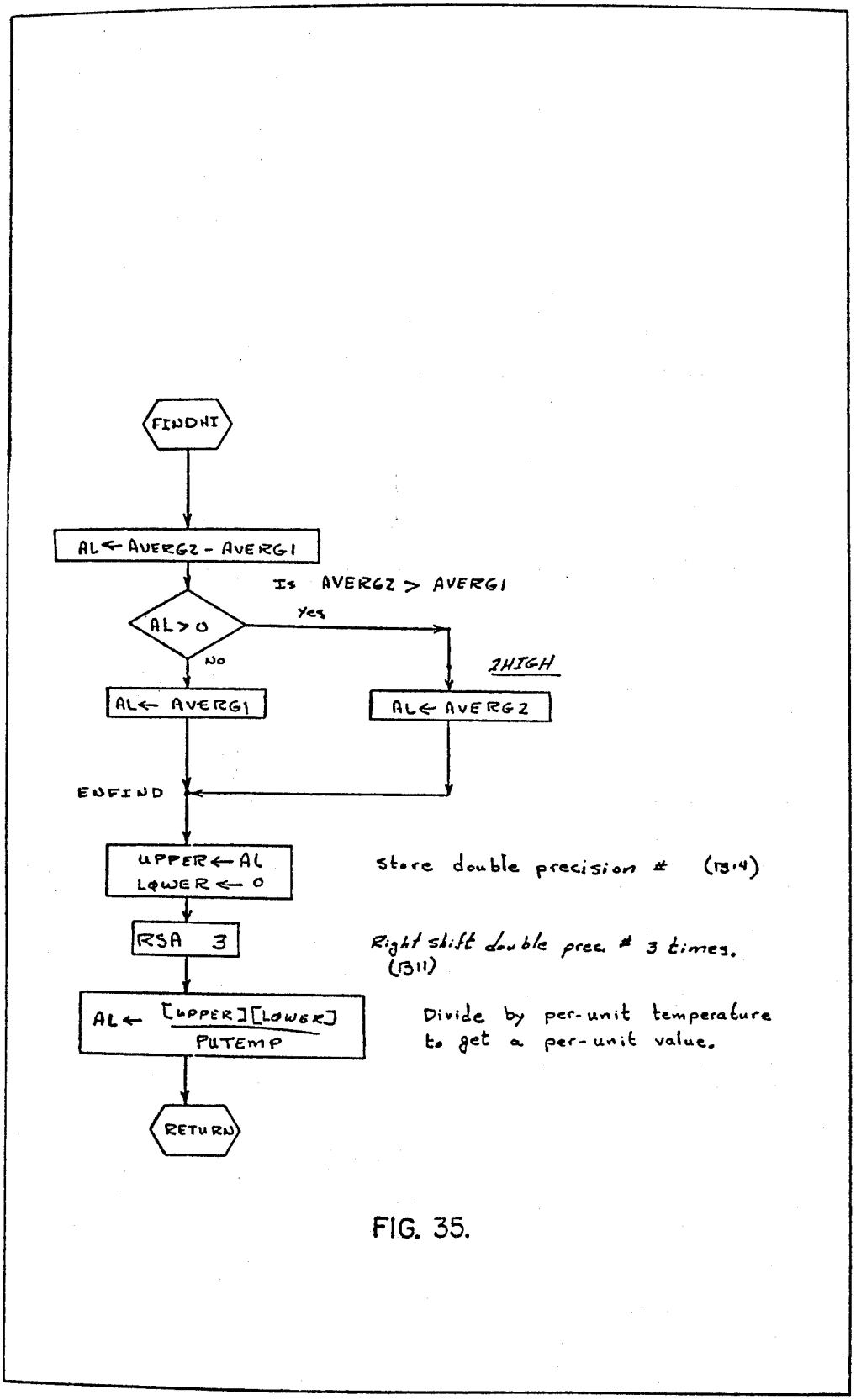
FIG. 35 shows a flowchart for a high temperature finding routine associated with the blade path and exhaust temperature processing in the analog input routine.
Figure 43:
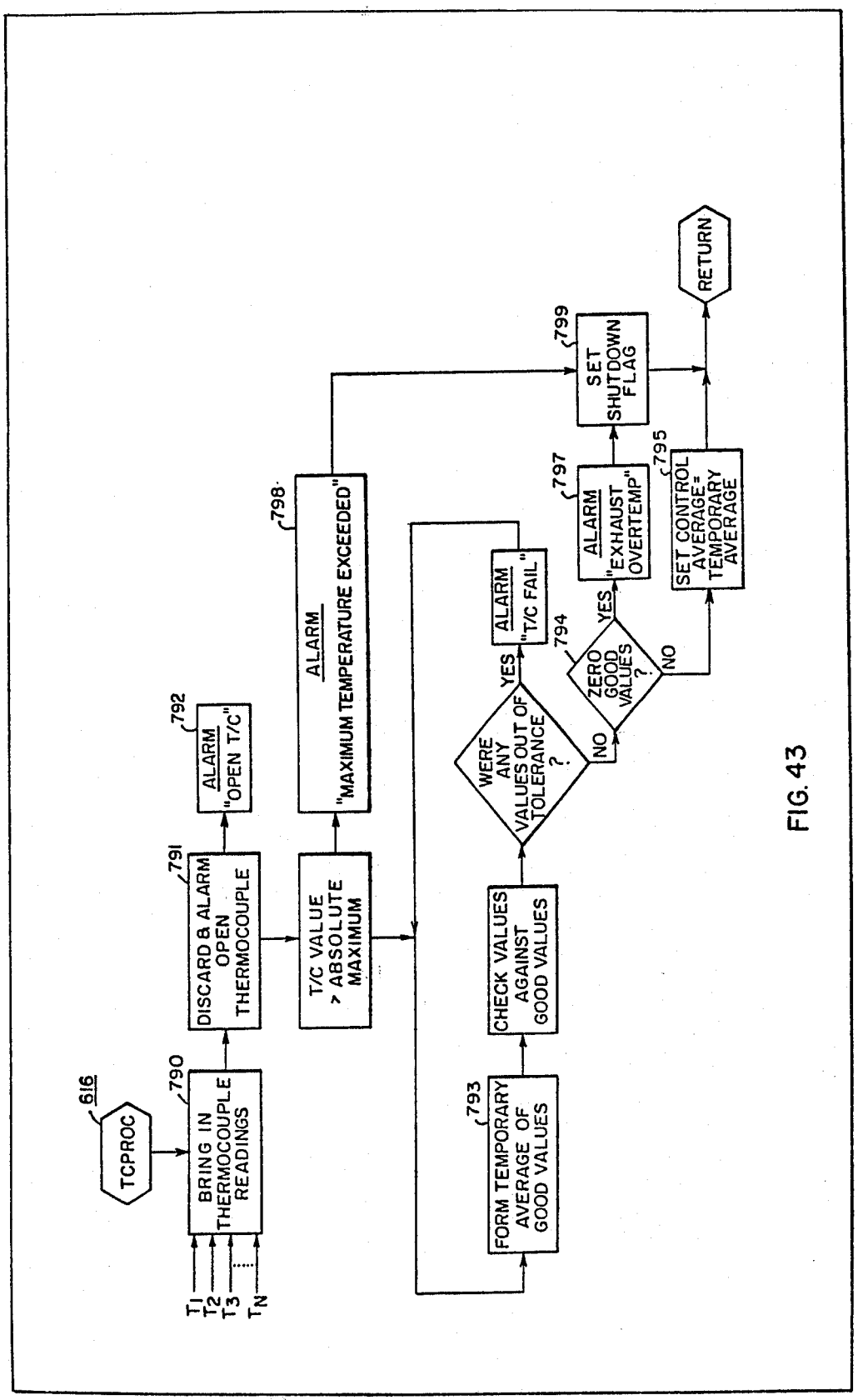
FIG. 43 illustrates a flowchart for the thermocouple processing program demonstrating in logic flow form the temperature monitoring and control input deviation in accordance with the principles of the present invention.

A flowchart representing an expanded capability in thermocouple processing for monitoring and control is depicted in FIG. 43. As shown the derivations of control inputs depicted in FIGS. 34 and 35 is also herein contained. It should be understood that FIGS. 35 and 43 both depict a suitable means for obtaining a final control average. Other arithmetic or statistical computations might be employed. It should be understood that the present invention in its broader aspects encompasses other computational techniques within the computational loop indicated generally in FIG. 43 by reference numeral 793.

Referring now more specifically to FIG. 43, the thermocouple processing program 616 is depicted in logic flow form without specific reference to program steps. A suitable implementation of functions depicted in FIG. 43 is appended hereto in the form of a program listing. The mnemonic for such is TCPROC. More generally again groups of thermocouple readings indicated as $T_1$ through $T_N$ are provided for the program 616 and caused to be stored in an input parameter portion of memory available to the program.

In block 791 there is indicated a first validity checking function which is the examination of each of a group of thermocouple inputs for a large negative value. The existence of one or more large negative values in the input parameter groups occasions the alarming of an open thermocouple as shown in block 792.

It should be noted that an additional thermocouple condition may be represented by a large negative value. If this input condition is known to exist in the event of a reversed thermocouple connection. Therefore it is desirable that a unique negative value represents open thermocouple so that these two conditions may be differentiated. In either event the output of that thermocouple is discarded in calculating the average temperature indication.

In the next program steps the individual thermocouple readings are compared against an absolute maximum temperature limit and if any of such readings exceeds this limit a unique alarm indication is outputted to the control or sequencing programs. As indicated by reference numerals 796 and 799, an alarm message is provided by the program system prior to the initiation of shutdown.

Turning now to the loop indicated by reference numeral 793, those good values retained after the processing indicated in block 791 are averaged and then confirmed reasonable by a comparison of each with the temporary average obtained. The object of such comparison is to determine variations from the average by a specified amount. As hereinbefore discussed, the hazard of damage to vital turbine components exists in the event that a control average substantially below the actual average is computed. Therefore the primary concern and the object of this processing step is to ensure the discarding of those values which are below the temporary average by a substantial amount. The present implementation of thermocouple processing program 616 calls for the retention of values higher than the average by a substantial amount, however it should be understood that various selection criteria might be employed to discard selected high readings as well.

Upon completion of the checking and selection of acceptable values it is determined whether or not any values have been discarded, if so, the exhaust thermocouple fail alarm is initiated with a subsequent return of control to the first block in loop 793 so that an average may be formed of those values retained. Loop 793 is executed repetitively until an iteration is completed wherein it is determined that no out of tolerance values exist.

Decision block 794 determines whether there exists a possible, yet improbable, condition, namely, a situation wherein there are no good values. In the event that this situation exists an exhaust over-temperature alarm is initiated at block 797 and the program 616 is terminated with the shutdown flag set as at 799. Given that some good values exist the output control average is then set equal to the temporary average computed during the last iteration and the program is exited normally.

Next, the turbine control block 712 is executed and it makes use of the acquired data including the sequencing, analog and resident control data which is stored in a table indicated by the block 714. After completion of the execution of the turbine control block 712, a postprocessor block 714 is executed to transfer an updated resident control table for turbine A back to its resident core area. The program process just considered is then repeated for turbines B, C and D according to the number of gas turbine plants placed under control. After the last turbine has been serviced with control program execution, an exit is made from the control program postprocessor block 716.

Figure 26:
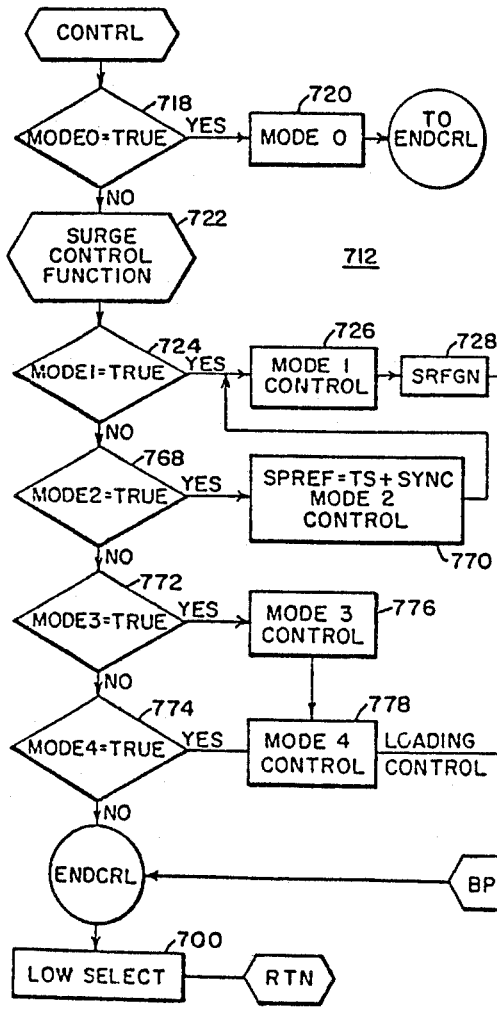
FIG. 26 illustrates a flowchart which represents control program operations in the preferred embodiment.

In FIG. 26, the control block 712 is shown in greater detail. A determination is first made from the turbine sequencing table by block 718 whether the turbine under control is in Mode 0 status. If so, block 720 is executed, but no control action is taken since Mode 0 is an initialization mode. Thus, block 720 zeroes the previous value locations for the blade path and exhaust temperature control and resets error flags. Block 720 also provides for tracking the actual turbine speed so that a smooth transition is made in the computer generated speed reference during transfer from Mode 0 to Mode 1.

If the control is not in Mode 0, block 722 next determines the surge control function for use in the surge limit control loop (FIG. 23) in all other modes of operation. To prevent compressor surge under excessive pumping demand, the surge control function determines a maximum fuel demand limit as a function of the compressor inlet temperature and the combustor shell pressure (compressor outlet pressure) which are obtained from reliability checked analog inputs.

Figure 27:
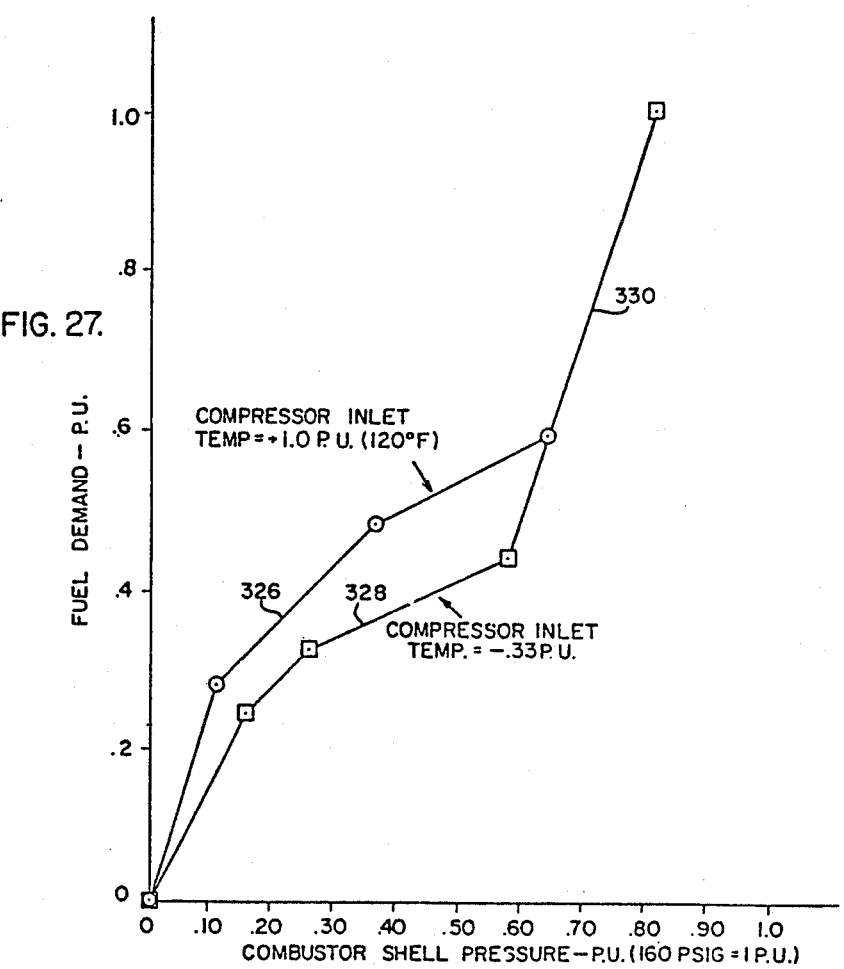
FIGS. 27, 29 and 31 illustrate various curve data employed in the control system computer in the operation of the gas turbine power plant.

The surge limit functional determination is made with the employment of stored nonlinear curve data which is representative of the nonlinear turbine surge operating limit over startup and load operating ranges as depicted in FIG. 27. In this instance, the pair of nonlinear curves 326 and 328 are stored for respective compressor inlet temperatures of 120° F. and −40° F. The curves 326 and 328 are stored by the use of five points on each curve and intermediate curve points are determined by a linear interpolation routine more fully discussed in copending application Ser. No. 082,476, now U.S. Pat. No. 3,898,439, in connection with the Sequencing Logic Macro instructions described in Section D.7e. thereof. Curve points for compressor inlet temperatures between −40° F. and 120° F. are determined by a second linear interpolation procedure so that a dual interpolation operation is employed for a determination of the surge control function.

Once the combustor shell pressure is identified, the double linear interpolation is made along and between the curves 326 and 328. If the combustor shell pressure is below the point at which the coincident portions 330 of the curves 326 and 328 become applicable, the ordinate of the applicable surge limit function is determined by intercurve interpolation on the basis of measured compressor inlet temperature to define the surge limit value of startup fuel demand. In order to make the ordinate interpolation, interpolations are first made to determine points on the startup portions of the curves 326 and 328 corresponding to the measured combustor shell pressure. Surge limit determination is also made by linear interpolation, and in this case double linear interpolation, on the curve portions 330 during load operations, but the ordinate interpolation is applied to common points to generate the same point. As a result of the nonlinear surge function implementation, closer operation to turbine design limits is enabled.

Figure 29:
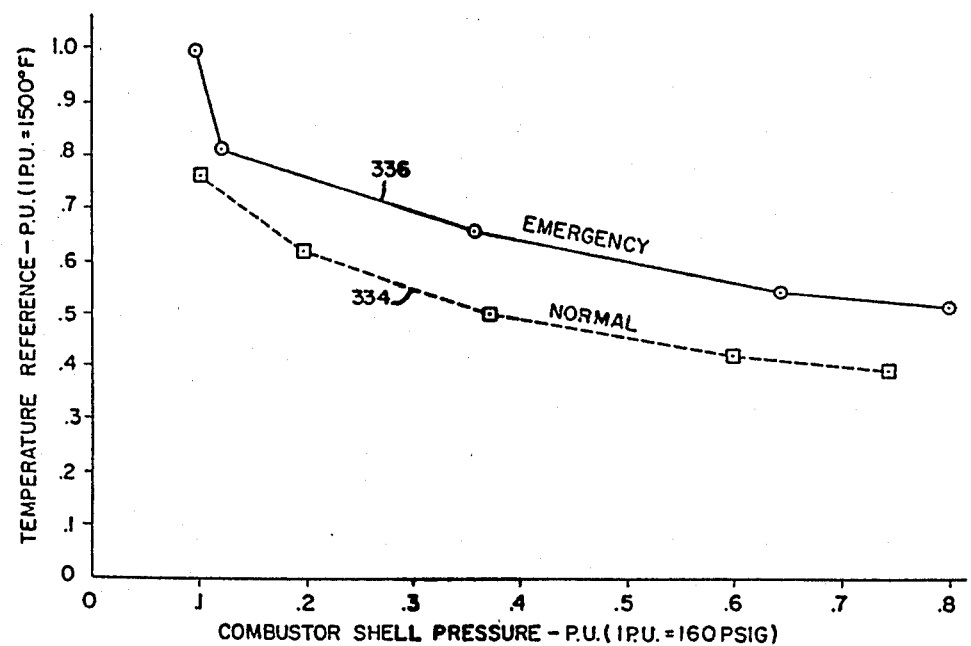

After determination of the surge control function, block 724 determines whether the system is in operating Mode 1. If it is, block 726 is entered to provide for gas turbine acceleration control from ignition speed of approximately 1000 RPM to the top speed of 4894 RPM. Block 726 provides for fuel demand signal tracking in the same manner as that subsequently described in connection with blocks 764 and 767 (FIG. 30) and further generates a temperature reference with the use of stored curve data shown in FIG. 29. The temperature reference curves 334 and 336 are nonlinear and respectively represent turbine discharge temperature conditions associated with respective constant turbine inlet temperatures of 1200° F. and 1500° F. for normal and emergency startups as a function of combustor shell pressure. Five points are stored for each curve 334 or 336 as indicated and linear interpolation is employed between points on the same curve as considered in connection with FIG. 27. To determine the current applicable temperature reference, the block 726 accordingly determines the acquired analog value of combustor shell pressure and whether the startup is in a normal or in an emergency status. Gas turbine operation with greater constancy of operation at design turbine inlet temperature is better enabled by the use of a nonlinear temperature reference in the block 726 and in block 729 subsequently considered.

Figure 28:
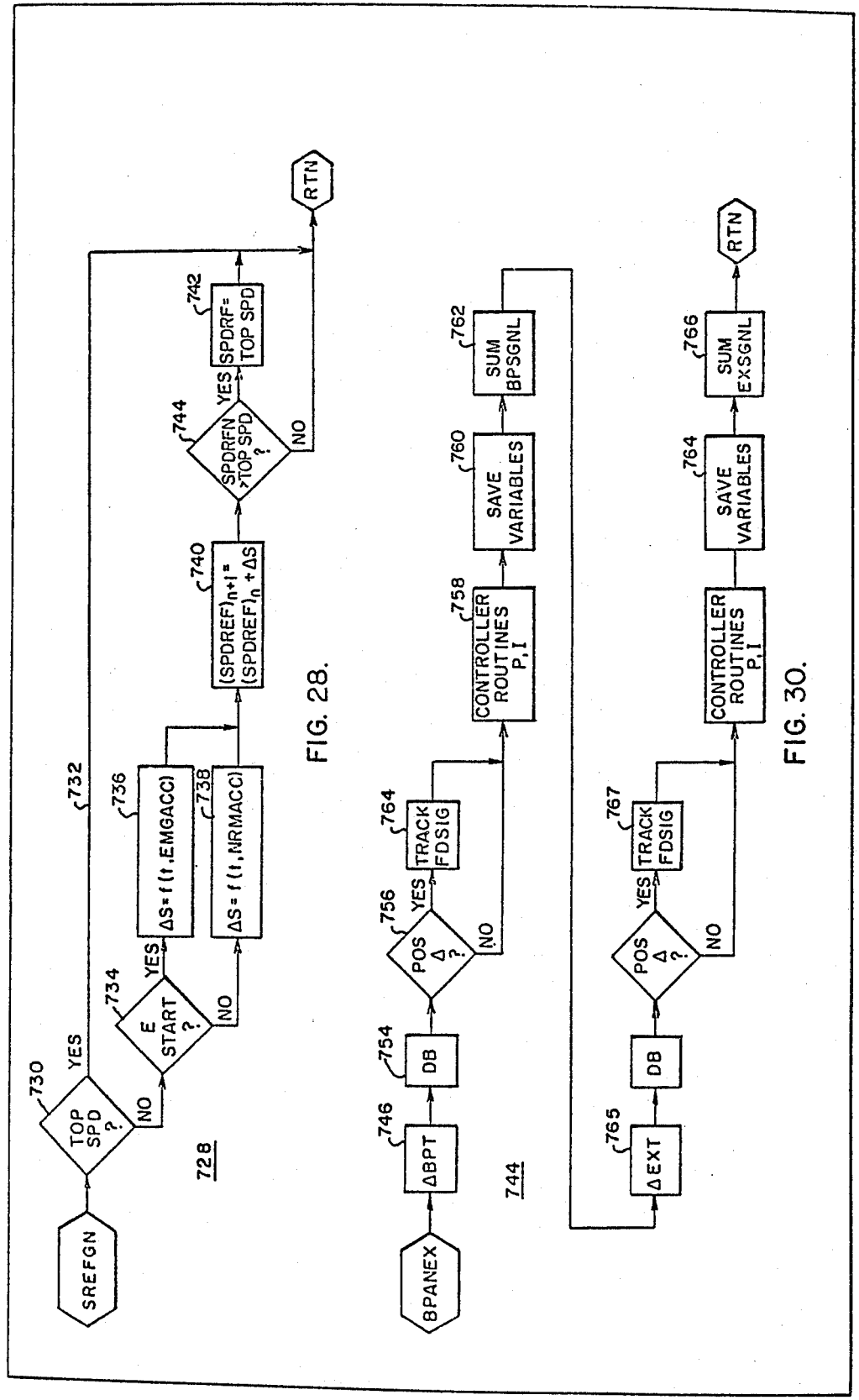
FIG. 28 shows a more detailed flowchart for a speed reference generation function included in the program of FIG. 26.

Block 728 operates next in Mode 1 control to determine the speed reference for analog output to the speed control 324 from the computer 304. As shown in greater detail in FIG. 28, the speed reference program block 728 first provides for determining whether the gas turbine 104 is at top or substantially synchronous speed as indicated by block 730. For the top speed condition, the speed reference routine is bypassed as indicated by the reference character 732 and a return is made to the turbine control program execution. Below top speed, block 734 determines whether an emergency start has been requested and if it has, block 736 determines the change in the speed reference required for operation during the next sampling time interval from data representative of the curve 307 shown in FIG. 31. If a normal start has been requested, block 738 determines the speed reference change in accordance with data representative of the curve 306 in FIG. 31.

As previously indicated, the nonlinear curves 306 and 307 respectively and advantageously provide for fixed normal and fixed emergency startup times while holding substantially constant turbine inlet gas temperature. The faster emergency startup curve 307 corresponds to a higher turbine inlet temperature operation and, it may be noted, higher turbine temperature transients which produce greater stress damage to the turbine parts. Although blade temperature or surge limit control may possibly extent the startup period, the normal programmed fixed startup time, in this case from ignition speed to synchronous speed, is normally achieved to provide the previously considered advantages of fixed time startup.

Figure 31:
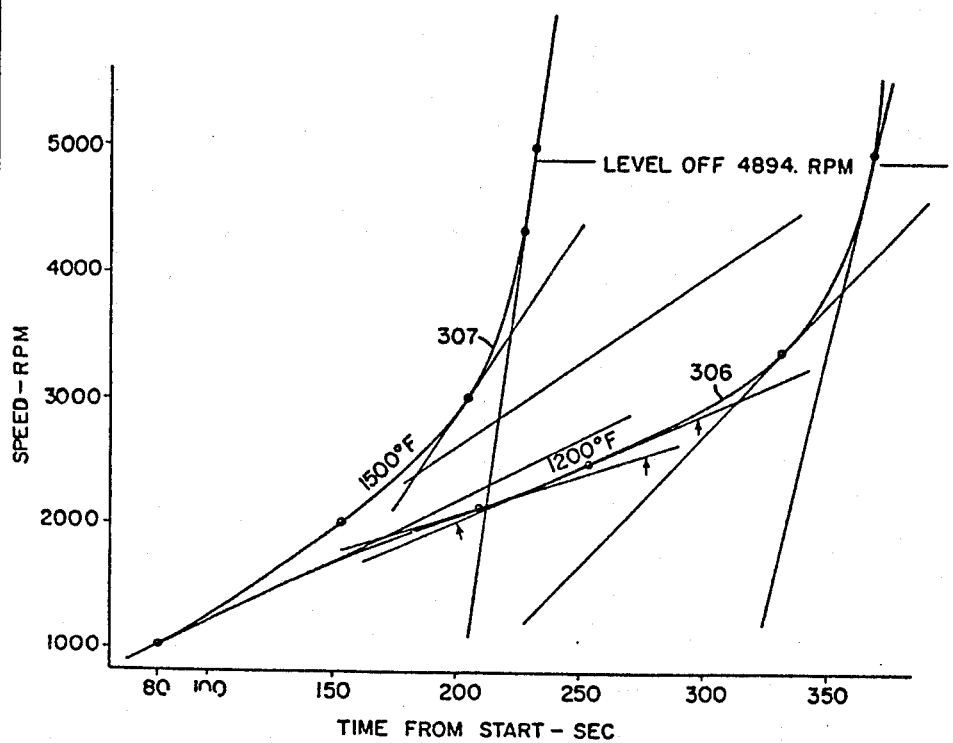
Figure 41:
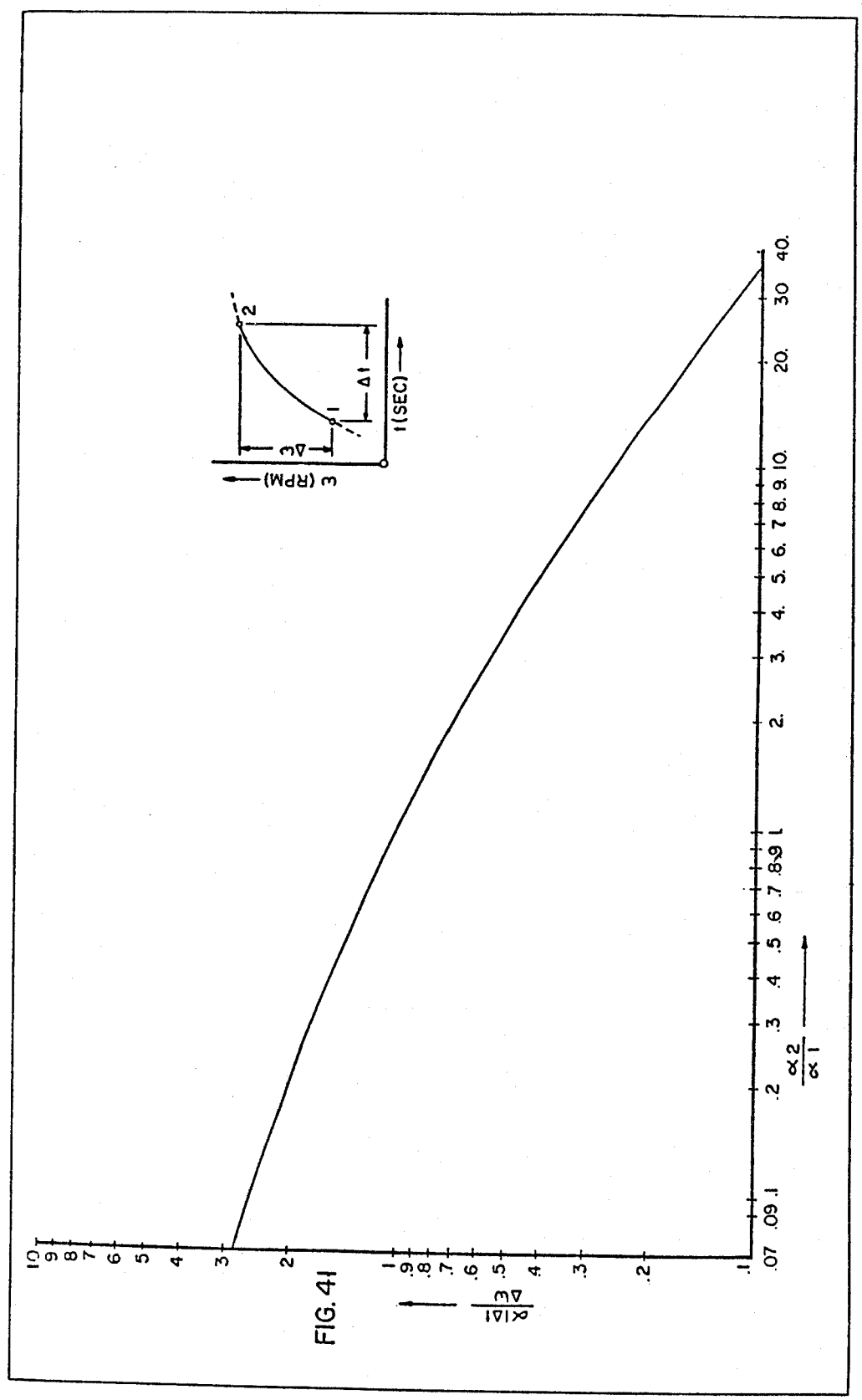
FIG. 41 graphically illustrates speed reference change calculations.

Each of the speed curves 306 or 307 in FIG. 31 is placed in core strength with the use of five data points as indicated. The indicated speed curve slopes or accelerations corresponding to the denoted speed curve points are stored and a linear interpolation process is used to determine acceleration values at working time points between the time points corresponding to the stored curve points. A speed reference change calculation for block 736 or 738 is based upon the slope of the speed curve at the next preceding sample time point and the change in time associated with the next sample period (FIG. 41).

In block 740, the new speed reference is calculated by adding the calculated small speed reference step change to the preceding speed reference. The acceleration formula set forth in connection with parameter changes applies to FIG. 41 and it is used in making the speed change calculations. The speed reference algorithm may be found at page 50 of copending application Ser. No. 082,470.

Among other advantages associated with the speed reference generation scheme, the plant operator can switch between normal and emergency start procedures at any time in the startup process with smooth transition since no large steps occur in the speed reference function and accordingly no undesirable operating transients are imposed on the gas turbine 104. It is also noteworthy that a 0 speed change is added to the speed reference when the HOLD pushbutton is pressed.

A top speed limit is next placed on the speed reference by block 742 if block 744 detects an excessive speed reference value. If the speed reference is not excessive or if the speed reference is set at top speed, the speed reference value is stored and a return is made to the execution of the control block 712.

Figure 32A:
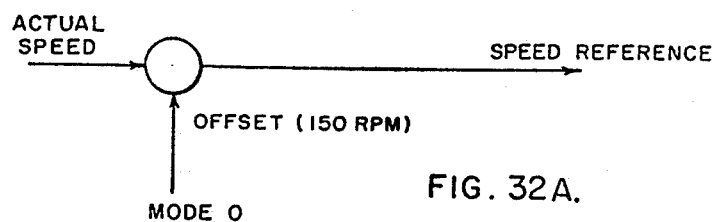

Generally, the blade path temperature control loop responds faster than the exhaust temperature control loop and it is therefore the controlling factor in Mode 1 control. The exhaust temperature control loop and the load limit control loop are both normally tracking the fuel demand signal during Mode 1 control for reasons of control loop availability. FIG. 32 illustrates the conditions of the various control loops considered during Mode 1 control.

Figure 32B:
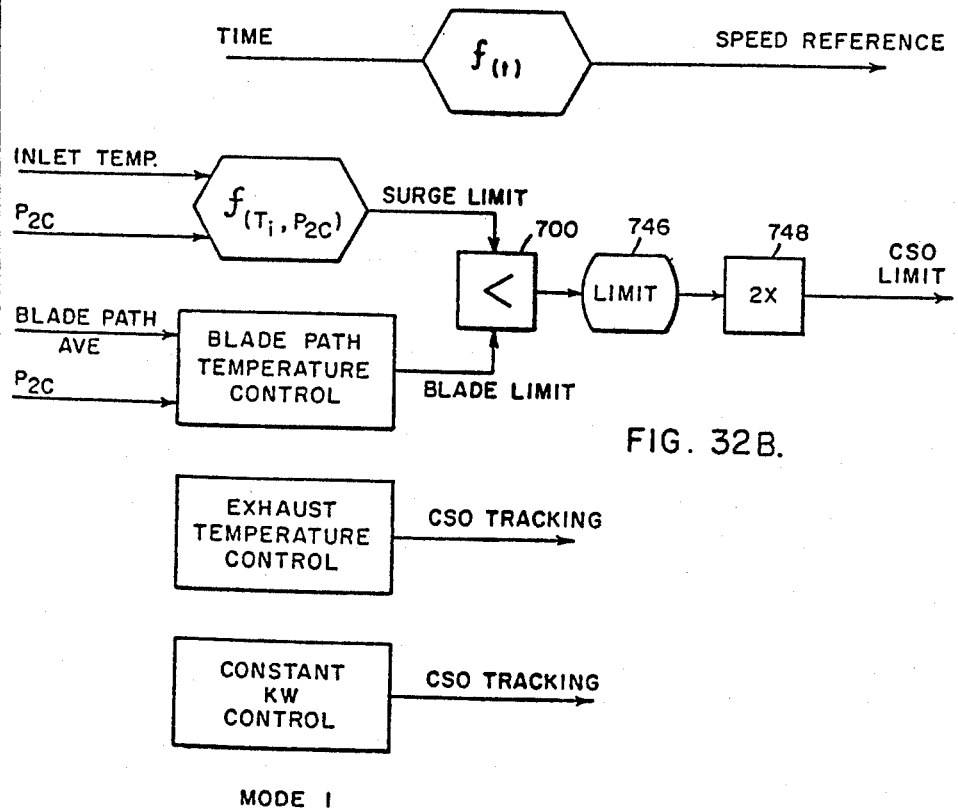

As detailed in FIGS. 32B and 32C all control Modes including Mode 1 employ a fuel demand limit check in the control path to keep the output fuel demand signal within the range of 0 to 2.5 volts as indicated in block 746. A multiplication by a factor of 2 is made in block 748 to put the analog output signal in the range of 0 to 5 volts.

In the temperature limit routine 744, a determination is first made in block 746 of the temperature error by taking the difference between the temperature reference previously derived in the block 726 (or the block 792 in FIG. 38) and the actual and preprocessed average blade path temperature. As shown in FIG. 33A, the software blade path temperature control configuration includes a rate function 748 which is applied to the average blade path temperature representation. The temperature representation and its derivative are added together in summer 750.

Figure 37:
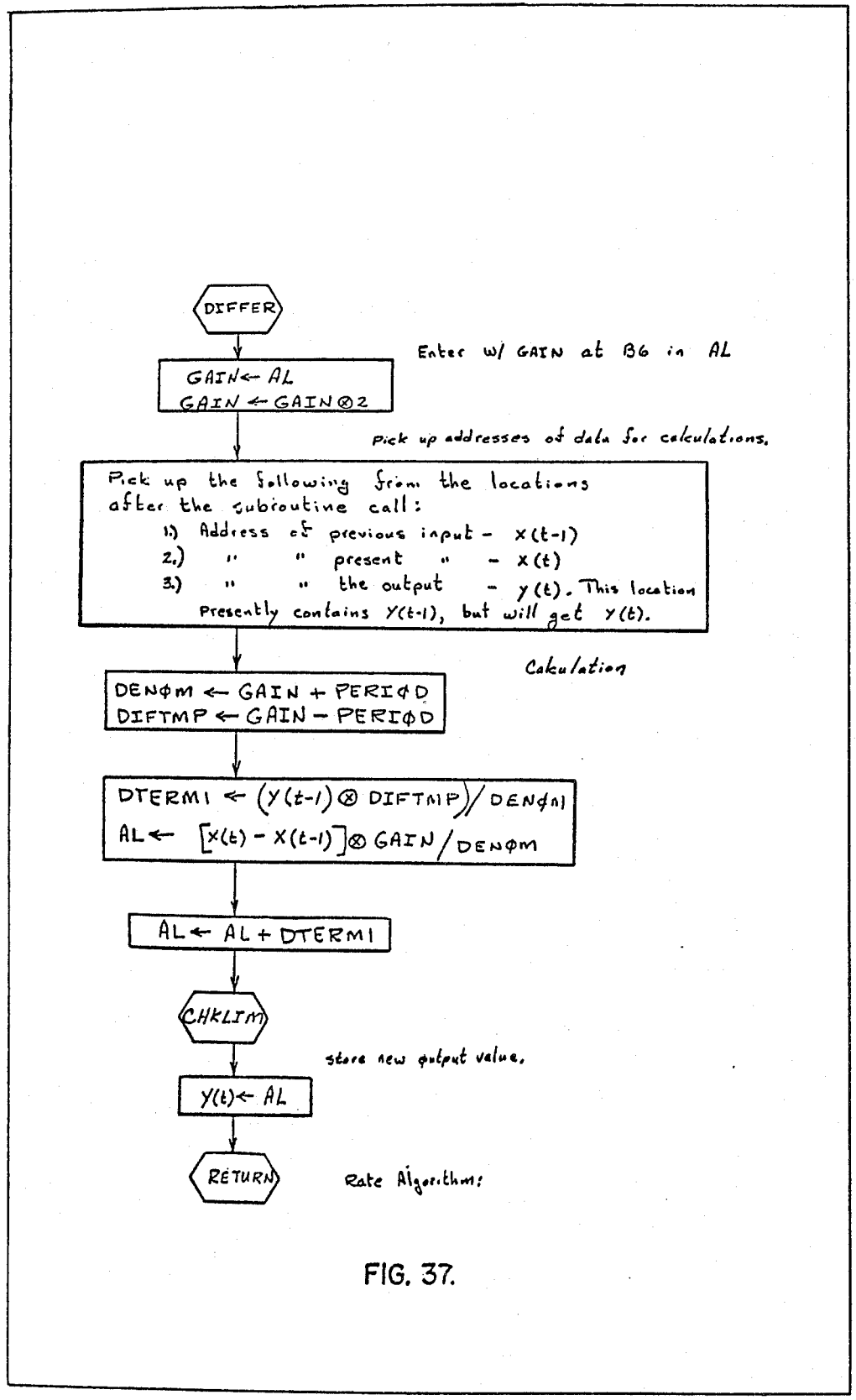
Figure 40:
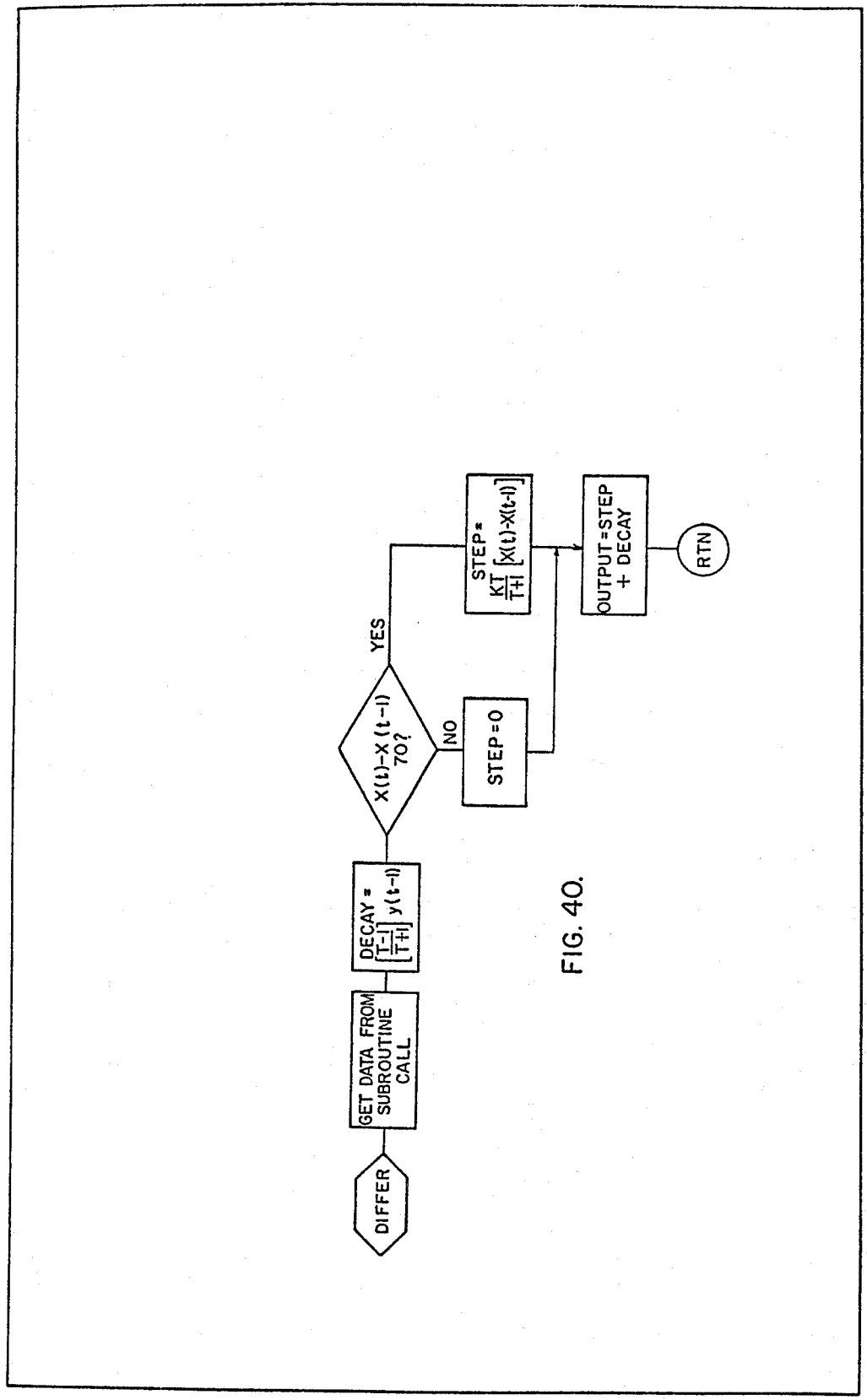
FIG. 40 shows a flowchart for a rate function employed in temperature limit operations.

FIG. 40 shows the rate function and its software control channel interaction in greater detail. Thus, after the necessary data is obtained, a decay time is calculated and if the temperature is increasing a step term is determined and added to the decay term. If the temperature is decreasing, no step term is used and the output is made equal to the decay term. FIG. 37 illustrates the process employed for differentiation.

As a result, the summar 750 in FIG. 33A has a temperature value and at most a remanent decay term applied to it during temperature drops so that tracking is provided for decreasing temperature. On temperature increases, the summer 750 generates the sum of a temperature value and an instantaneous step term and a decay term for anticipatory or predictive limit control with rising blade path temperature.

To obtain backup transient temperature limit protection, a summer 752 (FIG. 3A) provides a blade path offset to the temperature reference previously determined in the flowchart block 726 (FIG. 26) by an amount of 50° F. in control Modes 3 and 4 during which the slower responding exhaust control channel provides primary temperature limit control, but no offset is made in control Modes 1 and 2. The preprocessing performed by blocks 748, 750 and 752 in the control configuration of FIG. 33A is performed by the program block 746 in FIG. 30.

A predetermined deadband is applied to the determined blade path temperature error in block 754. If an error exists outside the deadband determined in the block 754, its sign is determined in block 756. If the blade path temperature error is negative, control action is imposed by block 758 with a proportional routine and an integral routine. The blade path temperature and temperature error variables are then stored by block 760 and block 762 sums the results of the proportional and integral operations of block 758 to generate the blade path output limit representation BPSGNL. If the blade path temperature error is positive, block 764 obtains the fuel demand signal FDSIG or SCO in the hardware speed control 324, sets the blade path temperature error representation to zero and causes the reset function in block 758 to track the fuel demand signal (as indicated in the control configuration in FIG. 23). The blade path temperature representation is then kept slightly above the control signal output so that it is ready to take limit control if required.

After execution of the block 762, the exhaust temperature control or tracking action is determined in a series of blocks similar to those just considered in connection with blade path temperature control and tracking action. However, block 765 provides no offset for the temperature reference as indicated in the software control configuration for exhaust temperature control shown in FIG. 33B. Further, a save variables block 769 provides for storing the exhaust temperature error and the track function output initiated by block 767. Block 760 also saves the blade path variables.

The tracking action provided for by blocks 764 and 767 in the temperature limit loops enables the loops to enter their limit control configuration with faster control action following a change in temperature error from positive to negative since the reset routines do not have to integrate back from some saturated output value. In particular, the tracking action is such that the reset block output never exceeds the fuel demand signal by more than a difference value, in this case a value corresponding to 0.12 volts.

Figure 36:
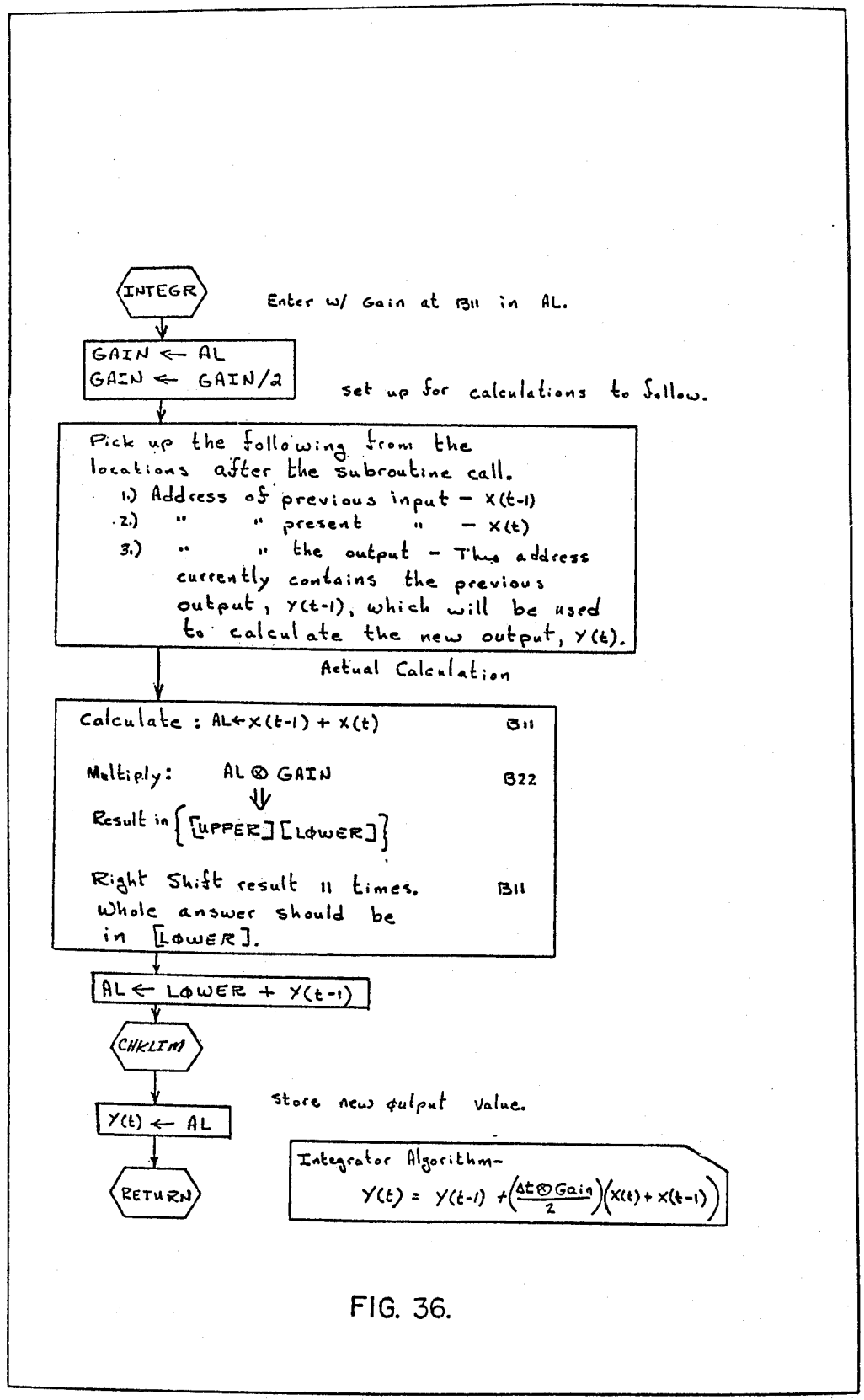
FIGS. 36 and 37 respectively illustrate flowcharts representative of digital integration and differentiation functions employed in the control program operations.

To obtain the tracking action, the desired difference value is added to the low selected fuel demand signal and the result is differenced from the output of a reset or integrator routine and applied to the input of the reset routine. FIG. 36 shows the process employed for integration. The integration routine may be found in co-pending application Ser. No. 082,476, now U.S. Pat. No. 3,898,439. The output of the integration operation accordingly tracks the fuel demand signal with a positive bias. The described tracking operation allows the tracking control loop to enter quickly into fuel control if required by a change in the error quantity controlled by the tracking control loop, yet the fuel signal tracking output of the tracking control loop is sufficiently high to provide some degree of control freedom for the control loop which is actively controlling fuel through the low fuel demand selector block 700 (software) or the hardware low select arrangement previously described.

After the exhaust temperature output limit is determined in block 766 a return is made to the routine 712 in FIG. 26. Next, a software low selection is made by block 700 in the Mode 1 control program execution. Repeated executions of the control routine 712 are made during the time period that the gas turbine 104 is placed under sequencing and acceleration operations in Mode 1 control.

Once synchronous speed is reached, block 768 in FIG. 26 directs the program into Mode 2 control operations. In block 770, the speed reference is set equal to the top speed value plus any speed change entered into the control loop by manual synchronization operations or by automatic synchronization program execution. Further, the program operations are redirected through blocks 726, 728, 744 and 700 as in the case of Mode 1 control.

After synchronization, block 722 or 744 directs control program operations to a Mode 3 control block 776 or a Mode 4 control block 778 according to the operator's panel selection. As shown in greater detail in FIG.

38, the Mode 3 block 776 provides for determining kilowatt error from the difference between the kilowatt reference and actual kilowatts in block 700. Proportional and integral controller routines are then applied to the kilowatt error in block 782 and the resultant controller outputs are summed in block 784 in order to provide for constant kilowatt control with temperature limit backup in Mode 3. The kilowatt reference employed in the error determination block 780 is adjustable with the RAISE and LOWER pushbuttons on the operator's panel.

A loading rate limit is determined by block 786 to prevent excessive thermal transients due to excessive loading rates under automatic or manual incremental loading. The rate limit action is performed to produce the loading rates previously described. As shown in FIG. 32D, the loading rate limiter is a function generator which tracks the fuel demand signal CSO with a positive bias for control availability during nonramping periods. Once a load reference change is generated, the loading rate limiter adds a step term to its output to operate through the load and loading rate low select block (FIG. 32) and allow the fuel demand signal to ramp at the preset rate.

Figures 38, 39:
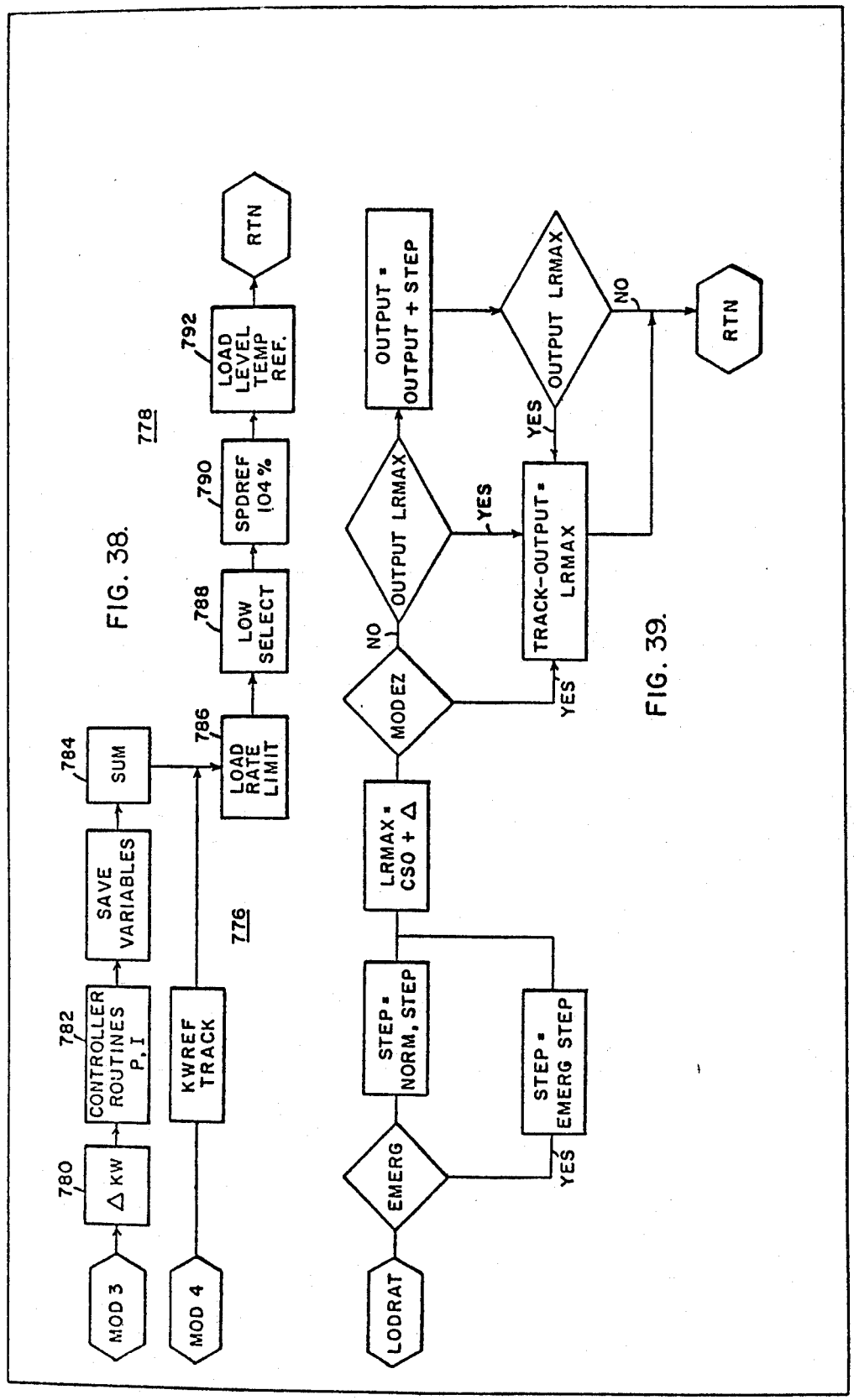
FIG. 38 shows a flow diagram for control program operations which provide load control and load limit functions for the gas turbine power plant.
FIG. 39 illustrates a flowchart for a load rate limit function employed in the load control and limit operations illustrated in FIG. 38.

In FIG. 39, a relatively detailed flowchart is shown for the loading limit subroutine. If the control program is in Mode 1 or 2, the limiter output is made equal to LRMAX, i.e. tracking. If the control program is in Mode 3 or 4 and the limiter output is greater than or equal to LRMAX, the limiter is caused to track LRMAX. Otherwise the limiter output has a step term added to it and if the sum is less than LRMAX it is generated. However, if the sum is greater than or equal to LRMAX the limiter output again is caused to track the fuel demand signal. As shown, the size of the step term is different (higher) for emergency startups as compared to normal startups.

When mode 3 is first entered, the kilowatt references is set at a minimum value and the operator can then determine the kilowatt reference value thereafter. However, the reference cannot exceed that value corresponding to the base load exhaust temperature limit. The software control configuration associated with Mode 3 is shown in FIG. 32C, and the constant kilowatt control shown therein is illustrated in greater detail in FIG. 32D. As previously considered and as shown in FIG. 32C, the primary Mode 3 controls are the exhaust temperature control and the constant kilowatt control while the blade path and surge controls provide backup protection. The speed reference is set at a value of 106% rated speed to cause a speed error of 6% which is too high for selection by the low selection software block. If the generator 102 is disconnected from the system, the speed loop will regulate turbine speed to the 104% value with 2% droop to maintain the fuel level required for idle operation.

In Mode 4, the kilowatt reference is caused to track actual load and block 786 then makes a loading rate limit determination. Low selection block 788 functions in Mode 3 to determine the lowest fuel demand corresponding to the kilowatt control limit and the loading rate limit as previously considered but it simply passes the loading rate limit in Mode 4. Block 790 provides for setting the speed reference to the 106% value and the previously noted block 792 provides for determining the temperature reference with the use of the curves 344, 340 and 342 (FIG. 42) as considered with the Mode 1 control block 726 for use in the blade path and exhaust temperature limit control block 744.

In both Mode 3 and Mode 4, the block 744 is executed in the manner considered previously in connection with Mode 1. Since no constant kilowatt function is provided for Mode 4, the block 744 provides for temperature loading operation through exhaust temperature limit action. Under temperature control, the generated power varies with the ambient air temperature such that more power is generated with lower inlet air temperature.

With respect to Mode 3, a 50° F. offset is provided for the blade path control function so that in the steady state the exhaust function provides control. However, the blade temperature control does not protect against high and sudden temperature transients.

The software control configuration for Mode 4 is illustrated in FIG. 32. Load Mode 3 and load Mode 4 program executions are completed through low select block 700 which selects the lowest fuel demand representation associated with the temperature, surge and load limits to provide the control operations described. Control program execution through the blocks 766, and/or 788, 744 and 700 continues for the duration of Mode 3 or Mode 4 load control.

A variety of special control program Macros and subroutines are employed in the preferred implementation of the control program 602. A discussion of such may be found in Section D8 of the aforementioned copending application Ser. No. 082,476, now U.S. Pat. No. 3,898,439.

9. Data Logging Program

A formated log is printed in response to execution of the log program 618 on a periodic basis selected by the plant operator within the range of 15 minutes to two hours. The printed readings are instantaneous values obtained from the last analog scan cycle. The plant operator may select any 20 analog points per turbine under control.

Generally, the analog conversion program 620 provides for converting entered analog values into the engineering value represented by the input and vice versa. Generally, four types of conversion are provided, i.e., flow straight-line, thermocouple, and segmented straight-line.

10. Alarm and Thermocouple Processing Programs

Alarms are determined by the sequencing program 600 and the thermocouple processing program 616 as hereinbefore briefly considered in the general discussion of the program system. Referring again to the flowchart for thermocouple check program 616 shown in FIG. 43, multiple alarm status indications are provided as indicated at blocks 792, 796, 797 and 798. Unique indications are thereby provided of unsafe or damaging operating conditions identified and alarmed as a function of the various temperature readings taken at the blade path and exhaust cycle positions of the gas turbine 104.

As earlier considered, the sequencing program 600, the control program 602 and the thermocouple processing program 616 interactively provide a facility by which process temperatures may be detected during all modes of gas turbine operation to ensure reliable, safe operation thereof, thereby greatly increasing power plant availability. Operating conditions which are known to cause damage to vital turbine components such as combustor basket and rotor blades are immediately detected. An alarm condition is determined by the alarm program 610 as a result of either cyclic execution thereof or alternatively in response to a call thereto.

In the preferred embodiment, alarm printouts generated by the alarm program 610 result from the use of two tables of bits. In the first table, the bits are set on and off by the sequencing program 600 and the thermocouple check program 616 and the second table is used to store the previous condition of the alarm bits. The alarm program 610, on the periodic basis, compares the two tables and generates alarm messages when the bit patterns of the two tables differ. The alarm program 610 is periodically executed to printout all points in alarm to provide the operator with a greatly expanded monitoring facility.

Certain of the alarms as at 792 and 798 provide essential data to the operator concerning the operation of individual sensors. A correlation of the temperature readings which are regularly output by the data log program 618 with the received indications of "Open Thermocouple" or "Exhaust Thermocouple Fail" gives rise to a facility for immediately determining certain gas turbine operating conditions which may dictate that the operator intervene to initiate shutdown. Control system automatically scheduled shutdowns occur as a consequence of conditions which simultaneously give rise to the alarming of "Maximum Temperature Exceeded" as at 796 and "Exhaust Overtemperature" at 797.

In the case of shutdown alarms, one operational and maintenance advantage associated with the operation of control system 300 is that the alarm condition which causes a shutdown can be readily determined again as indicated by reference numeral 796 and 797. Thus, logic processing provided by the sequencing program in the implementation of the sequencing logic FIG. 22 avoids the generation of multiple spurious alarms which are caused by the shutdown itself and follow the shutdown causing alarm. Multiple confusing alarm lightings as encountered with conventional annunciator panels are thus avoided.

The thermocouple processing program 616 runs on a periodic basis throughout all modes of gas turbine 104 operation. As hereinbefore discussed, a check is made of the values stored for all thermocouples not checked by the control program 602. Those of particular interest in an implementation of the present invention again are the blade path thermocouples and exhaust manifold thermocouples. Through the interaction of the thermocouple checking and processing program 616, and the data logging program 618 there is provided continuous formated output reflecting current status of both thermocouples and turbine systems.

11. Miscellaneous Programs

The miscellaneous programs 622 include a programmer's console function program, a dead switch computer program, a power failure and restart program, and a horn and alarm lamp program. Additional programmer's console functions designated herein as being implemented by miscellaneous programs rather than the executive program include a CCI print status program, an analog engineering units print program, a contact output operate program, a test dead computer system program and a time program.

The alarm program, data logging program, and miscellaneous programs are more fully discussed in the aforementioned copending application Ser. No. 082,470, Section D9 to Section D11, pages 204 to 210.

E. List of Macros, Inputs/Outputs And Programs Written In Assembly Language

Contained in the aforementioned copending related application Ser. No. 082,470 is a listing including logic and control macros, the contact closure inputs and outputs, the analog inputs and the devices associated with the sequencing control in a specific embodiment of the control system 300 shown in FIG. 9. The program system described in section D herein substantially embraces that described in the corresponding section of application Ser. No. 082,470. Contained herein is a description of a preferred embodiment of an increment thereto giving rise to an enhanced process monitoring and control capability.

Here again, the detailed flowchart corresponding to the thermocouple program printout does not have certain differences from certain aspects of the described flowcharting. The listed programs do provide for an essential implementation of the subject matter described herein.

Most developed system software may be characterized with relatively minor faults known as bugs which sometimes take long periods of time to detect and/or diagnose. Ordinarily the correction of such faults is within the skill of control and system programmers. The program listing which follows accordingly may be expected to contain some faults of this kind but all such faults which have been detected have required only programmers skill for connection in field applications.

```
 1            00000    XX       EQU  0
 2            00002    NTURB    8EQU 2
 3            00204    DIVIDE   8EQU 204
 4            30643    TNUMBR   8EQU 30643
 5            23400             8ORG 23400
 6
 7            00002    NOMCH    SYN  NTURB
10
11                              THIS ROUTINE CHECKS 2,4,8 OR 16 T/CS FOR OPEN CIRCUIT AND EX-
12                              CESS TEMP. IT AVERAGES THOSE NOT OPEN. IT CHECKS EACH AGAINST
13                              THE AVG. AND DISCARDS THOSE LESS THAN THE AVERAGE BY A NUMBER
14                              DIFLIM IN THE DATA LIST FOLLOWING THE RJP. IF ADDITIONAL ONES
15                              ARE DISCARDED, IT REPEATS THE AVERAGE AND CHECK PROCESS.
16                              IF ANY ARE DISCARDED, IT SETS FALALM. IF ANY EXCEED THE ABSO-
17                              LUTE LIMIT,IT SETS ABSALM. THE ABSOLUTE LIMIT AND THE ADDRESS
20                              OF FLAGS ABSALM AND FALALM ARE IN THE DATA LIST FOLLOWING THE
21                              RJP. IF ONLY 1/4 OR LESS ARE GOOD, FLAG ABSALM IS SET ALSO.
22                              ENTRY WILL BE-
23                                        ENL ADDR
24                                        SUB TNUM    ADDRESS OF LOWEST VALUE LOCATION
25                                        EDR NUM.    NUMBER TO BE AVERAGED 2,4,8 OR 16
26                                        RJP TCPROC
27                                        OCT XX      ABSOLUTE TEMP LIMIT (ADC)
30                                        OCT XX  DIFFERNTIAL TEMP LIMIT (ADC)
31                                        OCT XX      ADDRESS OF ABSOLUTE ALARM WORD
32                                        OCT XX      ADDRESS OF T/C FAILURE ALARM WORD
33                              RETURN WILL BE TO THE NEXT LOCATION WITH THE ADC AVERAGE IN
34                              THE ACCUMULATOR AND THE NUMBER OF GOOD T/CS IN THE DESIGNATOR
35                              REGISTER
36   23400    00000    TCPROC   ...                 T/C PROCESSING SUBROUTINE
37   23401    06 0 211           SDR NUMBER         NUMBER TO BE AVERAGED
40   23402    06 0 212           SDR GDCNT
41   23403    06 0 213           SDR GDCNT1
42   23404    06 0 214           SDR COUNT
43   23405    37 0 215           STL ADDR           STARTING ADDRESS
44   23406    32 0 304           ENL 4)             MOVE DATA LIST
45   23407    37 0 216           STL TEMP1
46   23410    10 0 000           ADD TCPROC
47   23411    37 0 000           STL TCPROC
50   23412    32 0 303           ENL DATA)
51   23413    37 0 217           STL TEMP2
52   23414    32 1 000           ENL TCPROC,I
53   23415    37 1 217           STL TEMP2,I
54   23416    01 0 000           DCR TCPROC
55   23417    01 0 217           DCR TEMP2
56   23420    01 0 216           DCR TEMP1
57   23421    27 0 013           PJP L-5
60   23422    32 0 000           ENL TCPROC         FIX RETURN
61   23423    10 0 304           ADD 4)
62   23424    37 0 000           STL TCPROC         PREPARE TO MOVE AND CHECK VALUES
63   23425    32 0 302           ENL VLST)
64   23426    37 0 216           STL TEMP1
65   23427    32 0 301           ENL VLST4)
66   23430    37 0 217           STL TEMP2
67   23431    32 0 210           ENL JMPINS         CALCULATE NO. OF RIGHT SHIFTS FOR BEST ACCURACY
70                                                  WITHOUT OVERFLOW
71   23432    37 0 051           STL RSHINS-1
72   23433    01 0 051           DCR RSHINS-1
73   23434    16 0 214           RSH COUNT
74   23435    21 0 032           EJP L-2
75   23436    32 0 211           ENL NUMBER
76   23437    37 0 214           STL COUNT
77   23440    32 0 223           ENL MAXLIM         COMPENSATE MAXLIM FOR OPEN T/C CHECK VALUE
100  23441    10 0 222           ADD OPENTC
101  23442    37 0 223           STL MAXLIM
102                                                 CALC SAVE TABLE ADDRESS FOR UNIT
103  23443    32 0 300           ENL SAVTBL)
104  23444    10 1 277           ADD TNUMBR
105  23445    37 0 271           STL SAVADR
106  23446    32 1 215  LOOPM    ENL ADDR,I         COLLECT VALUES, CHECK FOR OPEN T/CS
107  23447    10 0 222           ADD OPENTC
110  23450    37 1 216           STL TEMP1,I
111  23451    24 0 055           JMP L+5            JUMP CHANGED UNDER PROGRAM CONTROL
112                     RSHINS   RPT 4 **           VARY NO. OF RIGHT SHIFTS DEPENDING ON NO. AVERAG
113  23452    16 1 276           RSH ACC
     23453    16 1 276
     23454    16 1 276
     23455    16 1 276
114  23456    25 0 203           CJP ADD1           ROUND
115  23457    37 1 217  RNDRTN   STL TEMP2,I        SHIFTED VALUE
116  23460    27 0 064           PJP L+5
117  23461    32 0 215           ENL ADDR
120  23462    37 0 271           STL SAVADR
121  23463    03 1 226           SMB FALALM,I
122  23464    01 0 212           DCR GDCNT
123  23465    32 0 223           ENL MAXLIM         CHECK AGAINST ABSOLUTE LIMIT
```

```
124  23466  11 1 216              SUB  TEMP1,I
125  23467  27 0 070              PJP  L+2
126  23470 -03 1 225              SMB  ABSALM,I
127  23471  32 0 215              ENL  ADDR           PREPARE FOR NEXT T/C
130  23472  10 0 275              ADD  NOMCH)
131  23473  37 0 215              STL  ADDR
132  23474  01 0 216              DCR  TEMP1
133  23475  01 0 217              DCR  TEMP2
134  23476  01 0 214              DCR  COUNT
135  23477  27 0 045              PJP  LOOPM          IS THIS THE LAST ONE
136  23500  32 0 301       AVG    ENL  VLST4)
137  23501  37 0 216              STL  TEMP1
140  23502  32 0 211              ENL  NUMBER
141  23503  37 0 214              STL  COUNT
142  23504  32 0 274              ENL  0)
143  23505  37 0 220              STL  SUM
144  23506  32 1 216       LOOPS  ENL  TEMP1,I        ADD GOOD T/CS VALUES
145  23507  27 0 200              PJP  ADDON
146  23510  01 0 216       CONT   DCR  TEMP1
147  23511  01 0 214              DCR  COUNT
150  23512  27 0 105              PJP  LOOPS          IS THIS THE LAST
151  23513  32 0 211              ENL  NUMBER         SHIFT SUM TO PROPER B POINT TO DIVIDE
152  23514  37 0 214              STL  COUNT
153  23515  32 0 274              ENL  0)
154  23516  14 0 220              LSH  SUM
155  23517  25 0 205              CJP  SMBTC
156  23520  14 1 276       LSHACC LSH  ACC
157  23521  16 0 214              RSH  COUNT
160  23522  21 0 115              EJP  L-4
161  23523  36 1 273              RJP  DIVIDE
162  23524     23620              OCT  SUM            LOW ORDER DIVIDEND
163  23525     23612              OCT  GDCNT          DIVISOR
164  23526     23616              OCT  TEMP1          REMAINDER
165  23527  37 0 220              STL  SUM            STORE AVERAGE
166  23530  11 0 224              SUB  DIFLIM
167  23531  37 0 221              STL  LIMIT2         STORE LOW VALUE REJECT LIMIT
170  23532  32 0 211              ENL  NUMBER         PREPARE TO CHECK FOR VALUES TO LOW TO BE USED
171  23533  37 0 214              STL  COUNT
172  23534  32 0 302              ENL  VLST)
173  23535  37 0 216              STL  TEMP1
174  23536  32 0 301              ENL  VLST4)
175  23537  37 0 217              STL  TEMP2
176  23540  32 1 217       LOOPC  ENL  TEMP2,I        SHIFTED VALUE
177  23541  27 0 142              PJP  L+2            WAS THIS VALUE PREVIOUSLY REJECTED
200  23542  24 0 154              JMP  TCLBL1
201  23543  32 1 216              ENL  TEMP1,I        NO.
202  23544  11 0 221              SUB  LIMIT2         IS IT TOO LOW
203                                                   SAVE ADDR FOR THROWN AWAY VALUE
204  23545  27 0 154              PJP  TCLBL1
205  23546  32 0 215              ENL  ADDR
206  23547  11 0 214              SUB  COUNT
207  23550  11 0 214              SUB  COUNT
210  23551  37 1 271              STL  SAVADR,I
211  23552  03 1 217              SMB  TEMP2,I        YES. REJECT AND SET FAILURE ALARM
212  23553  03 1 226              SMB  FALALM,I
213  23554  01 0 212              DCR  GDCNT
214         23555         TCLBL1  SYN  L
215  23555  01 0 216              DCR  TEMP1          PREPARE FOR NEXT T/C
216  23556  01 0 217              DCR  TEMP2
217  23557  01 0 214              DCR  COUNT
220  23560  27 0 137              PJP  LOOPC          IS THIS THE LAST
221  23561  32 0 212              ENL  GDCNT          HAVE ANY NEW T/CS BEEN REJECTED
222  23562  11 0 213              SUB  GDCNT1
223  23563  20 0 166              ZJP  DONE
224  23564  32 0 212              ENL  GDCNT          YES.
225  23565  37 0 213              STL  GDCNT1         SAVE GOOD COUNT
226  23566  24 0 077              JMP  AVG            RECALCULATE AVERAGE OF GOOD T/CS
227  23567  32 0 212       DONE   ENL  GDCNT          HAVE TOO MANY BEEN REJECTED
230                               RPT  2
231  23570  16 0 211              RSH  NUMBER
     23571  16 0 211
232  23572  11 0 211              SUB  NUMBER
233  23573  27 0 174              PJP  L+2
234  23574  03 1 225              SMB  ABSALM,I       YES. SET ABSOLUTE ALARM FLAG
235  23575  32 0 220              ENL  SUM            PICK UP AVERAGE
236  23576  11 0 222              SUB  OPENTC         REMOVE OPEN T/C CHECK BIAS
237  23577  05 0 212              EOR  GDCNT          PICK UP NUMBER OF GOOD T/CS
240  23600  24 1 000              RTN
241
242  23601  10 0 220       ADDON  ADD  SUM
243  23602  37 0 220              STL  SUM
244  23603  24 0 107              JMP  CONT
245  23604  10 0 272       ADD1   ADD  1)
246  23605  24 0 056              JMP  RNDRTN
```

```
247  23606  03 1 276   SMBTC   SMB ACC
250  23607  24 0 117           JMP LSHACC
251  23610  24 0 055   JMPINS  JMP RSHINS+4
252  23611  00000      NUMBER  OCT
253  23612  00000      GDCNT   OCT
254  23613  00000      GDCNT1  OCT
255  23614  00000      COUNT   OCT
256  23615  00000      ADDR    OCT
257  23616  00000      TEMP1   OCT
260  23617  00000      TEMP2   OCT
261  23620  00000      SUM     OCT
262  23621  00000      LIMIT2  OCT
263  23622  00200      OPENTC  OCT 200        OPEN T/C CHECK BIAS
264  23623  00000      MAXLIM  OCT
265  23624  00000      DIFLIM  OCT
266  23625  00000      ABSALM  OCT
267  23626  00000      FALALM  OCT
270         23626      DATA    SYN L-1
271                            RPT 16
272  23627  00000              OCT
     23630  00000
     23631  00000
     23632  00000
     23633  00000
     23634  00000
     23635  00000
     23636  00000
     23637  00000
     23640  00000
     23641  00000
     23642  00000
     23643  00000
     23644  00000
     23645  00000
     23646  00000
273         23646      VLST    SYN L-1        TABLE OF VALUES
274                            RPT 16
275  23647  00000              OCT
     23650  00000
     23651  00000
     23652  00000
     23653  00000
     23654  00000
     23655  00000
     23656  00000
     23657  00000
     23660  00000
     23661  00000
     23662  00000
     23663  00000
     23664  00000
     23665  00000
     23666  00000
276         23666      VLST4   SYN L-1        TABLE OF SHIFTED VALUES
277
300
301  23667  00000      SAVTBL  OCT            VALUE OF LAST FAILED T/C -A
302  23670  00000              OCT            VALUE OF LAST FAILED T/C -B
303
304  23671  00000      SAVADR  OCT XX
     23672  00001              WRD
     23673  00204              WRD
     23674  00000              WRD
     23675  00002              WRD
     23676  00101              WRD
     23677  30643              WRD
     23700  23667              WRD
     23701  23666              WRD
     23702  23646              WRD
     23703  23626              WRD
     23704  00004              WRD
305         00000              END
```

What is claimed is:

1. A gas turbine electric power plant comprising a gas turbine having compressor, combustion and turbine elements, a generator coupled to said gas turbine for drive power, a fuel system for supplying fuel to said gas turbine combustion elements, a control system including a digital computer and an input/output system therefor, means for operating said fuel system to energize said gas turbine operably coupled between said fuel system and said control means, a plurality of process sensors operably coupled to said control system and disposed to detect plant conditions related to said gas turbine and said generator, said plurality of sensors comprising at least a first arrangement of process temperature sensors operatively associated with said combustion elements, each of said temperature sensors providing a gas discharge temperature indication for at least one corresponding combustion element, means for operating said computer for processing said temperature indications to determine the validity of each of such indications, means for operating said computer for combining valid temperature indications retained after said processing step to derive a control parameter, and means for operating said computer to make control action determinations for implementation by said fuel system operating means and to make predetermine turbine alarm status determinations in response to individual temperature indications derived from at least said first arrangement of process temperature sensors.

2. A gas turbine electric power plant comprising a gas turbine having compressor, combustion and turbine elements, a generator coupled to said gas turbine for drive power, a fuel system for supplying fuel to said gas turbine combustion elements, a control system for operating said plant in accordance with predetermined criteria and in response to information concerning predetermined plant parameters, means for operating said fuel system operably coupled between said fuel system and said control system, a plurality of sensors operably coupled to said control system and disposed to detect plant conditions related to said gas turbine and said generator, said plurality of sensors including at least a first arrangement of temperature sensors operatively associated with said combustion elements, each of said temperature sensors providing a gas discharge temperature indication for at least one corresponding combustion element, means for processing said temperature indications to determine the validity of each of such indications, means for combining valid temperature indications retained after said processing step to derive a control parameter, and means for operating said control system to make control action determinations for implementation by said fuel system operating means and to make predetermined turbine alarm status determinations, both in response to individual temperature indications derived from at least said first arrangement of temperature sensors.

3. An electric power plant as set forth in claim 2 wherein said turbine element includes a blade assembly defining a blade path for discharged gases which path terminates at the discharge end of said turbine element and wherein said first arrangement of process temperature sensors is located at said blade path discharge of said turbine element, each of said sensors being complementarily disposed with respect to each of the other of said sensors, said arrangement thereof having a symmetry corresponding to a predictable blade path discharge swirl in conformity with predetermined angular rotation of said discharge swirl in passage through said blade path.

4. An electric power plant as set forth in claim 3 wherein said process temperature sensors comprise a plurality of thermocouples and wherein said computer operating means operates to process temperature indications derived from said thermocouple to determine a malfunction of any of said plural thermocouples and to direct a responsive alarm action corresponding to said determined malfunction.

5. An electric power plant as set forth in claim 3 and further comprising a second arrangement of process temperature sensors located about the periphery of the exhaust manifold of said turbine element and cooperatively associated with said first arrangement to provide plural exhaust gas cycle position temperature indications to be operated upon by said computer operating means, said computer operating means further operating to provide correlative alarm indications in response to said second arrangement of process temperature sensors.

6. An electric power plant as set forth in claim 3 wherein said computer operating means generates successive temperature determinations indicative of turbine operating conditions in response to said first arrangement of process temperature sensors and wherein said computer operating means further comprises to process temperature indications derived from said process temperature sensors to determine a malfunction of any of said process temperature sensors and to direct a particularized responsive alarm action corresponding to said determined malfunction.

7. An electric power plant as set forth in claim 6 wherein said process temperature sensors comprise a plurality of thermocouples and wherein said computer operating means provides alarm indications particularized to one or more of the following:
 (a) open thermocouple
 (b) shorted thermocouple
 (c) reversed thermocouple connection.

8. An electric power plant as set forth in claim 4 wherein said computer operating means directs an alarm action in response to said determined thermocouple malfunction particularized to one or more of the following:
 (a) open thermocouple
 (b) shorted thermocouple
 (c) reverse thermocouple connection.

9. An electric power plant as set forth in claim 5 wherein said first and second arrangements of process temperature sensors each comprise a plurality of thermocouples and wherein said computer operating means generates successive temperature determinations indicative of turbine operating conditions in response to said first and second arrangements of process temperature sensors and further operates to process temperature indications derived from said first and said second arrangement of process temperature sensors to determine a malfunction of any of said process temperature sensors and to direct alarm indications particularized to one or more of the following malfunctions:
 (a) open thermocouple
 (b) shorted thermocouple
 (c) reversed thermocouple connection.

10. A gas turbine electric power plant comprising a gas turbine having compressor, combustion and turbine elements, a generator coupled to said gas turbine for drive power, a fuel system for supplying fuel to said gas turbine combustion elements, means for operating said fuel system to energize said gas turbine, a plurality of process sensors disposed to detect plant conditions related to said gas turbine and said generator, said plurality of sensors comprising at least a first arrangement of process temperature sensors operatively associated with said combustion elements, each of said temperature sensors providing a gas discharge temperature indication for at least one corresponding combustion element and means for deriving and displaying alarm status conditions in response to individual temperature indications derived from at least said first arrangement of process temperature sensors, particularized to one or more of the following malfunctions of said process temperature sensors:

(a) open thermocouple
(b) shortened thermocouple
(c) reverse thermocouple connection.

11. As gas turbine electric power plant comprising a gas turbine having compressor, combustion and turbine elements, said turbine element including a blade assembly defining a blade path for discharged gases which terminates at the discharge end of said turbine element, a generator coupled to said gas turbine for drive power, a fuel system for supplying fuel to said gas turbine combustion elements, a digital computer and an input/output system therefor, means for operating said fuel system to energize said turbine operably coupled between said fuel system and said computer, a plurality of process sensors operably coupled to said computer and disposed to detect plant conditions related to said gas turbine and said generator, said plurality of sensors comprising at least a first arrangement of process temperature sensors located at said blade path discharge portion of said turbine element and operatively associated with said combustion elements, each of said temperature sensors providing a gas discharge temperature indication for at least one corresponding combustion element, means for operating said computer for processing said temperature indications to determine the validity of each of such indications, means for operating said computer for combining valid temperature indications retained after said processing step to derive a control parameter, and responsive control action determinations for implementation by said fuel system operating means functionally related to individual temperature indications derived from at least said first arrangement of process temperature sensors.

12. An electric power plant as set forth in claim 11 wherein each of said process temperature sensors is complementarily disposed with respect to each of the other of said sensors, said arrangement thereof having a symmetry corresponding to a predictable blade path discharge swirl in conformity with predetermined angular rotation of said discharge swirl in passage through said blade path.

13. An electric power plant as set forth in claim 12 wherein said process temperature sensors comprise a plurality of thermocouples and wherein said computer operating means further operates to process temperature indications derived from said thermocouple to determine a malfunction of any of said plural thermocouples and to direct a responsive alarm action corresponding to said determined malfunction.

14. An electric power plant as set forth in claim 13 and further comprising a second arrangement of thermocouples located about the periphery of the exhaust manifold of said turbine element and cooperatively associated with said first arrangement to provide plural exhaust gas cycle position temperature indications to be operated upon by said computer operating means, said computer operating means further operating to provide correlative alarm indications in response to said second arrangement of process temperature sensors.

15. A method for operating a digital control computer associated with industrial gas turbine apparatus including an electric generator a gas turbine having compressor, combustion and turbine elements, a fuel system for supplying fuel to the combustion elements, and a plurality of process temperature sensors disposed to detect plant conditions related to said gas turbine and said generator, said plurality of sensors comprising at least a first arrangement of process temperature sensors located at the blade path discharge of said turbine elements and operatively associated with said combustion elements, the steps of said method comprising determining individual temperature readings derived from said individual process temperature sensors, processing said derived temperature indications to determine the validity of each of such indications, combining valid temperature indications retained after said processing step to derive a control parameter, and supplying fuel to said fuel system in a manner functionally related to said control parameter.

* * * * *